(12) United States Patent
Henningsen et al.

(10) Patent No.: US 11,901,957 B2
(45) Date of Patent: *Feb. 13, 2024

(54) SYSTEMS AND METHODS FOR MODELING QUANTUM STRUCTURE AND BEHAVIOR

(71) Applicant: Omnisent, LLC, Carlsbad, CA (US)

(72) Inventors: Joseph Eric Henningsen, Skamania, WA (US); Clifford Tureman Lewis, Albuquerque, NM (US)

(73) Assignee: Omnisent, LLC, Carlsbad, CA (US)

(*) Notice: Subject to any disclaimer, the term of this patent is extended or adjusted under 35 U.S.C. 154(b) by 378 days.

This patent is subject to a terminal disclaimer.

(21) Appl. No.: 17/221,632

(22) Filed: Apr. 2, 2021

(65) Prior Publication Data

US 2021/0314069 A1     Oct. 7, 2021

Related U.S. Application Data

(63) Continuation of application No. 17/003,820, filed on Aug. 26, 2020, now Pat. No. 10,972,190, which is a
(Continued)

(51) Int. Cl.
    *H04B 10/70*        (2013.01)
    *H04L 9/08*        (2006.01)
(Continued)

(52) U.S. Cl.
    CPC ............. *H04B 10/70* (2013.01); *G06F 30/20* (2020.01); *H04L 9/0852* (2013.01); *G06F 2111/10* (2020.01)

(58) Field of Classification Search
    CPC ..... H04B 10/70; G06F 30/20; G06F 2111/10; H04L 9/0852
See application file for complete search history.

(56) References Cited

U.S. PATENT DOCUMENTS

| | | |
|---|---|---|
| 4,671,830 A | 6/1987 | Burnham |
| 7,317,574 B2 | 1/2008 | Zoller et al. |

(Continued)

FOREIGN PATENT DOCUMENTS

| | | |
|---|---|---|
| WO | WO1997035388 A1 | 9/1997 |
| WO | WO2007077984 A1 | 7/2007 |

OTHER PUBLICATIONS

C. W. Misner et al. "John Wheeler, relativity and quantum information" Physics Today, pp. 40-46, Apr. 2009 (7 pages).
(Continued)

*Primary Examiner* — Mina M Shalaby
(74) *Attorney, Agent, or Firm* — Pizarro Allen PC

(57) ABSTRACT

Systems and methods of modeling the structure and behavior of the quantum continuum based on geometrical principles are provided. In some embodiments, systems and methods of modeling quantum structure and behavior may include modeling a region of space as a three-dimensional projection of a field of N-dimensional hard-spheres, modeling a stable particle within the region of space as a locally stably packed set of hard-spheres, defining an energy subspace comprising one or more additional dimensions, and modeling an energy of the stable particle as an amount of hard-sphere geometry shifted out of the three spatial dimensions into the energy subspace sufficient for the set of hard-spheres to pack stably. Systems and methods for modeling virtual particles and performing quantum communication are also described.

20 Claims, 25 Drawing Sheets

Related U.S. Application Data continuation of application No. 16/829,304, filed on Mar. 25, 2020, now Pat. No. 10,790,913, which is a continuation of application No. 16/272,906, filed on Feb. 11, 2019, now Pat. No. 10,637,583, which is a continuation-in-part of application No. 15/205,643, filed on Jul. 8, 2016, now Pat. No. 10,204,181.

(60) Provisional application No. 62/305,377, filed on Mar. 8, 2016, provisional application No. 62/190,895, filed on Jul. 10, 2015.

(51) Int. Cl.
*G06F 30/20* (2020.01)
*G06F 111/10* (2020.01)

(56) References Cited

U.S. PATENT DOCUMENTS

| | | | |
|---|---|---|---|
| 7,683,361 B2 | 3/2010 | Edamatsu et al. | |
| 8,238,556 B2 | 8/2012 | Yuan et al. | |
| 8,265,280 B2 | 9/2012 | Lee et al. | |
| 8,913,900 B2 | 12/2014 | Lukin et al. | |
| 9,046,647 B2 | 6/2015 | Bravo-Abad et al. | |
| 9,202,945 B2 | 12/2015 | Colli et al. | |
| 9,278,863 B2 | 3/2016 | Suh et al. | |
| 9,309,124 B2 | 4/2016 | Loh et al. | |
| 9,720,437 B2 | 8/2017 | Gilbert et al. | |
| 10,204,181 B1* | 2/2019 | Henningsen | G06F 5/01 |
| 10,637,583 B2 | 4/2020 | Henningsen et al. | |
| 10,790,913 B2 | 9/2020 | Henningsen et al. | |
| 2002/0132333 A1 | 9/2002 | Strobl et al. | |
| 2003/0049784 A1 | 3/2003 | Nemerson et al. | |
| 2003/0139907 A1 | 7/2003 | McCarthy | |
| 2006/0133763 A1 | 6/2006 | Dangui et al. | |
| 2011/0108744 A1 | 5/2011 | Stevenson et al. | |
| 2011/0255150 A1 | 10/2011 | Nguyen | |
| 2012/0215050 A1 | 8/2012 | Hu | |
| 2013/0073387 A1 | 3/2013 | Heath | |
| 2013/0266328 A1 | 10/2013 | Paller | |
| 2015/0055961 A1 | 2/2015 | Meyers et al. | |
| 2015/0256270 A1 | 9/2015 | Paller | |
| 2015/0333840 A1 | 11/2015 | Bennett et al. | |
| 2015/0338423 A1 | 11/2015 | Shetty et al. | |
| 2016/0137508 A1 | 5/2016 | Suh et al. | |
| 2016/0144348 A1 | 5/2016 | Son et al. | |
| 2017/0052427 A1 | 2/2017 | Earl et al. | |
| 2017/0115365 A1 | 4/2017 | Majlesi | |
| 2019/0173589 A1* | 6/2019 | Henningsen | G06F 30/20 |
| 2019/0318053 A1* | 10/2019 | Low | G06F 30/20 |
| 2022/0138607 A1* | 5/2022 | Camps | G06N 10/20 706/62 |
| 2023/0005388 A1* | 1/2023 | Lalvani | G09B 23/26 |
| 2023/0016119 A1* | 1/2023 | Wei | G06N 10/60 |
| 2023/0155822 A1* | 5/2023 | Chen | H04L 9/0852 257/14 |
| 2023/0169382 A1* | 6/2023 | Bourassa | G06N 10/20 703/23 |

OTHER PUBLICATIONS

"Quantum Foam" (http:/ldolphin.org/qfoam.html), New Scientist, 19, Jun. 1999 (5 pages).
J. Ambjorn et al. "The Self-Organizing Quantum" Scientific American, Jul. 2008, pp. 42-49 (8 pages).
H.S.M. Coxeter "The Simple Helix and the Equation" Canad. Math. Bull. vol 28 (4) 1985, pp. 385-393 (9 pages).
Flyspeck Completion Announcement (https://code.google.com/p/flyspeck/wiki/AnnouncingCompletion), Aug. 10, 2014 (4 pages).
P. A. M. Dirac "A Theory of Electrons and Protons" Proceedings of the Royal Society A, 126, pp. 360-365, 1930, (7 pages).
A.V. Anikeenko and N.N. Medvedev "Polytetrahedal Nature of the Dense Disordered Packings of Hard Spheres" Physical Review Letters, Jun. 8, 2007 (4 pages).
W. G. Hoover and F. H. Ree, "Melting Transition and Communal Entropy of Hard Spheres", J. Chem. Phys. 49, 3609-3617, Oct. 15, 1968 (9 pages).
S. Torquato and Y. Jiao, "Dense Packings of the Platonic and Archimedean Solids", Nature Letters, 460, pp. 876-879, Aug. 13, 2009 (4 pages).
B. Carithers and P. Grannis "Discovery of the Top Quark", 1995 (13 pages).
"Carbon Nanotubes as Cooper-Pair Beam Splitters," L. G. Hermann et al., Physical Review Letters, Dated Sep. 17, 2009 (5 pages).
RK Richards "Quantum-entangled photon interferometry", Proceedings of the SPIE. vol. 5531 (Aug. 2, 2004) (7 pages).
H Terashima et al "Quantum interferometric generation of polarization entangled photons", Scientific Reports. vol. 3, No. 15733 (Published Online Oct. 24, 2018) (8 pages).
AT Costa et al "Entanglement of Two Impurities through Electron Scattering", Physical Review Letters 96(23) (Dated Mar. 22, 2005) (5 pages).
Gerlach, W.; Stern, O. "Der experimentelle Nachweis der Richtungsquantelung im Magnetfeld", Zeitschrift für Physik. 9: 349-352 (1922) (4 pages).
JG Ren, et al (2017), "Ground-to-satellite quantum teleportation", Nature 549, 70-73 (Published Aug. 9, 2017) (15 pages).
International Search Report published in related international application PCT/US2019/017539 dated Jun. 6, 2019 (4 pages).
Written Opinion published in related international application PCT/US2019/017539 dated Jun. 6, 2019 (7 pages).
Hensen et al. "Loophole-free Bell inequality violation using electron spins separated by 1.3 kilometres." In: Nature. Oct. 29, 2015 (Oct. 29, 2015) Retrieved on May 20, 2019 (May 20, 2019) (5 pages).

* cited by examiner

46

50

A method of modeling quantum structure and behavior

Integration of photons in a method of modeling quantum structure and behavior

24 ↘

26 — Modeling of a photon as a locally-packed set of hard spheres (e.g., model a photon as a tetrahelix of spheres akin to linear stacking of tetrahedra)

↓

28 — Partially rotating of the tetrahelix propagation into the time dimension. This may involve a shift into a electromagnetic-energy dimension (e.g., configuring the tetrahelix photon-model as residing in three spatial dimensions, the time dimension, and a electromagnetic-energy dimension)

↓

32 — Producing a physical quantity, the photon duration, wherein the photon-model energy is inversely proportional to its wavelength while maintaining a constant angular spin momentum equal to the reduced Planck Constant h-bar

Fig. 7B

Integration of electrons in a method of modeling quantum structure and behavior

$e^-$ ⬤◄------------ $d$ ------------►⬤ $\gamma$ $$\mathbf{F}_0 = \frac{E_\gamma \cdot (\lambda/2\pi)}{d^2} \qquad \mathbf{F}_{ES} = \frac{Q_e \cdot 2\delta}{d^2}$$

172 — Generating a pair of entangled particles, the pair of entangled particles including a first entangled particle and a second entangled particle.

174 — Measuring a value of an observable property of the first entangled particle along at least two measurement orientations 176 — Selectively routing the second entangled particle between a transmitter and a receiver based on the measured value of the observable property of the first entangled particle along the at least two orientations 178 — Measuring the second entangled particle along the same at least two orientations

Fig. 19

SYSTEMS AND METHODS FOR MODELING QUANTUM STRUCTURE AND BEHAVIOR

CROSS-REFERENCE TO RELATED APPLICATIONS

This application is a continuation of U.S. application Ser. No. 17/003,820, filed Aug. 26, 2020, which is a continuation of U.S. application Ser. No. 16/829,304, filed Mar. 25, 2020, now U.S. Pat. No. 10,790,913, which is a continuation of U.S. application Ser. No. 16/272,906, filed Feb. 11, 2019, now U.S. Pat. No. 10,637,583, which is a continuation-in-part of U.S. application Ser. No. 15/205,643, filed Jul. 8, 2016, now U.S. Pat. No. 10,204,181, which claims priority to each of U.S. Provisional Application Ser. No. 62/305,377 filed Mar. 8, 2016, and U.S. Provisional Application Ser. No. 62/190,895 filed Jul. 10, 2015. The disclosures of the aforementioned applications are incorporated herein by reference.

COPYRIGHT NOTICE

This application contains material that is subject to copyright protection. Such material may be reproduced exactly as it appears in Patent and Trademark Office patent files or records. The copyright owner otherwise reserves all rights to such material.

FIELD

This application relates to modeling quantum structure and systems and methods to visualize and predict particle structure and behavior.

BACKGROUND

Over the past century, physicists have developed mathematical tools for describing quantum structure and behavior, but knowledge of the actual inner workings of the quantum continuum is noticeably lacking. Existing methods are generally "Black Box" methods where inputs and outputs are observed and measured while the actual mechanisms of the phenomena are unknown. As a result, such methods are quite abstract, and thus it is difficult if not impossible to make predictions of material properties and dynamics based on those models. There is a need for models of the quantum continuum that provide a framework useful to visualize and analyze quantum mechanical systems, diminish the potential for misinterpretation of experimental results, and make predictions of material interactions and dynamical behavior.

SUMMARY

Systems and methods of modeling the structure and behavior of the quantum continuum based on geometrical principles are provided. In some embodiments, systems and methods of modeling quantum structure and behavior may include modeling a region of space as a three-dimensional projection of a field of N-dimensional hard-spheres, modeling a stable particle within the region of space as a locally stably packed set of hard-spheres, defining an energy subspace comprising one or more additional dimensions, and modeling an energy of the stable particle as an amount of hard-sphere volume (or other change in geometry) shifted out of the three spatial dimensions into the energy subspace sufficient for the set of hard-spheres to pack stably.

A computer readable medium may include instructions executable by a computer configured for modeling a region of space as a three-dimensional projection of a field of N-dimensional hard-spheres; modeling a stable particle within the region of space as a locally stably packed set of hard-spheres; defining an energy subspace comprising one or more additional dimensions; and modeling an energy of the stable particle as an amount of hard-sphere geometry shifted out of the three spatial dimensions into the energy subspace sufficient for the set of hard-spheres to pack stably.

A method of modeling virtual particle structure may include modeling a virtual particle as a set of hard-spheres, the set of hard-spheres being locally stably packed; and projecting the set of hard-spheres within a selected region of space.

A computer readable medium may include instructions executable by a computer configured for modeling a virtual particle as a set of hard-spheres, the set of hard-spheres being locally stably packed; and projecting the set of hard-spheres within a selected region of space.

A method of modeling virtual particle structure may include identifying one or more origin points for virtual particle emanation; and projecting one or more virtual particles from the one or more origin points, the one or more virtual particles modeled as a set of hard-spheres, the set of hard-spheres being locally stably packed.

A computer readable medium may include instructions executable by a computer configured for identifying one or more origin points for virtual particle emanation; and projecting one or more virtual particles from the one or more origin points, the virtual particles modeled as a set of hard-spheres, the set of hard-spheres being locally stably packed.

A transmitter system for quantum communication may include an entangled particle generator configured for producing an entangled pair of electrons and sending a first electron of the entangled pair of electrons to a spin state measurement device and sending a second electron of the entangled pair of electrons to a particle router; the spin state measurement device including a Stern-Gerlach Apparatus, the Stern-Gerlach Apparatus including a first section configured for generating a first inhomogeneous magnetic field with a magnetic field gradient in a first direction and a second section configured for generating a second inhomogeneous magnetic field with a magnetic field gradient in a second direction; wherein the spin state measurement device further includes an electron detector configured for detection of electrons deflected during transit through each of the first section and the second section, the spin state measurement device configured for sending one or more signals to the particle router based on the detection of electrons; and the particle router configured to receive the one or more signals and selectively pass the second electron of the entangled pair of electrons based on the one or more signals.

A receiver system for quantum communication may include a spin state measurement device including a Stern-Gerlach Apparatus, the Stern-Gerlach Apparatus including a first section configured for generating a first inhomogeneous magnetic field with a magnetic field gradient in a first direction and a second section configured for generating a second inhomogeneous magnetic field with a magnetic field gradient in a second direction; wherein the spin state measurement device further includes an electron detector configured for detecting electrons at an outlet portion of the Stern-Gerlach Apparatus; and a processor in electronic communication with the electron detector; the processor configured to receive a signal indicating that an electron was detected at the outlet portion of the Stern-Gerlach Apparatus.

A method of quantum communication may include generating an entangled pair of particles, the entangled pair of particles including a first entangled particle and a second entangled particle; measuring an observable property of the first entangled particle, the observable property corresponding to either of a particle spin or a particle polarization, the observable property being measured along at least two angles of orientation; selectively routing the second entangled particle between a transmitter and a receiver based on values of the observable property as measured along the at least two angles of orientation; wherein the selective routing of the second entangled particle includes transmitting the second entangled particle if the first entangled particle is measured as having a predetermined set of values of the observable property along the at least two angles of orientation; receiving the second entangled particle at the receiver; measuring the observable property of the second entangled particle along the at least two angles of orientation; and determining a bit string based on measured values of the observable property of the second entangled particle along the at least two angles of orientation.

BRIEF DESCRIPTION OF THE DRAWINGS

FIG. 7B is a flowchart illustrating a method of modeling quantum structure and behavior for photons.

FIG. 10 is a schematic diagram illustrating a mechanism for action of the fine constant.

FIG. 19 is a flowchart of a method of quantum communication.

DETAILED DESCRIPTION

Figure 1:
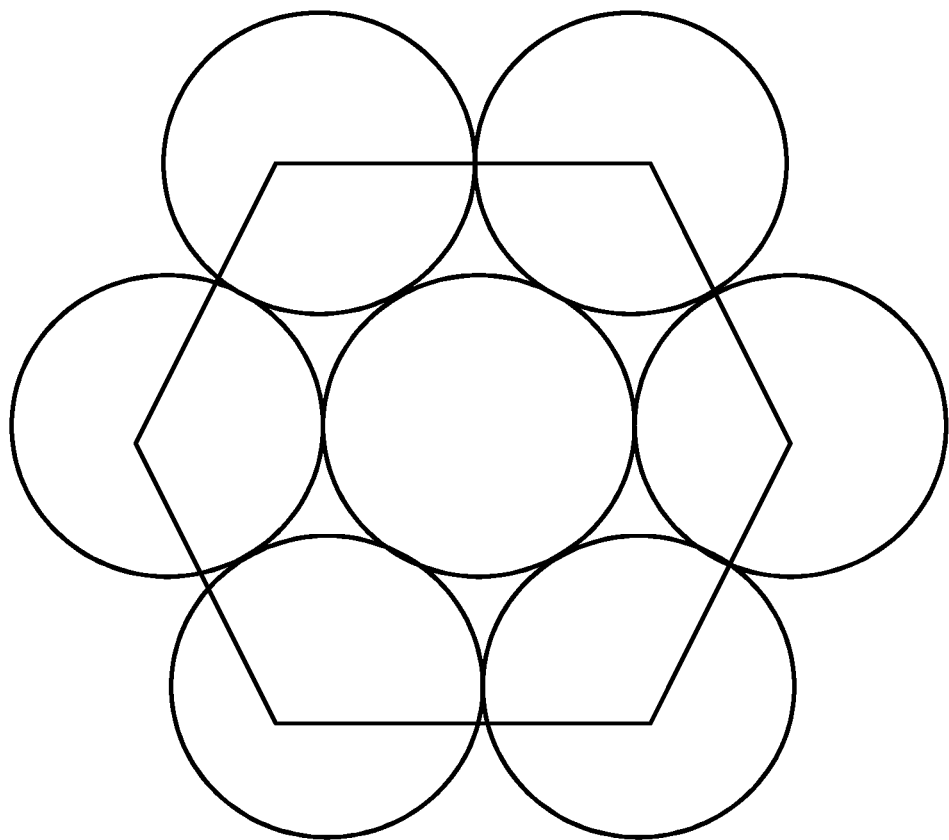
FIG. 1 is a schematic diagram illustrating perfect packing of 1-spheres.

As used herein, the following terms should be understood to have the indicated meanings:

When an item is introduced by "a" or "an," it should be understood to mean one or more of that item.

"Communication" means the transmission of one or more signals from one point to another point. Communication between two objects may be direct, or it may be indirect through one or more intermediate objects. Communication in and among computers, I/O devices and network devices may be accomplished using a variety of protocols. Protocols may include, for example, signaling, error detection and correction, data formatting and address mapping. For example, protocols may be provided according to the seven-layer Open Systems Interconnection model (OSI model), the TCP/IP model, or any other suitable model.

"Comprises" means includes but is not limited to.

"Comprising" means including but not limited to.

"Computer" means any programmable machine capable of executing machine-readable instructions. A computer may include but is not limited to a general purpose computer, mainframe computer, microprocessor, computer server, digital signal processor, personal computer (PC), personal digital assistant (PDA), laptop computer, desktop computer, notebook computer, smartphone (such as Apple's iPhone™, Motorola's Atrix™ 4G, and Research In Motion's Blackberry™ devices, for example), tablet computer, netbook computer, portable computer, portable media player with network communication capabilities (such as Microsoft's Zune HD™ and Apple's iPod Touch™ devices, for example), camera with network communication capability, wearable computer, point of sale device, or a combination thereof. A computer may comprise one or more processors, which may comprise part of a single machine or multiple machines.

"Computer readable medium" means a non-transitory article of manufacture having a capacity for storing one or more computer programs, one or more pieces of data, or a combination thereof. A computer readable medium may include but is not limited to a computer memory, hard disk, memory stick, magnetic tape, floppy disk, optical disk (such as a CD or DVD), zip drive, or combination thereof.

"GUI" means graphical user interface.

"Hard-spheres" means spheres that are impenetrable and cannot overlap in space.

"Having" means including but not limited to.

"Interface" means a portion of a computer processing system that serves as a point of interaction between or among two or more other components. An interface may be embodied in hardware, software, firmware, or a combination thereof.

"I/O device" may comprise any hardware that can be used to provide information to and/or receive information from a computer. Exemplary I/O devices may include disk drives, keyboards, video display screens, mouse pointers, joysticks, trackballs, printers, card readers, scanners (such as barcode, fingerprint, iris, QR code, and other types of scanners), RFID devices, tape drives, touch screens, cameras, movement sensors, network cards, storage devices, microphones, audio speakers, styli and transducers, and associated interfaces and drivers.

"Memory" may comprise any computer readable medium in which information can be temporarily or permanently stored and retrieved. Examples of memory include various types of RAM and ROM, such as SRAM, DRAM, Z-RAM, flash, optical disks, magnetic tape, punch cards, EEPROM, and combinations thereof. Memory may be virtualized, and may be provided in or across one or more devices and/or geographic locations, such as RAID technology, for example.

"Model" means a representation of a material, structure, or behavior thereof configured to promote understanding or analysis of such material, structure, or behavior. A model may serve a useful purpose of educating one or more people on the principles governing particle structure and behavior and may also be used as a predictive tool to predict the characteristics and behavior of various materials and structures. A model may take the form of a physical model, an electronic model, or a combination thereof.

"Network" may comprise a cellular network, the Internet, intranet, local area network (LAN), wide area network (WAN), Metropolitan Area Network (MAN), other types of area networks, cable television network, satellite network, telephone network, public networks, private networks, wired or wireless networks, virtual, switched, routed, fully connected, and any combination and subnetwork thereof. A network may use a variety of network devices, such as routers, bridges, switches, hubs, repeaters, converters, receivers, proxies, firewalls, translators and the like. Network connections may be wired or wireless, and may use multiplexers, network interface cards, modems, ISDN terminal adapters, line drivers, and the like. A network may comprise any suitable topology, such as point-to-point, bus, star, tree, mesh, ring, and any combination or hybrid thereof.

"Program" may comprise any sequence of instructions, such as an algorithm, for example, whether in a form that can be executed by a computer (object code), in a form that can be read by humans (source code), or otherwise. A program may comprise or call one or more data structures and variables. A program may be embodied in hardware, software, firmware, or a combination thereof. A program may be created using any suitable programming language, such as C, C++, Java, Perl, PUP, Ruby, SQL, other languages, and combinations thereof. Computer software may comprise one or more programs and related data. Examples of computer software may include system software (such as operating system software, device drivers and utilities), middleware (such as web servers, data access software and enterprise messaging software), application software (such as databases, video games and media players), firmware (such as software installed on calculators, keyboards and mobile phones), and programming tools (such as debuggers, compilers and text editors).

"Signal" means a detectable physical phenomenon that is capable of conveying information. A signal may include but is not limited to an electrical signal, an electromagnetic signal, an optical signal, an acoustic signal, or a combination thereof.

The term "spatial field" as used herein refers to a physical quantity that may be mapped over space or over space-time. By way of nonlimiting example, physical quantities that may be mapped over space or over space-time include electromagnetic fields, electric fields, magnetic fields, and gravitational fields.

As noted above, quantum structure and behavior are generally understood via "Black Box" methods where inputs and outputs are measured. However, knowledge of the actual inner mechanisms of quantum structure and behavior is noticeably absent. The development of a geometrical model of quantum structure and behavior as described herein provides tools to visualize and teach principles in quantum mechanics. These geometric models further provide tools to understand aspects of the inner workings of quantum mechanics and thus facilitate predictions of material interactions and dynamics and the existence of phenomena that otherwise may not be known or predictable. Accordingly, systems and methods described herein may solve the problem of providing improved methods for visualizing and understanding quantum structure and behavior.

The systems and methods of modeling quantum structure and behavior described herein differ from what currently exists. Currently, no known modeling method allows one to effectively visualize and model diverse quantum structures and behaviors geometrically. However, humans experience and perceive their environment mostly from a geometric perspective. Thus, the ability to model diverse quantum structure and behavior geometrically enables humans to better understand, model, and manipulate the mechanics at work at the quantum level.

In some embodiments, the quantum continuum may be modeled as a compilation of imperfectly packed hardspheres which would energetically prefer to arrange in an equal and symmetrical spatial distribution. In some embodiments, the quantum continuum may be modeled as a compilation of imperfectly packed hard-spheres in the process of equalizing their spatial distribution. This approach allows for a geometric modeling of a driving mechanism believed to be behind many aspects of quantum structure and behavior. The geometric properties that arise from spheres being driven to seek perfect packing effectively model physical phenomena such as, for example, the vacuum continuum, photon energies and angular spin momentum, and the electron charge and mass, and such geometric properties may be extensible to other material attributes.

The methods of modeling quantum structure and behavior described herein constitute a significant improvement over what currently exists. Existing methods generally are probabilistic and not geometric in nature or are limited in breadth as to the types of particles and properties that they can effectively handle. Accordingly, existing methods generally are not capable of modeling quantum phenomena to the level of detail that may be necessary for predicting many outcomes or novel behavior. In contrast, methods described herein may be used to more fully model quantum structure and behavior and may be used to design, produce, and optimize materials, structures, and technologies that are affected by the behavior of photons, electrons, or the vacuum continuum. By way of example, technologies dependent on photons that may benefit from this modeling capability include: quantum cryptography; quantum communication; fiber optic communications; and solar energy collection. Also by way of example, technologies dependent on electrons that may benefit from this modeling capability include: electrical power distribution; computer chip design; high-efficiency battery design; and high-energy photon shielding.

Further examples are provided in joint photon-electron technologies, which may include methods for collecting photon signals via electronic sensors for ground-based, airborne, and satellite communications and radar. Technologies dependent on material modeling that may benefit from this modeling capability include, for example: energy production (fission and fusion); superconducting material development; materials optimized for strength and weight; metals, plastics, and ceramics development; sensor detection technologies; and predictions connecting material properties to the material's chemical composition, micro-structure and crystal structure.

Aspects of some embodiments of methods for modeling quantum structure and behavior described herein may include one or more of the following:
1. Modeling the vacuum continuum as a three-dimensional projection of a field of N-dimensional hard-spheres;
2. Applying the Kepler Conjecture for hard-sphere packing in three dimensions;
3. Extending the space of the three spatial dimensions to higher dimensions by including an energy subspace of additional dimensions;
4. Defining the initial three energy subspace dimensions as the momentum-energy dimension, the mass-energy dimension, and the electromagnetic-energy dimension;
5. Modeling stable particles as locally perfectly packed sets of hard-spheres;
6. Modeling the energy of these particles as the necessary amount of the hard-sphere volume (or other change in geometry) shifted out of the three spatial dimensions into the energy subspace in order for the particle structure to pack stably;
7. Modeling photons as a tetrahelix of spheres akin to the linear stacking of tetrahedra;
8. Rotating the direction of the tetrahelix propagation into the time dimension;
9. Configuring the tetrahelix photon-model to shift into the electromagnetic-energy dimension to avoid sphere overlap when viewed in the spatiotemporal dimensions;
10. Producing a physical quantity, the photon duration, so that the photon-model energy is inversely proportional to its wavelength while maintaining a constant angular spin momentum equal to the reduced Planck Constant h-bar;
11. Modeling the stationary electron as a double-stacked wheel structure in five dimensions which may have two axis hard-spheres and three perimeters of five hard-spheres each;
12. Modeling the mass-energy of the electron as the amount of hard-sphere volume in the electron model that may be shifted into the mass-energy dimension;
13. Modeling the electromagnetic-energy of the electron as the amount of hard-sphere volume in the electron model that may be shifted into the electromagnetic-energy dimension; and
14. If desired, calculating the mass-energy and electromagnetic-energy scale factors so that the energies in the respective energy subspace dimensions agree with known measured energy values. For example, in some embodiments, a normalization scheme may be employed as described in the attached Appendix B, which is incorporated herein by reference.

Figure 7A:
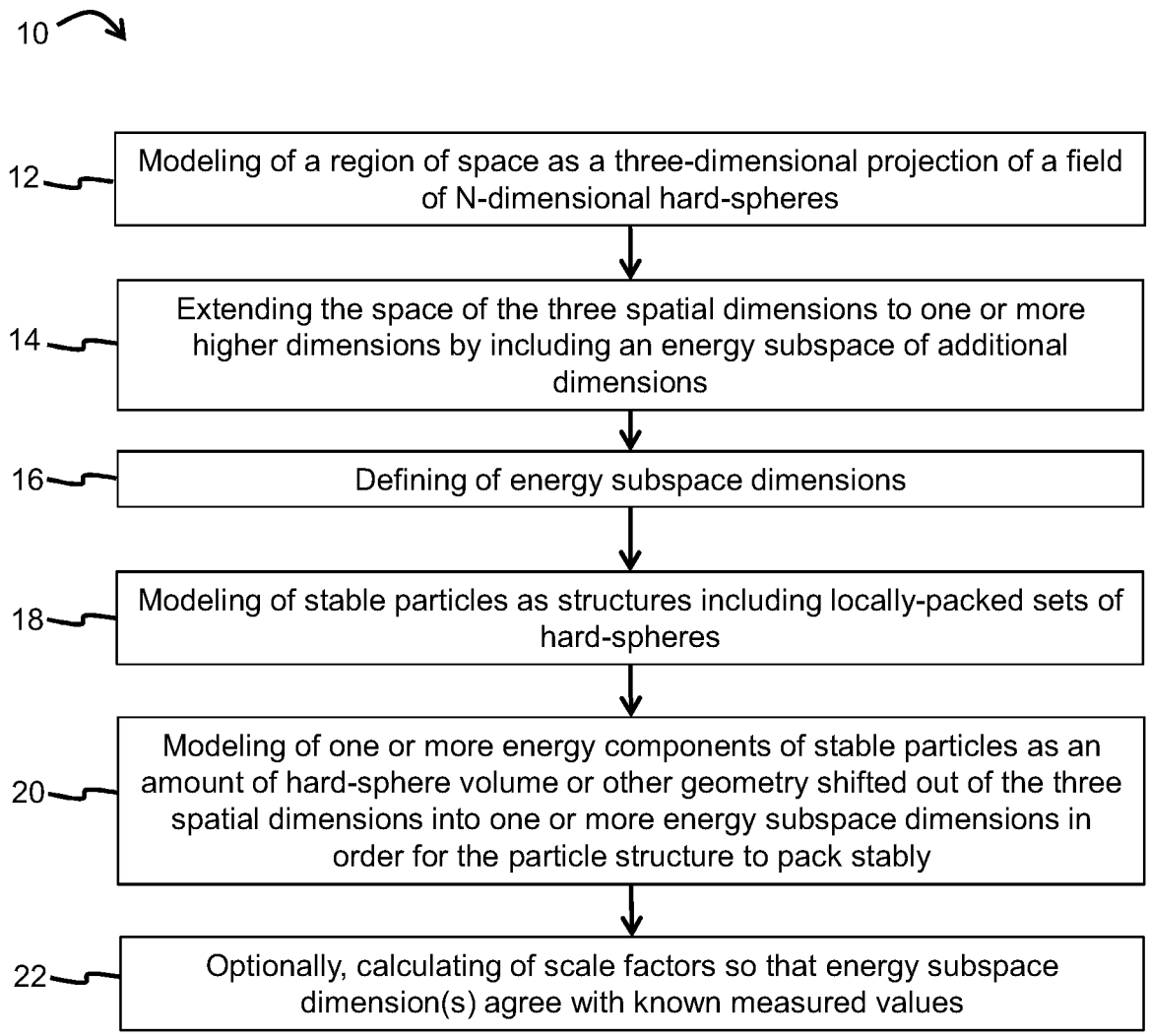
FIG. 7A is a flowchart illustrating a method of modeling quantum structure and behavior.

Referring to FIG. 7A, a method 10 of modeling quantum structure and behavior is shown. In some embodiments, method 10 may include steps that may lay a foundation for modeling of a vacuum continuum and/or for modeling particles as they may exist in the vacuum continuum. In some embodiments, particle structure and behavior may also be modeled for a region or locality that may extend without interruption in one or more modeled dimensions. However, particle structure and behavior may also be modeled in systems that may be bounded and/or filled with a certain medium. For example, models for particle structure and behavior in a vacuum continuum may be applied to various systems or spatial regions, including some that may model infinite free-space as well as others that may be bounded. For example, whereas particles may be modeled in free-space, some models described herein may also account for the behavior of particles in systems where they may be fully or partially confined to one or more finite regions or localities. In some embodiments, methods described herein may be used to model particle behavior in one or more localities or regions of a certain medium. For example, in some embodiments, the behavior of photons in one or more regions of space, including, for example, a medium characterized by a refractive index or characterized in other ways, such as to account for one or more bulk properties of a given medium, may be modeled.

Still referring to FIG. 7A, steps 12, 14, and 16 of method 10 may be executed as part of modeling a vacuum continuum of finite or infinite extent in three spatial dimensions using hard-spheres and other higher dimensions associated with various forms of energy. Those foundational steps (e.g., steps 12, 14, and 16) may be included in some embodiments of other methods described herein.

In some embodiments, method 10 may be used to calculate or determine one or more proportionality or scaling factors. In other embodiments, methods described herein may be applied using predetermined scaling factors. For example, in some embodiments, a method 10 may be executed wherein scaling factors have been predetermined, including, for example, using methods and calculations described in detail herein, including in Appendix B. Scaling factors may be constants relating geometric aspects of hard-spheres to forms of energy described for a given energy subspace dimension. For example, in some embodiments, constants may be used to convert modeling results described herein, including, e.g., results that may be expressed in geometric units of hard-spheres, to other units more typically encountered or used by those skilled in the art, such as energy units recognized as part of the International System of Units (SI). In some embodiments, one or more scaling factors may be applied to models for a single particle or for more than one particle. In some embodiments, the one or more scaling factors may be applied based on predetermined models of particle structure, including, for example, internally self-consistent models described and based on methods described herein. For example, in some embodiments, scaling factors may be based on an internally self-consistent model calibrated using both a hard-sphere model of photons and a hard-sphere model of electrons.

In step 12, a region of space, such as the vacuum continuum, or another medium of space, may be modeled as a three-dimensional projection of a field of N-dimensional hard-spheres. Hard-spheres described herein may also be referred to as Q-spheres. For example, in some embodiments, a three-dimensional field of hard-spheres may be plotted or displayed, such as on a physical or computer generated grid configured to represent a localized region of space of interest for which insight into particle behavior is desired. When visualizing a field of Q-spheres, a user may be given an option to increase the size and/or density representation of the spheres (e.g., a user may make the spheres more or less dense and/or opaque). For example, a user may be given an option to adjust the size and/or density representation of the spheres by rotating a computer mouse scrolling wheel, selecting a desired region of spheres by defining a rectangle or other shaped box on a display screen in order to zoom in on a desired region, choosing a selectable setting included in one or more drop-down menus selectable in a windows-based display, using another suitable method for adjusting the size and/or density representation of spheres, and combinations thereof.

In step 14, the space of the three spatial dimensions may be extended to higher dimensions by including an energy subspace of one or more additional dimensions. As indicated in step 16, the subspace dimensions may be defined to model one or more energy components. For example, in some embodiments, subspace dimensions may be defined for momentum-energy, mass-energy, electromagnetic-energy, and/or any combination of the subspace dimensions thereof.

In step 18, stable particles may be modeled as locally perfectly packed sets of hard-spheres. Stable particles may be visualized or represented in various ways within a modeled space or locality. For example, in some embodiments, locally perfectly packed sets of hard-spheres which comprise a stable particle may be demarcated from hard-spheres that are not locally perfectly packed using shading or by displaying perfectly packed sets of hard-spheres in a distinguishing color or line weight. Other suitable ways of visualizing locally perfectly packed sets of hard-spheres which comprise stable particles may also be used. By way of nonlimiting example, stable particles, which may be further modeled in various embodiments herein, may include photons and electrons. For example, in some embodiments, photons may be modeled as a tetrahelix of spheres akin to the linear stacking of tetrahedra. In some embodiments, electrons may be modeled as a double-stacked wheel structure.

In step 20, energy of stable particles may be modeled as an amount of hard-sphere volume (or other change in geometry, such as area or length, for example) shifted out of the three spatial dimensions into one or more of the energy subspace dimensions in order for a particle structure to pack stably. To display an amount of hard-sphere volume or other change in geometry, various techniques may be used. For example, in some embodiments, an amount of hard-sphere volume shifted into one or more energy subspace dimensions may be depicted by shading the shifted volume in a manner to differentiate the shifted volume from the total volume of all modeled hard-spheres for a given particle. In some embodiments, together with a visual representation of an amount of hard-sphere volume shifted into one or more energy subspace dimensions a calculated hard-sphere volume may further be determined. Moreover, in some embodiments, one or more scaling factors may be used to convert a shifted hard-sphere volume (or other geometric change) to a unit of energy (or observable property related to energy) in units recognizable to those skilled in the art, such as SI units. For example, in some embodiments, the shifting of particle structures into the energy subspace may be used to model one or more energy components of one or more particles.

In some embodiments, a calculation of an amount of hard-sphere volume may be an exact or mathematical solution. Alternatively, a calculation of an amount of hard-sphere volume shifted out of one or more spatial dimensions and into an energy subspace may be estimated using any suitable computational mathematics software that includes geometrical and/or linear algebraic capabilities. For some structures (e.g., locally-packed sets of hard-spheres), mathematical solutions for an amount of shift necessary for a set of particles or individual particles among a set of particles to achieve perfect packing may have been previously calculated or estimated, such as in one or more geometric proofs or conjectures. In some embodiments, those solutions or estimates of those solutions may be stored in one or more units of computer memory and applied (e.g., as described in step 20) as appropriate to model one or more components of particle energy. In some embodiments, a computer suitably programmed to calculate an amount of hard-sphere volume may be configured to execute any of the equations further described herein, including, for example, equations described under the subsection marked as Energy Quantification.

In step 22, in some embodiments, modeling of quantum structure may further include calculation of one or more scale factors. For example, scale factors may be determined so that an amount of hard-sphere volume or other geometry shifted out of the three spatial dimensions into one or more energy subspace dimensions may be converted to an amount of energy (or observable particle property related to energy) in order to agree with known or empirically measured values. For example, as may be additionally understood as described in embodiments wherein photons and electrons are modeled as part of steps 18 and 20, in some embodiments, scaling factors or proportionality constants may be determined so that particle models possess energy attributes equal to experimentally measured quantities. In some embodiments, scaling factors may be used to convert an amount of hard-sphere volume or other geometry shifted out of the three spatial dimensions into one or more energy subspace dimensions to a measured or empirical value of energy (or observable particle property related to energy) in a medium characterized by some bulk property associated with a certain medium.

As may be understood from the Kepler Conjecture, a three-dimensional continuum model of hard-spheres cannot pack perfectly. Accordingly, hard-spheres within a modeled region may be in constant flux attempting to achieve a perfect packing arrangement. The inclusion of an energy subspace (e.g., as described in steps 14 and 16) may provide freedom by which the packing problem may be remedied by expanding from the three-dimensional spatial subspace into a higher dimensional space. For example, the shifting of a hard-sphere into an energy subspace may model the presence of measurable energy for a hard-sphere or set of hard-spheres. Moreover, the shifting mechanism may be due to the imperfect packing issues in the three-dimensional spatial subspace. In some embodiments, the particle-model constraints (e.g., steps 18 and 20) may set the conditions for the existence of a stable particle, e.g., that the hard-spheres in the particle model must pack perfectly, and as a result the hard-spheres in the particle structure may necessarily need to be shifted into the energy subspace, thus manifesting in measurable momentum, mass, or electromagnetic energies. In some embodiments, transient motions away from perfect packing may be accounted for in models described herein.

FIG. 7B shows an embodiment of a method 24 for modeling properties of one or more photons. For example, in some embodiments, photons may be included among stable particles modeled in method 10. For example, photons may be modeled (sometimes in combination with electron models such as described in FIG. 7C) to facilitate development of internally consistent models useful in generating scaling factors suitable to convert volume shifts into other units more recognizable to those skilled in the art. In some embodiments, method 24 may also be executed independently from method 10. In some embodiments, one or more scale factors may be applied or estimated from predetermined values generated in one or more self-consistent models of particle structure as described herein. For example, method 24 may include a step wherein one or more scale factors are applied so that volume or geometry shifts into one or more energy subspace dimensions may agree with known measured values.

Still referring to FIG. 7B, in step 26, a photon may be modeled as a locally-packed set of hard-spheres. For example, in some embodiments, a photon may be modeled as a tetrahelix of spheres which may be linearly stacked tetrahedra extending along a straight axis trajectory. In some embodiments, a photon may be modeled as linearly stacked tetrahedra possessing a length. For example, in a vacuum continuum and/or where a photon may propagate in an uninterrupted path, the length may be of infinite extent in a straight trajectory. Various properties or characteristics of photons may then be modeled geometrically. For example, in some embodiments, the wavelength of the tetrahelix may be used to model the wavelength of a photon. Moreover, in some embodiments, the helical structure of the tetrahelix may further supply a mechanism to account for the angular spin momentum of a photon. In step 28, one may rotate the tetrahelix propagation into the time dimension, which may involve a shift into the electromagnetic-energy dimension. For example, the tetrahelix photon-model may include the partial rotation of one spatial dimension into the time dimension so that the tetrahelix photon-model is configured to reside in three spatial dimensions, the time dimension, and the electromagnetic-energy dimension. In step 32, a physical quantity, referred to herein as the photon duration, may be produced. The photon duration may be a quantity which, in some embodiments, may necessarily arise from the photon model when the physical constraints of the photon are applied, wherein photon energy is inversely proportional to its wavelength multiplied by the Planck Constant (h) and the speed of light, and the photon angular spin momentum is constant for photons of any wavelength and equal to the reduced Planck Constant h-bar. In some embodiments, an interpretation of the photon duration may be that the photon energy is observed during a small time interval in a localized region of the tetrahelix, and the duration of that observation (e.g., time interval) may be invariant with respect to the photon's wavelength.

Figure 7C:
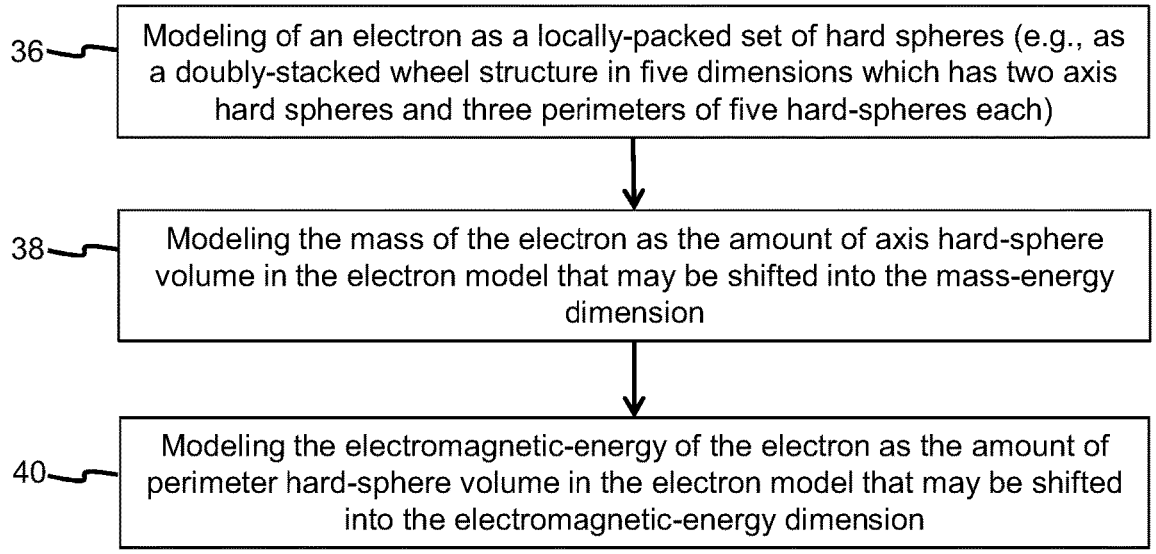
FIG. 7C is a flowchart illustrating a method of modeling quantum structure and behavior for electrons.

Referring to FIG. 7C, in some embodiments, electrons may be included among stable particles modeled in method 10 (e.g., as described in steps 18 and 20). FIG. 7C shows an embodiment of a method 34 for including a stationary electron model in method 10. In some embodiments, method 34 may also be executed independently from method 10. For example, method 34 may be applied in a method for modeling of one or more electron properties in one or more localities of space. In some of those embodiments, one or more scale factors may be applied or estimated from predetermined values generated in one or more self-consistent models of particle structure as described herein. For example, method 34 may include a step wherein one or more scale factors are applied so that one or more energy subspace dimensions agree with known measured values.

Still referring to FIG. 7C, in a step 36, an electron may be modeled as a locally-packed set of hard-spheres. For example, in some embodiments, an electron may be modeled as a double-stacked wheel structure having 17 hard-spheres including two axis hard-spheres and three pentagonal perimeters of five hard-spheres each. In order that this structure may pack perfectly, the hard-spheres may be shifted into an energy subspace. In some embodiments, the geometry may dictate that portions of the axis hard-spheres must shift into a mass-energy dimension (as shown in step 38) and that portions of the perimeter hard-spheres must be shifted into a electromagnetic-energy dimension (as shown in step 40). In some embodiments, these energy manifestations may dictate that the electron model must have both mass-energy and electromagnetic-energy.

In some embodiments, steps included in FIGS. 7A, 7B and 7C may work together to provide an internally self-consistent model of quantum structure and behavior. As described herein, the models for the stable particles (e.g., photon and electron) may be logically derived based on a quantum continuum model. In some embodiments, without the framework of the continuum model (and the observation of the Kepler Conjecture wherein imperfect packing of hard-spheres in three dimensions is shown), the drive for stable particles to pack perfectly and to reside in a higher dimensional space may not be a logical conclusion. In some embodiments, the stable particle models (e.g., photon and electron) may be completely consistent with the continuum model described herein and exhibit known attributes of the particles. As described in methods 10, 24, and 34, a completely self-consistent model of the vacuum, photon, and electron may be constructed that produces particle energies which agree with experimentally measured values, including, for example, the fine structure constant.

In some embodiments, to have stable particles in the midst of an unstable continuum, the hard-spheres comprising the stable particles may pack perfectly. Examination of the possible local geometric structures that pack perfectly may yield a set of possible models. When the known attributes of the photon in a vacuum are considered (e.g., it travels linearly and infinitely; it possesses a set and measureable wavelength; it possesses angular spin momentum), a logical choice for a photon model is the simplest locally-packed set of spheres that possesses those properties, namely, a tetrahelix of hard-spheres. Additionally, the fact that a photon has electric and magnetic energy, but no mass, leads to the logical conclusion that the photon tetrahelix is shifted solely into the electromagnetic-energy dimension. In the case of the stationary electron model, structures modeled herein may account for the observed properties of the electron; that is, models described herein may account for the manifestation of both mass-energy and electromagnetic-energy. It is known that charge is quantized at a value of ⅓ of the charge of an electron. Therefore, the electron model structure may logically have three discrete structures that carry charge. The simplest, best fit from the basic geometrical structures is that the electron be modeled as a double-stacked wheel that carries both mass-energy and electromagnetic-energy.

In some embodiments, modeling the vacuum continuum as a field of hard-spheres in three dimensions may serve as a foundational basis for additional features of the models described herein. For example, the fact that hard-spheres in the model do not pack perfectly may drive subsequent aspects of particulate modeling. For example, in some embodiments, stable particles described herein may include a group of hard-spheres that packs perfectly in a local sense. In some embodiments, stable particles described herein may include a group of hard-spheres that is locally stably packed. As used herein, the term "stable packing" or "stably packed" may be used to refer to locally perfect packing of hard-spheres or locally substantially perfect packing of hard-spheres. For example, locally perfect packing of hard-spheres may include a group of hard-spheres which may fill a maximum allowable volume of a locality of space. A locally substantially perfectly packed system may fill at least about 95% of the maximum allowable volume filled by perfectly packed hard-spheres in the locality of space. In some embodiments, a stably packed system may fill at least about 99%, about 98%, or about 95% of the maximum allowable volume filled by perfectly packed hard-spheres in a locality of space. A shift of a hard-sphere into a higher dimension as described herein may involve rotation, translation, or a combination thereof. In some embodiments, other geometrical structures may be considered as models for other particles including photons and electrons. However, particles generally may be modeled as the simplest possible geometric structures that satisfy observed particle attributes. For example, preference may be given to those geometric structures that include local packing of the fewest number of hard-spheres. Of course, other more complicated structures may also satisfy the known attributes. However, the concept that suitable structures meet certain attributes (e.g., for photons, that such are linear when uninterrupted, possess a set and measureable wavelength, and possess angular spin momentum) may limit the possible number of structures that may serve as useful models.

In some embodiments, other particle models in addition to photons and electrons, including, for example, quarks, protons, neutrons, and other particles, may be added to the model set. In some embodiments, to keep the model set self-consistent, alternate geometric structures associated with the photon and/or electron may need to be modeled.

In some embodiments, models for stable particles may follow directly from the foundational assumption made in the vacuum continuum model. However, the photon and electron models may be independent. Thus, for example, the electron model may be developed before developing the photon model, or vice versa. Moreover, the provided self-consistent models for the photon and electron may serve to supply calibration factors for other models, including, for example, models associated with how individual particles or sets of particles behave within a system of interest.

In some embodiments, a mathematically consistent model of the vacuum continuum, photon, and electron may be produced using methods 10, 24, and/or 34 described above. Based on the steps described therein, a geometrical model set may be constructed by which technological predictions may be made. An example of this is referred to herein as the photon extent, a previously unknown concept, which may necessarily arise in some embodiments of the models described herein. Moreover, embodiments that consider other particles (e.g., protons, neutrons, hydrogen, other atoms, or the like) may additionally be used for other predictions. The models described herein have significant value when seeking to optimize a physical technological system. For example, instead of experimentally trying a large set of material constructs, models as described herein could be used to predict optimal construct configurations that could then be tested much more readily. For example, as noted previously, in some embodiments, some models described herein may be used to design and produce any technology that may be affected by the behavior of photons, electrons, or the vacuum continuum.

Modeling of a Continuum or Other Locality and Particle Models

In some embodiments, the quantum continuum or a finite locality of space may be modeled as a field, grid, or compilation of imperfectly packed hard-spheres. For example, in some embodiments, a field of packed hard-spheres may be displayed as a color-coded, clear, or semi-clear grid. Where a continuum of hard-spheres is viewed in combination with stable particles, stable particles may be displayed in a different color-code or demarcated from spheres outside of the particle boundaries with some other distinguishing designation or pattern. In this description, where reference is made to fundamental objects or hard-spheres included in a vacuum continuum or other spatial locality, the objects may be referred to as Q-spheres. The Q-sphere may be modeled as an N-dimensional sphere that may be agnostic in preference to any certain direction in the N-dimensional manifold that it resides in. As used herein, the term N-sphere refers to a Q-sphere having N dimensions. Accordingly, it follows that Q-spheres may possess spherical symmetry. In some embodiments, a Q-sphere center may be located anywhere in the four spatiotemporal dimensions. A Q-sphere may further exhibit measureable energy when its center is shifted away from zero along one or more dimensions. For example, in some embodiments herein, when a Q-sphere or group of Q-spheres is shifted anywhere into an energy subspace dimension, an energy associated with the shifted Q-sphere may then become finite and measurable.

For example, in some embodiments, Q-spheres may be considered as units of imaginary energy. If a Q-sphere or group of Q-spheres is shifted into one or more of the energy subspace dimensions, the energy associated with a Q-sphere or with a group of Q-spheres may then become real and measurable.

In considering the space-filling properties of Q-spheres, as may be shown in multi-dimensional geometry, the transition from two to three dimensions is where the perfect packing of N-spheres goes awry. "Perfect packing" as used herein refers to a configuration wherein every sphere touches each of its neighboring spheres and therefore is not free to move. In two-dimensional Euclidean space, dense packing of 1-spheres (circles) is perfect where the highest density is achieved with a hexagonal packing arrangement, in which the centers of the circles are arranged in a hexagonal lattice, as shown in FIG. 1. Particularly, each 1-sphere is surrounded by six other 1-spheres and touches each of them at one point. The packing density of this arrangement is $\pi/(12)^{1/2}$, meaning that approximately 90.69% of the plane is filled by the 1-sphere interiors. However, when extended to three dimensions and the packing of 2-spheres is examined, the densest packing solution is more complicated.

In what is known as the Kepler Conjecture, the 17th century mathematician Johannes Kepler hypothesized that no arrangement of equally-sized spheres filling space has a greater average density than that of the cubic close packing (face-centered cubic) and hexagonal close packing arrangements. These packings both have a density of $\pi/(18)^{1/2}$ (≈74.05%). A completed formal proof confirming the Kepler Conjecture has recently been announced (on Aug. 10, 2014) by a project called Flyspeck led by mathematician Thomas Hales (available at https.//code.google.com/p/flyspeck/wiki/AnnouncingCompletion). The contents of such proof are herein fully incorporated by reference. This proof confirms that the densest 2-sphere packings do not exhibit perfect packing. Since the 2-spheres do not touch all their neighbors, they can move.

Figure 2A:
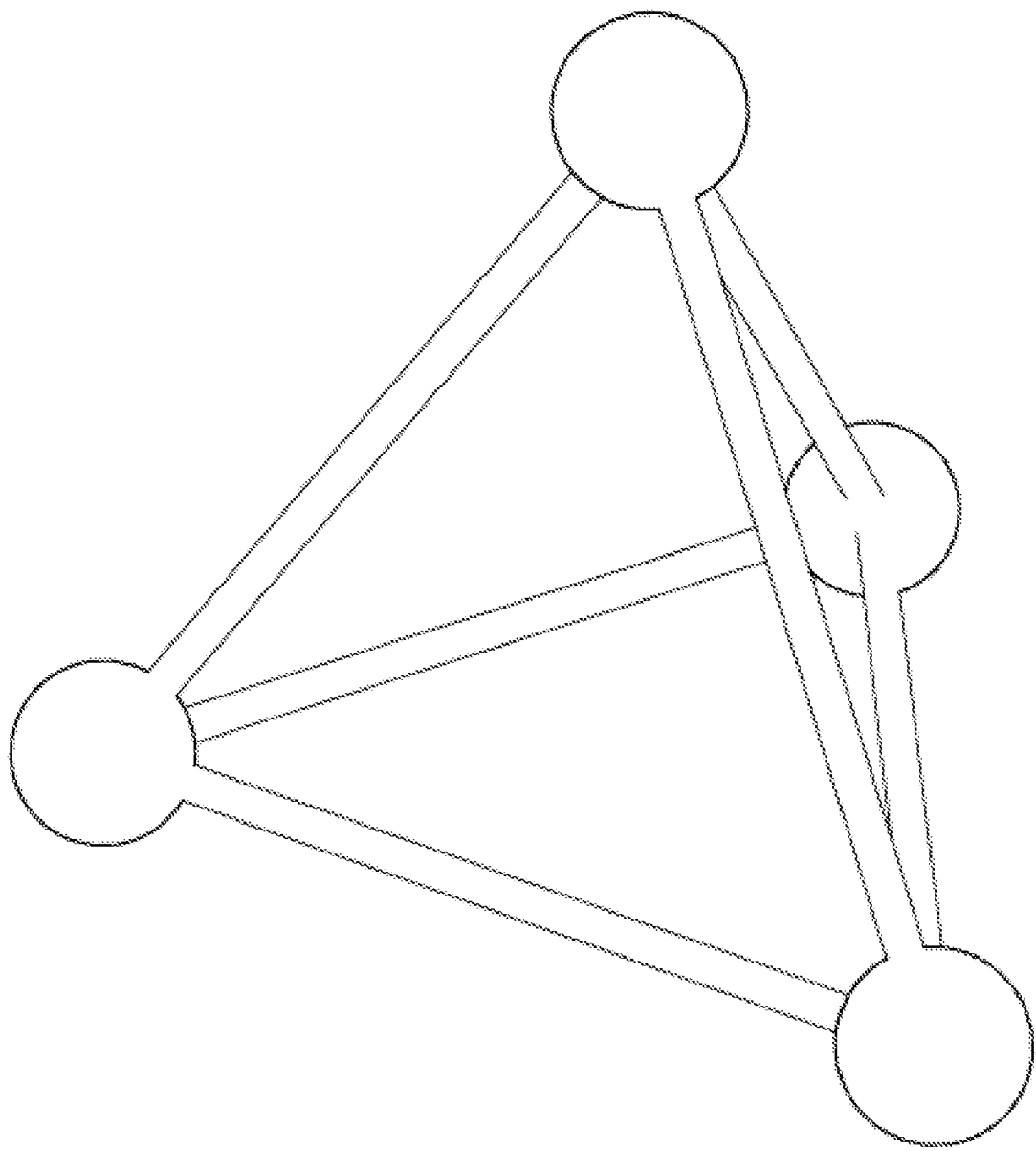
FIG. 2A is a schematic diagram of a regular tetrahedron.
Figure 2B:
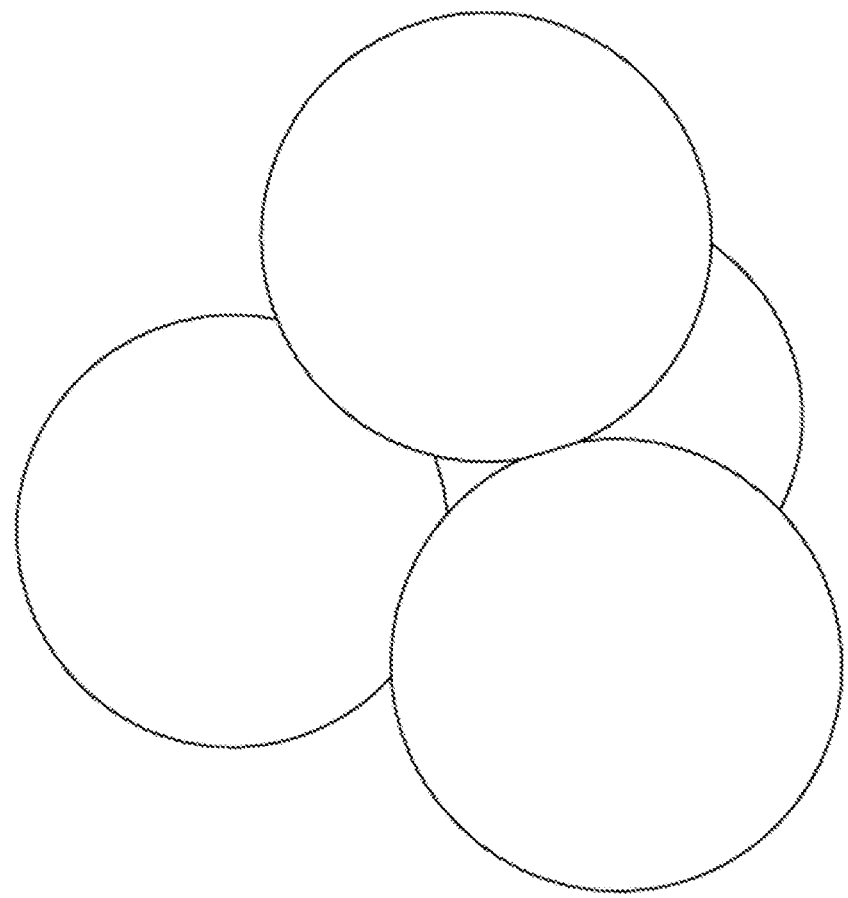
FIG. 2B is a schematic diagram of perfectly packed 2-spheres.

Accordingly, a Q-sphere arrangement in a vacuum continuum (or other system that may approximate a vacuum) may be modeled as an unstable system that is eternally in flux and in pursuit of perfect packing. Moreover, this model provides an intriguing way to model particles. In some embodiments, to physically manifest as a particle possessing energy, it may be assumed that a localized region or group of Q-spheres comprising the particle may pack perfectly. The smallest quantum of perfect 2-sphere packing is four spheres wherein the spheres are arranged so that the centers of the spheres form a regular tetrahedron. Accordingly, structures including regular tetrahedra are described herein when constructing particle models that exhibit perfect local packing. The correspondence between a regular tetrahedron and four perfectly packed spheres is shown in FIGS. 2A and 2B. Before further describing exemplary particle models, a more detailed, geometric description of the Q-sphere is provided.

The Q-Sphere

As used herein, a Q-sphere may refer to an N-dimensional sphere which resides in both the spatiotemporal dimensions and one or more energy subspace dimensions simultaneously. In some embodiments, methods described herein may model the Q-sphere as an N-dimensional sphere. For example, in some embodiments, methods described herein may model the Q-sphere in seven dimensions, which may include three spatial dimensions, the time dimension, and three energy dimensions: momentum-energy, mass-energy, and electromagnetic-energy. In some embodiments, methods described herein may consider electric and magnetic energy together represented by a single energy dimension which may be caused by the particle attribute of charge.

In some embodiments, Q-spheres may not fill the whole seven-dimensional space but rather attempt to fill the three spatial dimensions (as well as the time dimension in embodiments considering Q-spheres across time). The lowest (zero) energy state of the Q-spheres is when the centers of the Q-spheres are at any location in the spatiotemporal dimensions but are at zero in the energy dimensions. A lower-dimensional analogy, which may be provided for instructional purposes, may be a field of 2-spheres floating on the surface of a liquid that may, for example, have twice the density of the 2-spheres. In such example, the 2-spheres may move up or down from the surface but energetically prefer to reside at the surface, halfway submerged.

Figure 11:
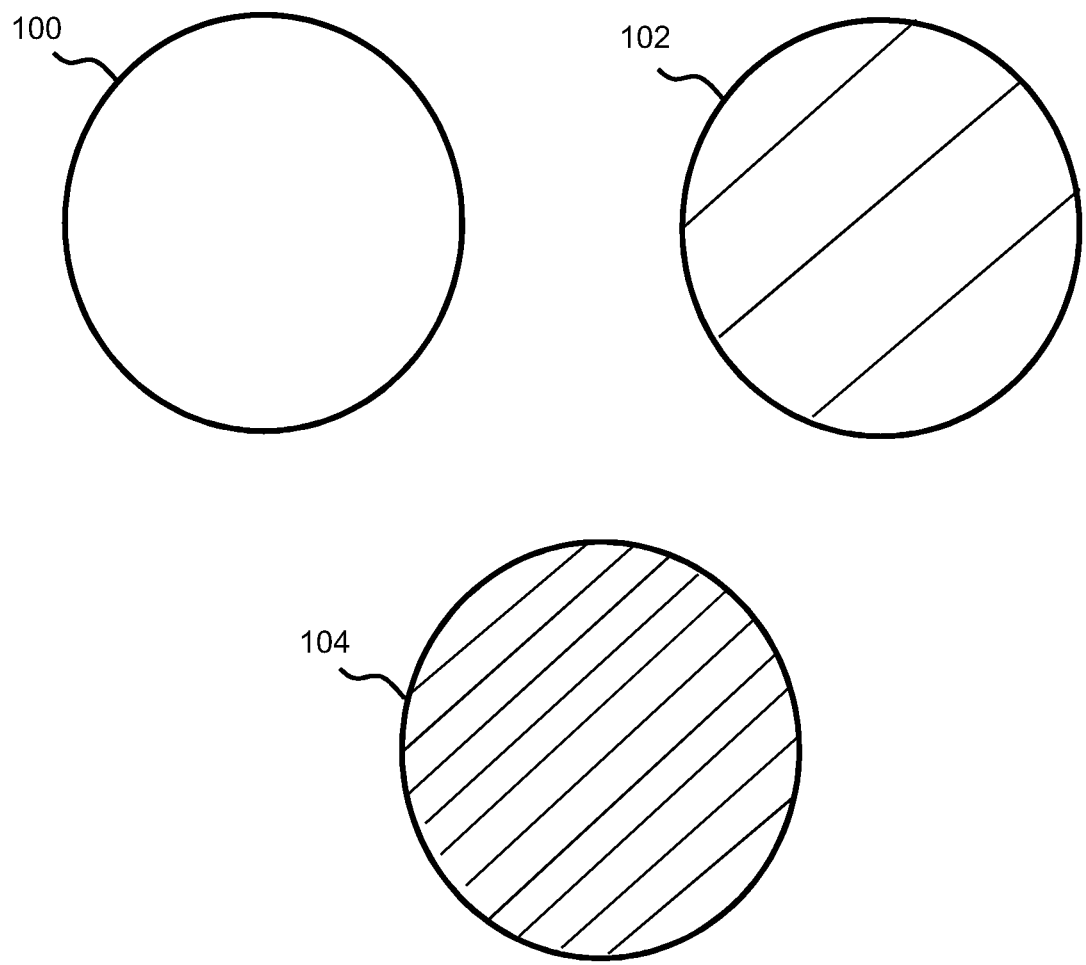
FIG. 11 is a schematic diagram illustrating ways of coding a Q-sphere to visualize an amount of shift of a Q-sphere geometry into an energy dimension.

The parameterized equation for the surface area of a seven-dimensional Q-sphere may be expressed as shown in Equation (1):

$$S = \begin{cases} V_x + r\cos(\phi_1)\sin(\phi_2)\sin(\phi_3)\sin(\phi_4)\sin(\phi_5)\sin(\phi_6) \\ V_y + r\sin(\phi_1)\sin(\phi_2)\sin(\phi_3)\sin(\phi_4)\sin(\phi_5)\sin(\phi_6) \\ V_z + r\cos(\phi_2)\sin(\phi_3)\sin(\phi_4)\sin(\phi_5)\sin(\phi_6) \\ V_t + r\cos(\phi_3)\sin(\phi_4)\sin(\phi_5)\sin(\phi_6) \\ V_p + r\cos(\phi_4)\sin(\phi_5)\sin(\phi_6) \\ V_w + r\cos(\phi_5)\sin(\phi_6) \\ V_q + r\cos(\phi_6) \end{cases} \quad (1)$$

where r is the Q-sphere radius. The center of the Q-sphere is located at Vx, Vy, and Vz in the spatial dimensions, Vt in the time dimension, and Vp, Vw, and Vq in the momentum-energy, mass-energy, and electromagnetic-energy dimensions, respectively. In some embodiments herein, modeling of Q-spheres and particles modeled based on Q-sphere packing may include displaying some number of selected Q-spheres and representing selected Q-spheres in up to three selectable dimensions including any number of dimensions shown in Equation (1). A user may further select a combination of dimensions appropriate for visualizing shifts between dimension combinations. For example, higher numbers of dimensions may be visualized simultaneously by color-coding shifts into the different energy dimensions, e.g., Q-spheres shifted into the mass-energy dimension may be colored different shades of blue proportional to the shift amount, and Q-spheres shifted into the electromagnetic-energy dimension may be colored different shades of red proportional to that shift amount. By way of nonlimiting example, other ways of visualizing shifts into one or more energy dimensions may include providing variable texture, line-weight, cross hatching, fill-pattern density, and combinations thereof to a Q-sphere that reflects a degree or level of shift. FIG. 11 shows, for example, a Q-sphere (100) as it may be displayed without significant shift, a Q-sphere (102) as it may be displayed at a first level of shift, and a Q-sphere (104) as it may be displayed at a second level of shift which may be greater than the first level. Where a Q-sphere may be shifted into more than one energy dimension, visual representations may be provided that may allow a user to readily ascertain a magnitude of shift in different ones of the more than one energy dimension. For example, a first shift into one dimension may be indicated by a color code and a second shift into another dimension may be indicated by a line weight or change in texture.

If 2-spheres packed perfectly in the three spatial dimensions, the lowest instantaneous energy state would be where Vp=Vw=Vq=0 for all Q-spheres and there would effectively be zero energy in the whole system. However, since 2-spheres do not pack perfectly in three spatial dimensions, there are non-zero shifts into the energy dimensions. In some embodiments, this mechanism may be modeled and used to determine finite and measurable energies for modeled particles.

So as geometric structures and their packing characteristics in three dimensions are examined and analyzed, methods described herein may be temporarily considering the instantaneous zero energy state, which is described by the three spatial dimensions. To progress towards the particle models described in some embodiments herein, geometrical structures built from regular tetrahedra, along with their attributes, are examined. In some embodiments, particles are modeled as geometrical structures built from regular tetrahedra, including the Tetrahelix, the Star, and the Wheel, which are described below.

The Tetrahelix

Figure 3A:
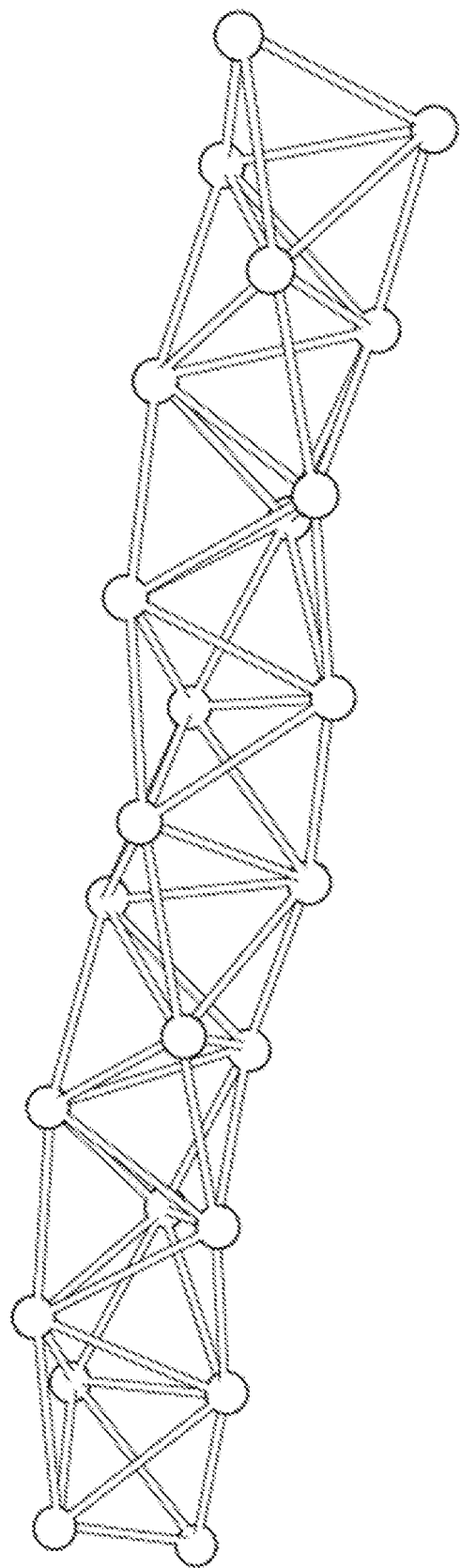
FIG. 3A is a schematic diagram of a tetrahelix made of tetrahedra.
Figure 3B:
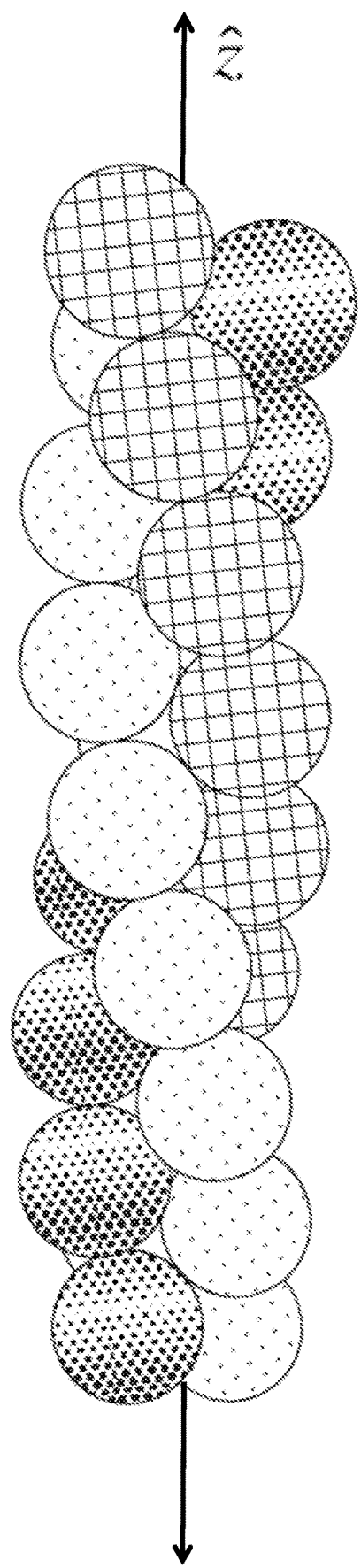
FIG. 3B is a schematic diagram of a tetrahelix made of spheres.

As shown in FIG. 3A, the tetrahelix structure is a linear stacking of tetrahedra. Geometric aspects of linearly stacked tetrahedra were originally described by the famous geometer H. S. M. Coxeter (H. S. M. Coxeter, 1974. Regular Complex Polytopes, Cambridge University), the disclosure of which is herein fully incorporated by reference. The tetrahelix structure has several intriguing features. For one, the edges that belong to a single tetrahedron in the chain form three intertwined helices (legs), and each of these legs rotates around a central axis which is linear. Consequently, as the tetrahelix grows by adding tetrahedra, the net progression is linear, i.e., the tetrahelix axis follows a linear trajectory. Secondly, there are two chiral forms of the tetrahelix: one where the intertwined helices wind clockwise, and one where they wind counterclockwise. Lastly, the tetrahelix is not rotationally repetitive, i.e., the helical pitch of each successive tetrahedron is not a rational fraction of $2\pi$. Thus, there is never a return to a perfect multiple of 27 where any two tetrahedra possess the exact same orientation. If spheres with diameters equal to the distance between neighboring vertices are placed at the vertices of the tetrahelix, the result is a locally perfectly-packed sphere structure, as shown in FIG. 3B. That structure is originally attributed to A. H. Boerdijk (A. H. Boerdijk, 1952. Philips Res. Rep. 7, 30), the disclosure of which is herein fully incorporated by reference. In this sphere packing, each sphere touches each of six neighbors.

The vertices of the tetrahelix may be represented in a parameterized equation which illuminates the linear propagation attribute mentioned above. In some embodiments, the tetrahelix may be scaled so that each neighboring vertex is a distance of one unit away. Assuming propagation is along the z direction, the equation for the nth vertex may then be described as:

$$(x_n, y_n, x_n) = a\cos(n\theta), a\sin(n\theta), nb \quad (2)$$

where $$a = \frac{3\sqrt{3}}{10}; b = \frac{1}{\sqrt{10}}; \text{ and } \theta = \cos^{-1}\left(-\frac{2}{3}\right) \quad (3)$$

A value referenced herein is the tetrahelix wavelength, which is the parameterized linear distance covered as the three intertwined legs make a full $2\pi$ rotation around the central axis. Each leg is formed from every third vertex in the tetrahelix Equation (2). The equation for the $k^{th}$ vertex of each of the three legs is $$(x_k, y_k, z_k)_1 = (a\cos(3k\theta), a\sin(3k\theta), 3kb) \quad (4)$$
$$(x_k, y_k, z_k)_2 = (a\cos((3k+1)\theta), a\sin((3k+1)\theta), (3k+1)b)$$
$$(x_k, y_k, z_k)_3 = (a\cos((3k+2)\theta), a\sin((3k+2)\theta), (3k+2)b)$$

where a, b, and θ are the same as listed in Equation (3).

From Equation (4), one may calculate the value of the tetrahelix wavelength. The calculation should account for that fact that the actual tetrahelix leg makes a small angular rotation because three times θ is greater than $2\pi$. Accordingly, the fractional rotation of the leg is $3\cos^{-1}(-\frac{2}{3})-2\pi$. So, the fractional value of k where a full rotation occurs is where $(3\theta - 2\pi)k_{2\pi} = 2\pi$ This value is $$k_{2\pi} = \frac{2\pi}{3\cos^{-1}\left(-\frac{2}{3}\right) - 2\pi} \quad (5)$$

Thus the linear distance traveled is $$l_0 = 3bk_{2\pi} = 3b\left(\frac{2\pi}{3\cos^{-1}\left(-\frac{2}{3}\right) - 2\pi}\right) \quad (6)$$

resulting in the value $$l_0 = 9.639200713162396 \quad (7)$$

This value $l_0$ is the wavelength of the tetrahelix in a length unit determined by the diameter of the spheres.

The Star

Figure 4A:
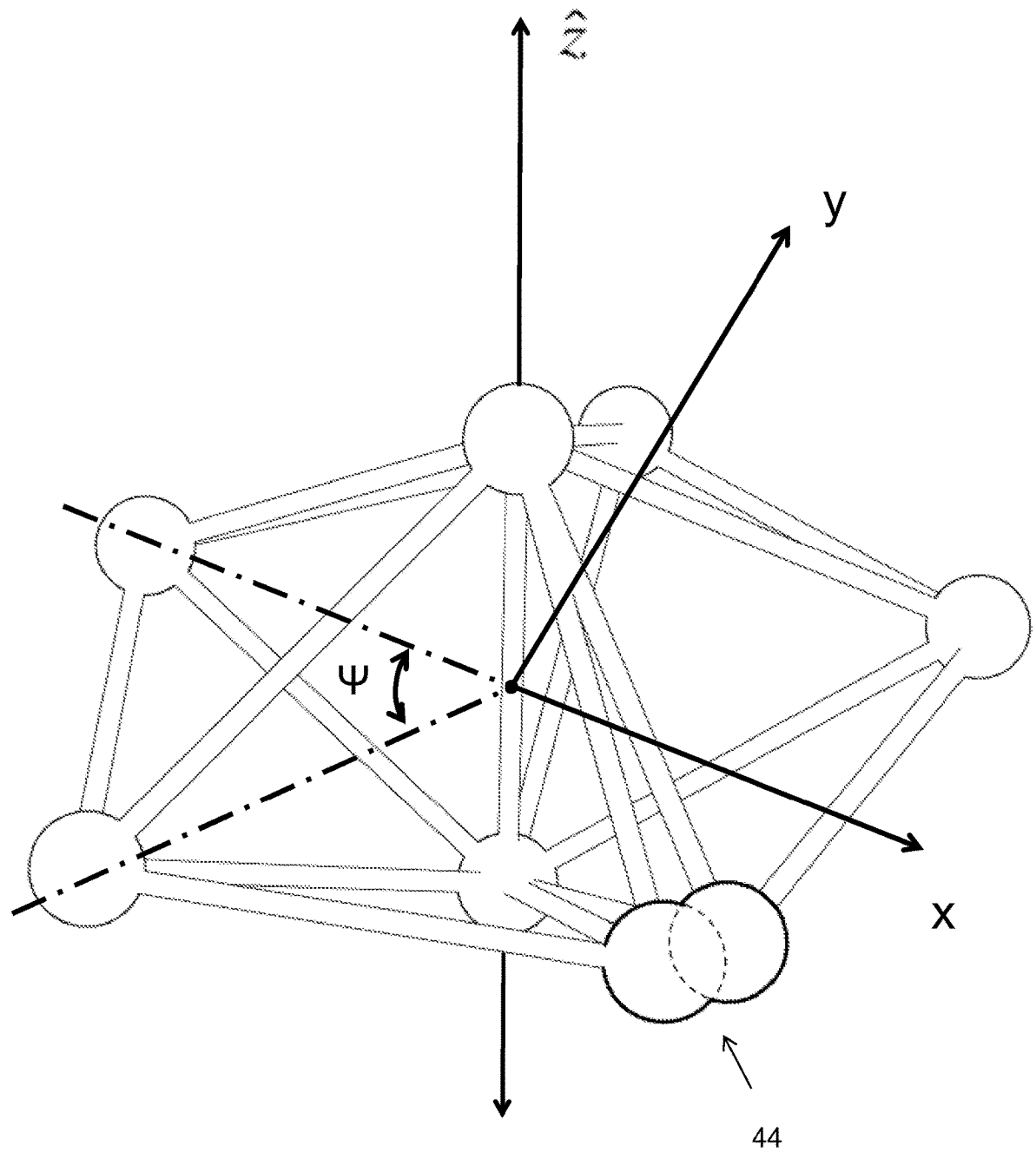
FIG. 4A is a schematic diagram of a star formed from tetrahedra.

In contrast to the tetrahelix, which in some embodiments may extend linearly from $-\infty$ to $\infty$, the Star is a spatially localized structure built from tetrahedra that all share one edge, which forms the axis of the Star. To simplify analysis of the Star, it may be constructed so that the origin is at its center and its axis is along the z direction, as shown in FIG. 4A.

Figure 4B:
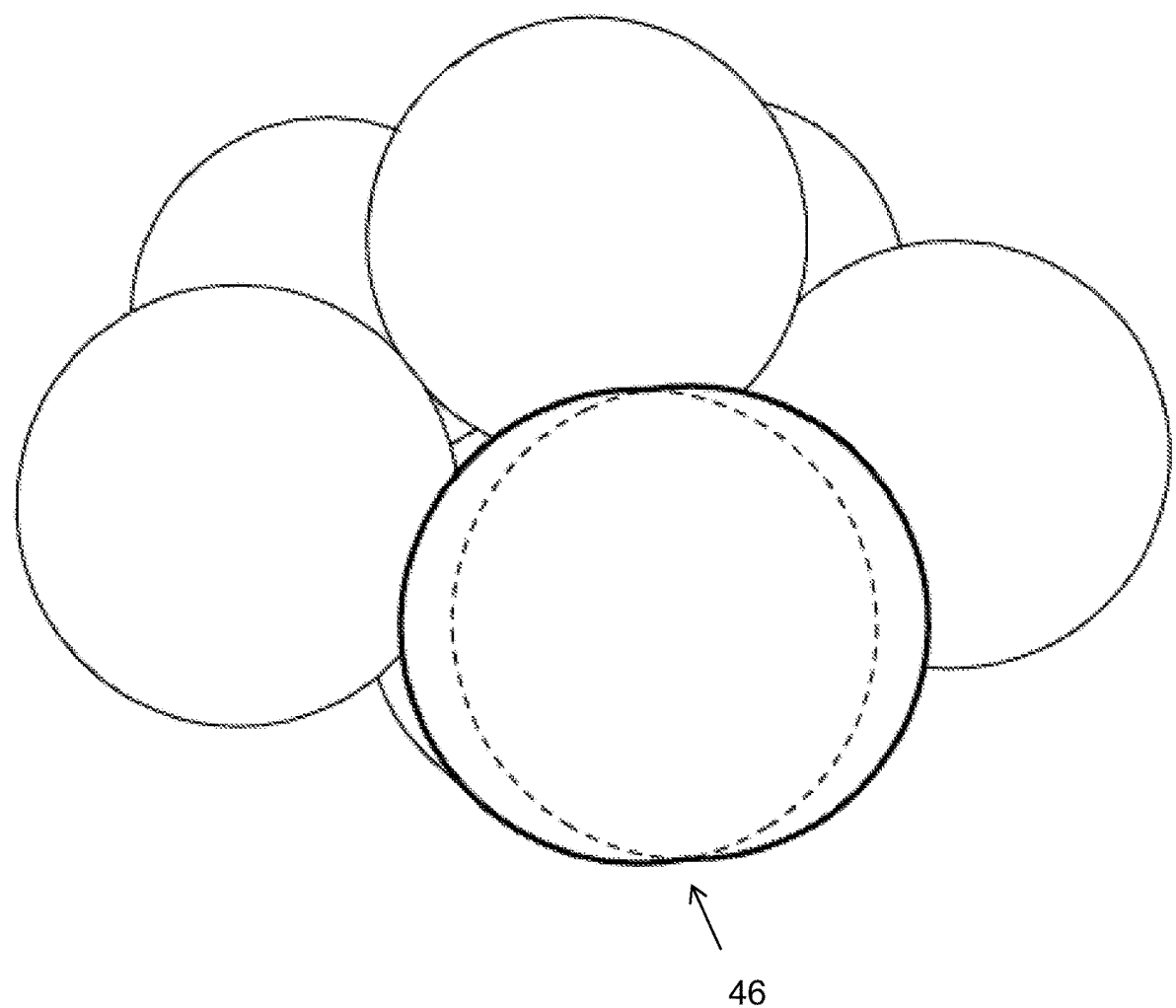
FIG. 4B is a schematic diagram of a star formed with spheres.

As in some embodiments of the Tetrahelix, each vertex of the Star may be placed at a distance of one length unit from each of its neighbors. Thus, the shared edge (the z axis) will run between two vertices located at $(x, y, z)_{axis} = (0, 0, \pm 0.5)$. The remaining vertices may be located in the x-y plane and form a perimeter around the Star axis. Here the imperfect packing of spheres in three dimensions becomes evident. Observing the Star structure from directly above the x-y plane, one may observe that the angle (projected onto the x-y plane) formed by two neighboring edges extending to the perimeter is not a rational fraction of $2\pi$. This angle, $\psi$, called the dihedral angle of the tetrahedron, is $\cos^{-1}(\frac{1}{3}) \approx 1.231$ radians or 70.53°. Thus five tetrahedra may be placed sharing a single edge, but the sum of the dihedral angles (352.64°) is less than that needed to complete the full spatial angle measure of $2\pi$ or 360°. This perimeter gap, illustrated at 44 in FIG. 4A and 46 in FIG. 4B, is a direct result of the aforementioned packing problems in three dimensions. The Star formed from both tetrahedra and spheres is shown in FIG. 4A and FIG. 4B, respectively, where the gap of imperfectly overlapped spheres is shown in dashed lines.

Figure 5:
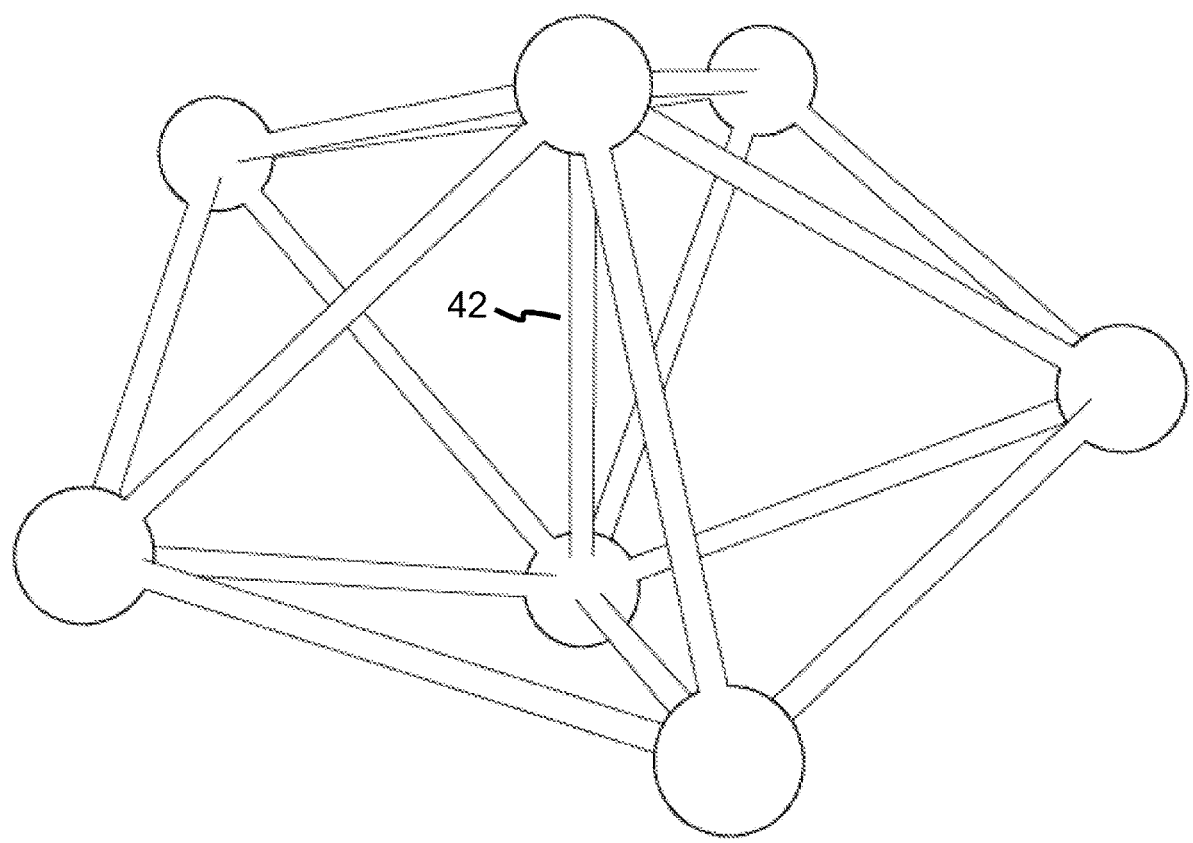
FIG. 5 is a schematic diagram of a star with a center axis gap.

As shown in FIG. 5, another embodiment of the Star may be constructed by imposing a perimeter with no gap by enforcing that the perimeter vertices be arranged in a regular pentagon with a side length of one unit. However, in such an arrangement, in order to keep the top and bottom axis vertices at a distance of one length unit from the perimeter vertices, they must be moved. The resulting solution gives axis vertices at $$(x, y, z)_{axis} \approx (0, 0, \pm 0.5257) \quad (8)$$

Thus, enforcing an unbroken perimeter causes the axis length to be greater than one and a perimeter gap becomes an axis gap 42 as shown in FIG. 5.

The Wheel

Figure 6A:
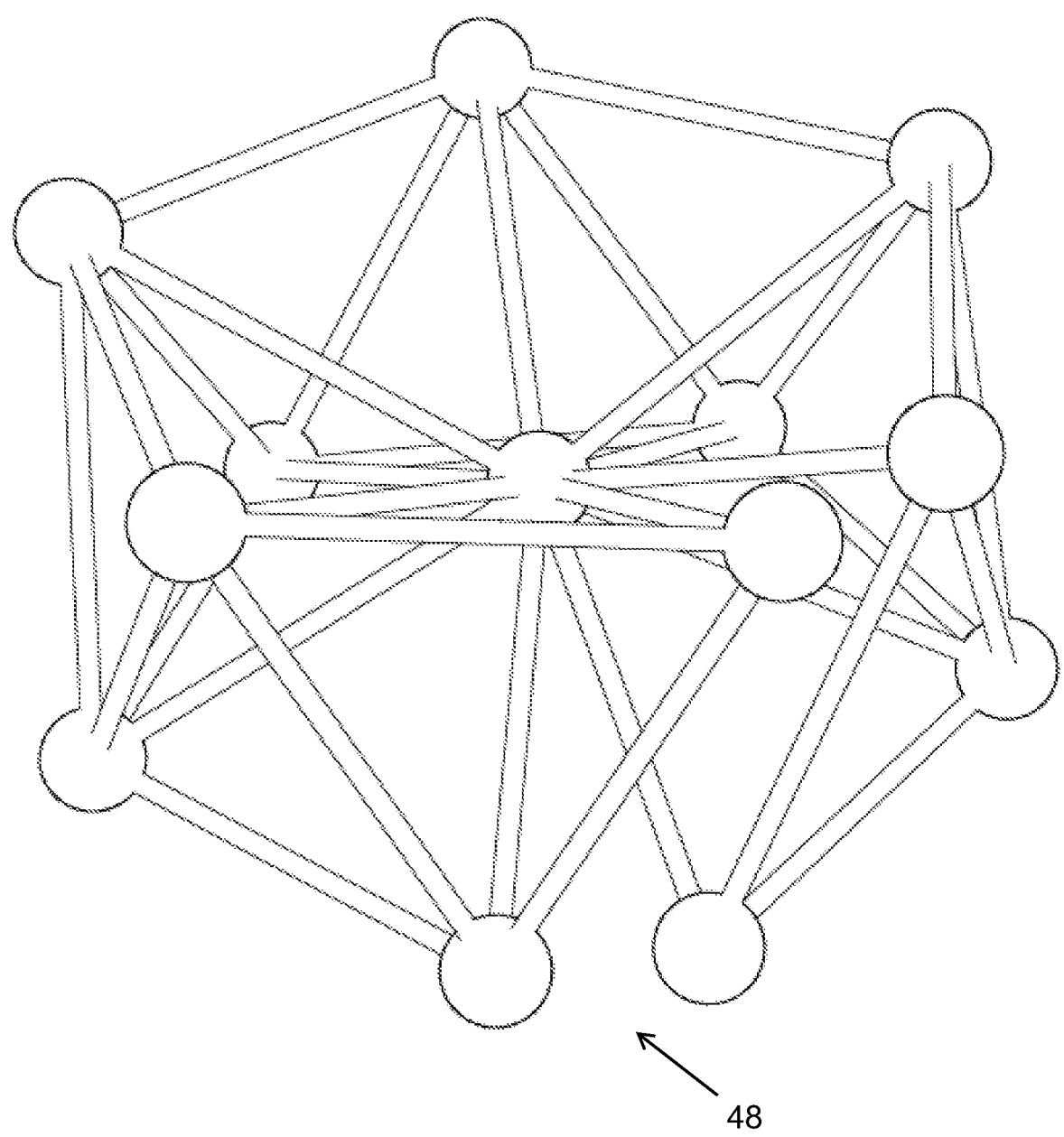
FIG. 6A is a schematic diagram of a wheel formed from tetrahedra.
Figure 6B:
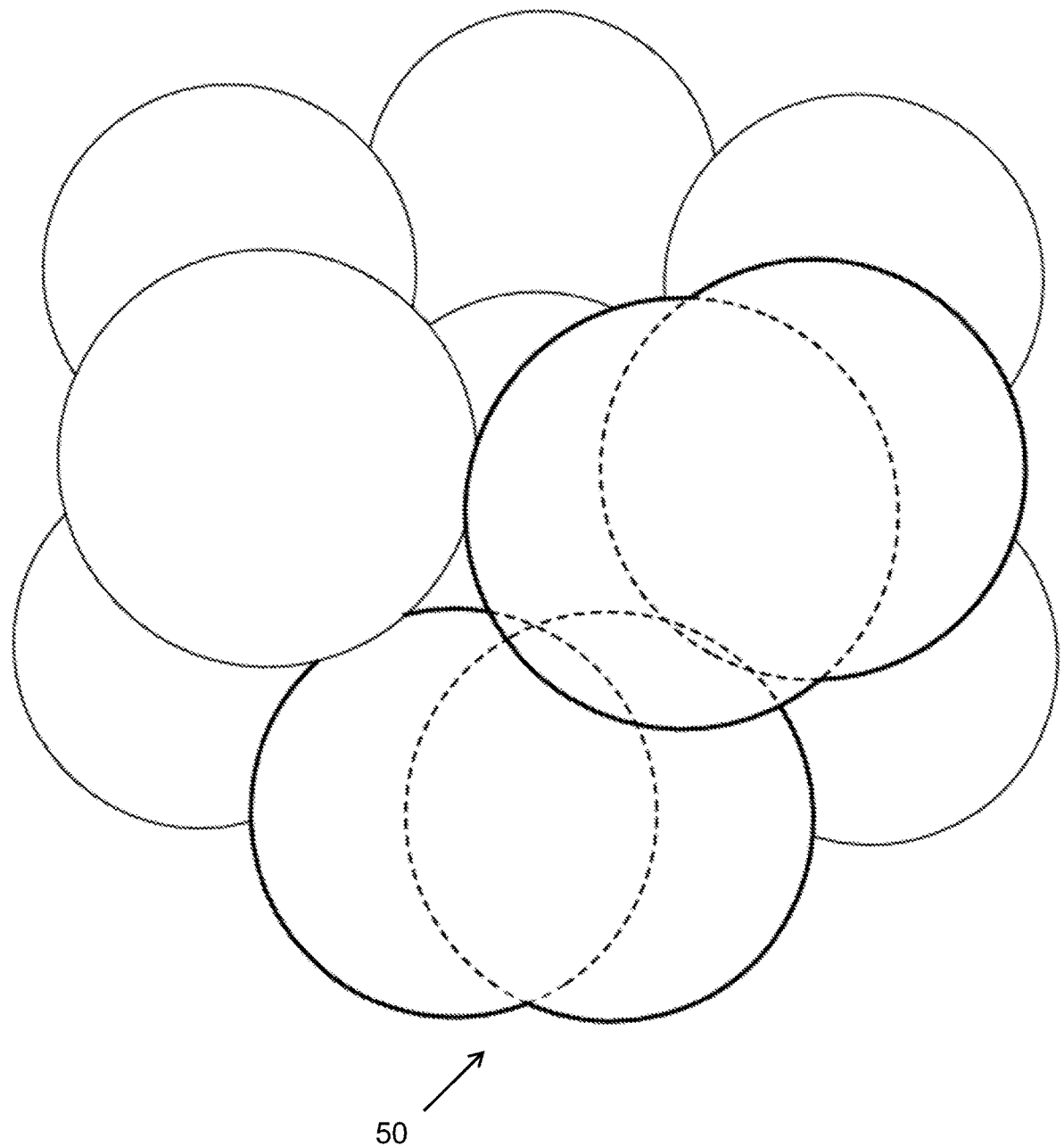
FIG. 6B is a schematic diagram of a wheel formed with spheres.

Referring to FIG. 6A, the Wheel is another spatially localized structure that may be constructed from tetrahedra. Here, the tetrahedra all share a single vertex, which may be placed at the origin for simplicity. The result is a structure with two Star-like perimeters, one above the x-y plane and one below it. Again, the imperfect packing issue becomes apparent. Viewing the Wheel from above the x-y plane, one may observe that the angle between any two neighboring edges extending outwards is $\cos^{-1}(15/18) \approx 0.5857$ rad or 33.56°. In the Wheel structure, ten tetrahedra may be packed sharing a center vertex, but as in the Star, there is a small perimeter gap 48 remaining. Since the Wheel has two pentagon-like perimeters, one above the center vertex and one below it, unlike the Star one cannot manipulate the location of the center vertex (if constrained to three dimensions) to close the perimeter gap 48. The Wheel formed from spheres is shown in FIG. 6B, wherein the perimeter gap is illustrated by dashed lines at 50.

In some embodiments, the Tetrahelix, the Star, and the Wheel may form a core set of geometrical structures. In some embodiments, perfect packing may be a criterion for core geometrical structures, stable particles built from selected core structures, or both. And, in some embodiments, freedom may be provided to manipulate structures based on a group of core structures. For example, using the core set of geometrical structures explicitly set forth herein (or, in some embodiments, other core structures identified using the methods and teaching herein), a user may build various groups of locally perfectly packed hard-spheres. Where modification of structures may alter one or more scaling factors configured for use in method calibration, methods described herein may sometimes be applied to recalculate appropriate scaling factors. For example, if hard-sphere sets for either or both of base particles (e.g., the photon and the electron) used to calibrate methods described herein are changed, embodiments described in relation to the method 10 may be executed to recalibrate the adjusted models. In some embodiments, this may allow one to simultaneously posit a mechanism for observable particle attributes such as momentum, mass, and charge by viewing energy geometrically, as discussed further herein.

Energy Subspace

In some embodiments, energy may be geometrically represented by a shift of the Q-sphere center into higher dimensions. This concept is useful as it allows incorporation of energy directly into the geometrical framework by the inclusion of additional dimensions beyond the four spatiotemporal dimensions. In this disclosure, these additional dimensions are referred to as the energy subspace. The representation of energy as a multi-dimensional subspace is supported by the relativistic energy momentum relation, which relates an object's total energy to its rest mass and momentum as follows:

$$E^2 = p^2 c^2 + m_0^2 c^4 \qquad (9)$$

wherein E is the total energy, p is the particle momentum, c is the speed of light, and $m_0$ is the particle rest mass.

One may observe that a massive particle in motion will be shifted in both the mass- and momentum-energy dimensions. In addition, one may observe that there is no contribution from a charged particle in Equation (9). Thus, it is evident that energy dimensions may have inherent differences. Energy produced from a shift in the mass-dimension may be overwhelmingly manifested as self-energy (called the rest mass) with a very small portion of the energy residing in the gravitational field. Conversely, energy produced from a shift in the electromagnetic-energy dimension may be manifested in the electromagnetic field. There may be a self-energy from the charge so extremely small that it has not been observed, and the models herein do not rule out this possibility.

The equation for the potential energy imparted on a particle that is in a field produced by another particle reinforces the idea that while the proportion of energy split between self-energy and field-energy might be different between energy dimensions, the form that the energy takes may be similar. This potential energy U(r) from both a gravitational field and an electrostatic field is dependent on the distance r (not to be confused with the Q-sphere radius, also referred to as r) between the particles and may be written as $$U(r) = G\frac{m_1 m_2}{r} + k\frac{q_1 q_2}{r} \qquad (10)$$

where G is the gravitational constant and k is the Coulomb constant. For the sake of comparison, for two electrons the electrostatic potential energy is $10^{42}$ times larger than the gravitational potential energy. The Q-sphere shift into the energy dimensions may be used to model the mechanism behind both kinds of energy but while the self-energy terms are dependent only on the particle, the potential energy terms are dependent upon the presence of a field from a neighboring particle.

Energy Quantification

In some embodiments, methods described herein may be used to calculate the energy of a Q-sphere whose center is shifted in one or more energy dimensions. In some embodiments, a boundary condition may be that the Q-sphere may not be shifted completely out of the spatial subspace. Therefore, as the shift amount approaches the radius of the Q-sphere, the energy may become infinite. A second boundary condition may be that a shift of zero equals an energy of zero. What physically may occur is that as the center of the N-dimensional sphere is shifted away from the spatial subspace, the amount of Q-sphere volume in that spatial subspace decreases, as can be verified from Equation (1).

A mathematical relationship that fits both of the aforementioned boundary conditions is one based on the ratio of the full spatial subspace volume of the unshifted Q-sphere to the spatial subspace volume of the shifted Q-sphere. Other metrics suitable to compare a full spatial subspace volume of an unshifted Q-sphere to a spatial subspace volume of a shifted Q-sphere may also be used, including, for example, a percentage value or other suitable value. In some embodiments, a user may also subtract one from the ratio so that a ratio of 1 gives an energy of zero:

$$E_{Q\text{-}sphere} = E_{sph}\left[\frac{V(r)}{V(r_{shift})} - 1\right] \qquad (11)$$

$$= E_{sph}\left[\frac{\frac{4}{3}\pi r^3}{\frac{4}{3}\pi r_{shift}^3} - 1\right]$$

$$= E_{sph}\left[\frac{r^3}{r_{shift}^3} - 1\right]$$

where $E_{sph}$ is an energy scaling constant, r is the radius of the full Q-sphere, and $r_{shift}$ is the radius of the Q-sphere shifted into the energy subspace.

In some embodiments, the radius of the Q-sphere remaining in the spatial subspace may be calculated from the shift amount V.

$$r_{shift} = \sqrt{r^2 - V^2} \qquad (12)$$

In some embodiments, a user may use these equations to quantify the energies of particle models further described herein. For example, equations for energy quantification may be used together with method 10. For example, energy quantification as described in step 20 may, in some embodiments, include use of the aforementioned equations for energy quantification.

Particle Models

In this section, the geometrical models discussed above are assigned to physical particles that may be used in some of the embodiments herein. For example, in some embodiments, a core set of structures presented to a user in executing methods described herein may include the Tetrahelix, the Star, and the Wheel. And, in some embodiments, those core structures may be associated with particles as described herein. The attributes of the different particles (momentum, mass, charge) coincide with the shift of some part of the geometrical model into one or more dimensions of the energy subspace. For the photon, which is a quantum of electromagnetic energy and has no mass, the shift may be completely into the electromagnetic-energy dimension. For the electron at rest (possessing no momentum), the shift is into both the mass-energy and electromagnetic-energy dimensions. In some embodiments, as described further below, these shifts may be associated with the pursuit of perfect Q-sphere packing. Also, in addition to predicting known attributes, the systems and methods described herein may be used to predict a heretofore unknown value, namely, a physical time interval in which the photon particle's energy is observed and measured, which is referred to herein as the photon duration.

In some embodiments, the photon may be modeled using a tetrahelix. Three reasons may be given for modeling the photon using a tetrahelix: (1) the tetrahelix extends infinitely with a straight trajectory; (2) the tetrahelix has an inherent wavelength analogous to the wavelength of light; and (3) the helical structure of the tetrahelix allows a mechanism to account for the known angular spin momentum of light.

The Photon

In some embodiments, aspects of a tetrahelix model of a photon may, for example, include: 1) the tetrahelix may extend infinitely in a straight trajectory; 2) the tetrahelix may have an inherent wavelength analogous to the wavelength of light; and 3) the helical structure of the tetrahelix may facilitate a mechanism to account for the angular momentum of light. In some embodiments, any of the aforementioned constraints and combinations thereof may be encoded into methods of modeling photon structure. And, in some embodiments, where a user is free to adjust core structures and/or particles, a computer may be programmed to identify structures that meet one or more of the aforementioned photon attributes. Also, for other particles, a computer may be programmed to identify structures that meet one or more suitable constraints such as may be based on known physical attributes or hypothesized attributes of particles. For example, in some embodiments, a computer may be programmed to search for and/or flag one or more patterns or groupings of Q-spheres that repeat or fail to repeat over some interval. In some embodiments, a computer may be used to search for perfectly packed or substantially perfectly packed groups of Q-spheres by constraining the distance between neighboring Q-spheres to be either a unit distance related to one or more Q-sphere dimensions or some other value in any subspace of an arbitrarily large number of dimensions.

Photon Energy

Photon energy may be completely electromagnetic because the photon is massless. The photon has momentum because the electromagnetic energy travels through space and may transfer its energy to a massive particle via momentum transfer. However, the fundamental form of the photon's energy is electromagnetic. The equation for photon energy is $$E = hv = \frac{hc}{\lambda} \quad (13)$$

where v and $\lambda$ are the observed frequency and the wavelength of the photon, respectively. In some embodiments, methods described herein may rectify the geometrical tetrahelix model and concept of energy with this standard energy equation. Per the above initial assumption, a tetrahelix of Q-spheres residing in the three-dimensional spatial manifold will have no measureable energy, only imaginary energy. In order to possess measureable energy, the tetrahelix may shift into the energy subspace. In the case of a photon, with no mass or charge, this shift may be into the electromagnetic-energy dimension.

Equation (13) implies that the amount of electromagnetic-energy in a single tetrahelix wavelength cycle is constant. To illustrate this, one may first define the photon in this model geometry. The tetrahelix equation in Equation (2) may incorporate the feature that the photon tetrahelix moves through both space and time, i.e., the tetrahelix as it is in Equation (2) is time-independent and thus has an instantaneous infinite spatial extent. To do this, the equations for the Q-sphere centers may be modified so that propagation is along both the z and t directions. This modification may be executed before or after one or more calibration or scaling factors are applied, and thus any of various suitable units may be used. Since the slope of the t-z line (also known as the speed of light) has not yet been defined, it may be parameterized by a slope angle #c.

$$x_n = a\cos(n\theta) \quad (14)$$
$$y_n = a\sin(n\theta)$$
$$z_n = nb\sin(\phi_c)$$
$$t_n = nb\cos(\phi_c)$$

where a, b, and $\theta$ are still defined as in Equation (3) and $\phi_c$ is chosen so that $\phi_c=0$ indicates a velocity of zero (i.e., $\Delta z/\Delta t=0$).

When viewed as a full tetrahelix in the joint x-y-z-t space, if the entire tetrahelix is shifted into the electromagnetic-energy dimension, it may be modeled as possessing infinite energy since the entire tetrahelix stretches to infinity and contains an infinite number of Q-spheres. However, when the photon tetrahelix is observed over a finite time interval (whose value is given by the photon duration), the energy is finite. Thus, at any instant in time, one may only observe a segment of the photon tetrahelix, and thus any measurement of energy results in only the energy contained in that segment. Photon energy is not typically thought of in this way, but this view may be compatible with the standard energy equation.

One may derive from the parameterization in Equation (14) that the observed wavelength may be affected by the slope angle $\varphi_c$. When the tetrahelix is observed in the spatial x-y-z subspace the wavelength may be $$\lambda' = \lambda \sin(\phi_c) \quad (15)$$

where $\lambda$ is the full wavelength of the four-dimensional tetrahelix.

Using Equation (13) with this concept of the observed wavelength, one may see that the product of the photon energy E and observed wavelength $\lambda'$ is constant and equal to Planck's constant times the speed of light.

$$E\lambda' = hc \quad (16)$$

One may derive the same result from the tetrahelix model of the photon when the energy in one tetrahelix wavelength cycle ($E_{helix}$) is set to a constant value. For a given photon duration $T_\gamma$, one may count the number of tetrahelix wavelengths observed and multiply that (possibly fractional) number $N(T_\gamma)$ times the energy of a single tetrahelix wavelength. This energy equation is $$E = N(T_\gamma)E_{helix} \quad (17)$$

In some embodiments, one may further derive an expression for $N(T_\gamma)$. The spatial extent during which the photon energy is observed may be given by multiplying the photon duration ($T_\gamma$) by the speed of light (c). The number of observed tetrahelix wavelengths that fit into that spatial extent value may be given by $$N(T_\gamma) = \frac{T_\gamma c}{\lambda'} \quad (18)$$

So one may rewrite Equation 17 as $$E = \frac{T_\gamma c}{\lambda'} E_{helix} \quad (19)$$

To show equivalence to Equation 16 one may multiply both sides by $\lambda'$ and show that also in the described geometry E times $\lambda'$ is constant, since $T_\gamma$, c, and $E_{helix}$ may all be constant. For example, in some embodiments, those terms may be constant by assumption.

$$E\lambda' = T_\gamma c E_{helix} \quad (20)$$

In some embodiments, this equation may be used to produce an equation for Planck's Constant h in the described geometry. Comparing Equation 16 to Equation 20 one may show that $$h = T_\gamma E_{helix} \quad (21)$$

Thus, it may be noted that in some embodiments, the quantum of action (h) may be defined as equal to the photon duration times the energy in one photon tetrahelix cycle.

Photon Spin Angular Momentum

In some embodiments, another quantifiable attribute of the photon that may be useful in calculations is the angular spin momentum. Classically, the angular momentum of an object is given by the moment of inertia of the object times the angular frequency of the object ($L = I\omega$). However, the classical moment of inertia is defined using the concept of mass, but photons are massless. So for the photon, one may introduce a generalized moment of inertia which is based on the more general concept of energy, instead of strictly mass (which is a form of energy).

To calculate the generalized moment of inertia of a photon with wavelength $\lambda$, one may use the fact that the moment of inertia is an additive quantity (i.e., the moment of inertia of a group of objects is equal to the sum of the individual moments of inertia of each object). Again utilizing the photon duration concept, the angular momentum of the photon will be the moment of inertia of a single wavelength of the tetrahelix times the fractional number of tetrahelices that fit into the spatial extent defined by the photon duration.

$$L = I_\gamma \omega \quad (22)$$
$$= N(T_\gamma) I_{helix} \omega$$
$$= I_{helix} \frac{T_\gamma c}{\lambda'} \omega$$

Using the fact that the observed angular frequency $\omega = 2\pi c/\lambda'$, one may arrive at the expression $$L = I_{helix} \frac{T_\gamma c}{\lambda'} \frac{2\pi c}{\lambda'} \quad (23)$$
$$= I_{helix} T_\gamma \left( \frac{2\pi c^2}{(\lambda')^2} \right)$$

Since it is known that for photons of any wavelength, L is constant and equal to the reduced Planck Constant h-bar, then $$h = 2\pi L \quad (24)$$
$$= I_{helix} T_\gamma \left( \frac{2\pi c}{\lambda'} \right)^2$$

Setting the two expressions for h equal (Equations (21) and (24)), one may see that $$E_{helix} = I_{helix} \left( \frac{2\pi c}{\lambda'} \right)^2 \quad (25)$$

Recalling that by assumption $E_{helix}$ is constant in some embodiments, one may arrive at a form for the photon generalized moment of inertia as $$I_{helix} = \frac{E_{helix}}{c^2} \left( \frac{\lambda'}{2\pi} \right)^2 \quad (26)$$

where the electromagnetic tetrahelix energy is cast as a "mass-like" energy by using the fact that $m_0 = E/c^2$.

This result provides interesting information. A moment of inertia always has the form of a constant times mass times $r^2$ where r is the distance from the mass volume to the axis of rotation. By assumption $E_{helix}$ is constant in this embodiment, so the distance from the energy density to the axis of rotation in this generalized moment of inertia is this interesting quantity $\lambda'/2\pi$ which is called the reduced wavelength and is frequently used when describing mass in traditional quantum physics. This result may indicate that the generalized moment of inertia of the photon is not so much representative of solid spheres rotating around an axis but is dependent only on the displacement of the Q-sphere centers from the axis of rotation.

Speed of Light

In some embodiments, one may calculate ye which may give a value for the speed of light consistent with the described geometry. The spin angular momentum calculation indicates a distance of $\lambda'/2\pi$ from the axis of rotation to the centers of the tetrahelix Q-spheres. The tetrahelix equations indicate an x-y distance of $a = 3(3)^{1/2}/10$ from the axis of rotation in units defined by the Q-sphere diameters. To be precise, for a photon of wavelength $\lambda$ the scaled distance d from the tetrahelix vertices to the axis of rotation may be calculated as:

$$d = \frac{3\sqrt{3}}{10} \frac{\lambda}{l_0} \quad (27)$$

where $l_0$ is given in Equation (7).

Since the x- and y-dimensions are not affected by the rotation into the t-dimension, this distance d may be unaltered. Therefore, one may calculate the value of $\varphi_c$ where $$d = \frac{3\sqrt{3}}{10} \frac{\lambda}{l_0} \quad (28)$$
$$= \frac{\lambda'}{2\pi}$$
$$= \frac{\lambda \sin(\phi_c)}{2\pi}$$

Solving for $\phi_c$ yields $$\phi_c = \sin^{-1}\left(\frac{6\sqrt{3}\pi}{10 l_0}\right) \quad (29)$$

$$\approx 0.345540 \text{ rad}$$

$$\approx 19.7980°$$

Therefore, as a result of this analysis, one may arrive at a value for the speed of light in the core geometry. Using Equation (14) one may calculate that in units natural to the described geometry the speed of light is $$c_{om} = \frac{\Delta z}{\Delta t} \quad (30)$$

$$= \frac{b\sin(\phi_c)}{b\cos(\phi_c)}$$

$$= \tan(\phi_c)$$

$$\approx 0.3599818$$

where the speed of light c is subscripted with "om" to denote that the value is in "Omnisent" geometry units as described herein.

Shift in the Electromagnetic-Energy Dimension

One may now calculate the value of the tetrahelix shift into the electromagnetic-energy dimension. When the photon tetrahelix is observed in the spatial subspace, the Q-sphere vertex locations will be compressed closer together. In some embodiments, to insure that the Q-spheres don't overlap in the spatial subspace, the mechanism of the electromagnetic-energy dimension shift may be to insure that the Q-spheres in each leg of the tetrahelix don't overlap when projected onto the x-y-z subspace.

To calculate this shift, one may start by finding the distance between adjacent Q-spheres along one leg of the tetrahelix when travelling at the speed of light. Using x, y, and z from Equation (14), one may see that the projected distance between n=0 and n=3 is $$D_{03} = \sqrt{(a - a\cos(3\theta))^2 + a^2\sin^2(3\theta) + 9b^2\sin^2(\phi_C)} \quad (31)$$

$$= \sqrt{2a^2(1 - \cos(3\theta)) + 9b^2\sin^2(\phi_C)}$$

$$= 0.450831$$

So the apparent radius of the Q-spheres in the spatiotemporal subspace is half of this value, or r'≈0.225415. Referring to Equation (1) one may see that, given $V_w = V_p = 0$ for a photon, $V_q$ must equal $$V_q(\gamma) = \sqrt{r^2 - (r')^2} \quad (32)$$

$$= 0.446305$$

The Electron Mass and Electromagnetic Energies

Figure 6C:
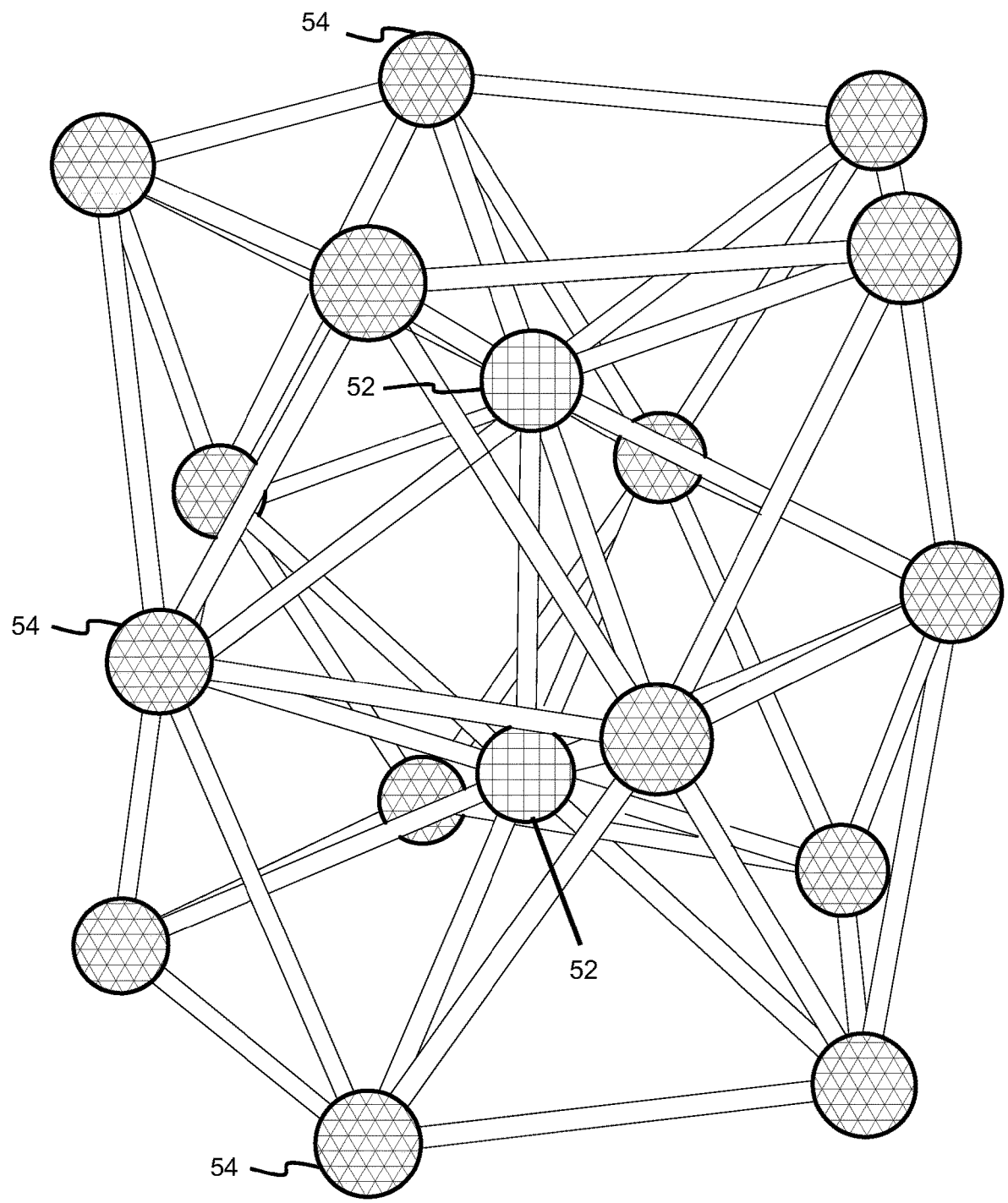
FIG. 6C is a schematic diagram of an electron model formed with tetrahedra.

The simplest polyhedral structure which encompasses the necessary attributes of an electron is based on the Wheel polyhedron described above. For centuries, the quantum of charge for elementary particles was thought to be the charge of the electron e. However, the proposal of Quark theory in 1964 independently by both Murray Gell-Mann and George Zweig showed that elementary particles exist that carry charge in multiples of ⅓ e. As shown further below, in some embodiments, the charge in the electron may be carried in the pentagonal perimeter Q-spheres in the electron model. To account for the ⅓ e quantization in embodiments that model quarks, one may employ a model with three sets of perimeter Q-sphere pentagons. Accordingly, in some embodiments, an electron model of choice may be a doubly-stacked Wheel where the top and bottom Wheels share a set of perimeter Q-spheres, giving three sets, as shown in FIG. 6C.

The gaps in the doubly-stacked Wheel structure may be closed by shifting the Q-spheres into higher dimensions. Following from the framework described herein, the imaginary energy of the vacuum Q-sphere may become real and measurable as it is shifted in the energy subspace. As shown in FIG. 6C, the axis Q-spheres 52 are responsible for the mass-energy of the electron, and the perimeter Q-spheres 54 are responsible for the electromagnetic-energy. As shown in Appendix A, which is incorporated herein by reference, the values of the shifts into the mass- and electromagnetic-energy dimensions are, respectively $$V_w(e^-) = \frac{\sqrt{1 - R^2}}{2} \quad (33)$$

$$V_q(e^-) = \sqrt{\frac{3}{4} - R^2}$$

In some embodiments, using the energy quantification equation previously described herein (See Energy Quantification Section), one may develop expressions for the mass- and electromagnetic-energies for the electron. In some embodiments, an equation that may hold for the electron mass using the two axis Q-spheres is $$m_e c^2 = 2\varepsilon_{sph}\left[\frac{r^3}{(r^2 - V_w^2(e^-))^{3/2}} - 1\right] \quad (34)$$

where r=½ (recalling that the Q-sphere diameters in models described herein may define the unit length).

Similarly, in some embodiments, since the charge may be carried by the perimeter Q-spheres, the electromagnetic energy of the electron may be given by $$Q_e = 15\varepsilon_{sph}\left[\frac{r^3}{(r^2 - V_q^2(e^-))^{3/2}} - 1\right] \quad (35)$$

Before some values in the geometry are calculated, the electromagnetic-energy of the electron ($Q_e$) may be considered.

Electromagnetic-Energy Relationship to Electric Charge

The electromagnetic-energy $Q_e$ may be related to the electron charge value e. Since $Q_e$ is an energy, one conclusion may be that it quantifies the electric field energy of the static electron (a static electron generates no magnetic field), and in some embodiments, $Q_e$ may refer to the electromagnetic-energy of a static electron. When the electron is considered to be a point charge, the electric field integrated over all space is infinite. However, using the Q-sphere model, it makes physical sense to only integrate with a lower boundary of the Q-sphere surface and therefore converge to a finite energy amount.

The energy density of an electric field $E=e^2/4\pi\epsilon_0 r^2$ is $$u = \frac{\epsilon_0}{2}E^2 = \frac{e^2}{32\pi^2\epsilon_0 r^4} \qquad (36)$$

Integrating this density over all space (the three spatial dimensions) with a lower radial limit of the Q-sphere radius (indicated by $\delta$ in the integral of Equation 37) and using the volume element $4\pi r^2 dr$ gives the total energy $Q_e$ as $$Q_e = \int_\delta^\infty \frac{e^2}{8\pi\epsilon_0 r^2} dr \qquad (37)$$
$$= \frac{e^2}{8\pi\epsilon_0 \delta}$$

In some embodiments, one may calculate the radius of integration $\delta$ that is consistent with the geometry used in some embodiments described herein.

Geometrical Values

Several geometrical values have been introduced, and now their values in SI units may be calculated. For example, in some embodiments, one may determine values for the Q-sphere energy density $E_{sph}$, the energy in a single wavelength of a photon $E_{helix}$, the photon duration $T_\gamma$, the electromagnetic energy of the electron $Q_e$, and the radius of integration for the electron electromagnetic energy $\delta$.

In some embodiments, one may calculate the Q-sphere energy density. Using Equation (34) and solving for $E_{sph}$ yields $$\varepsilon_{sph} = \frac{m_e c^2}{2} \left[ \frac{r^3}{(r^2 - V_w^2(E^-))^{3/2}} - 1 \right]^{-1} \qquad (38)$$
$$= 6.553894 \ldots \times 10^{-14} J$$

The energy in a single wavelength of the photon tetrahelix can be found by multiplying the energy density of a Q-sphere shifted by $V_p$ by the number of Q-spheres in one tetrahelix wavelength ($3k_{2\pi}$) using Equation (5).

$$E_{helix} = 3k_{2\pi}\varepsilon_{sph}\left[\frac{r^3}{(r^2 - V_w^2(\gamma))^{3/2}} - 1\right] \qquad (39)$$
$$= 1.980440 \ldots \times 10^{-11} J$$

Using this result, the photon duration $T_\gamma$ may be calculated using Equation (21).

$$T_\gamma = \frac{h}{E_{helix}} \qquad (40)$$
$$= 3.345757 \ldots \times 10^{-23} s$$

The electromagnetic energy $Q_e$ using Equation (35) is $$Q_e = 15\varepsilon_{sph}\left[\frac{r^3}{(r^2 - V_w^2(e^-))^{3/2}} - 1\right] \qquad (41)$$
$$= 1.790953 \ldots \times 10^{-13} J$$

This allows one to calculate the radius of integration $\delta$ for the electromagnetic energy integral in Equation (37) as $$\delta = \frac{e^2}{8\pi\epsilon_0 Q_e} \qquad (42)$$
$$= 6.440921 \ldots \times 10^{-16} m$$

Fine Structure Constant

In some embodiments, one may examine what the fine structure constant may look like in the geometry described herein. Using Equation (42) for the value of the electric charge e yields $$e = \sqrt{8\pi\epsilon_0 \delta Q_e} \qquad (43)$$

Plugging this result for e into the equation for the fine structure constant ($\alpha$) yields $$\alpha = \frac{e^2}{4\pi\epsilon_0 \hbar c} \qquad (44)$$
$$= \frac{e^2}{2\epsilon_0 hc}$$
$$= \frac{8\pi\epsilon_0 \delta Q_e}{2\epsilon_0 hc}$$
$$= \frac{4\pi\delta Q_e}{hc}$$
$$= \frac{4\pi\delta Q_e}{T_\gamma c E_{helix}}$$

where we have substituted for (h) using Equation 21 in the denominator.

It may also be noted that plugging in the values of $\delta$, $E_{helix}$, $T_\gamma$, and $Q_e$ gives the correct value for the fine structure constant $\alpha$ as $$\alpha = 0.0072973525662 \qquad (45)$$

The Energy Spread

In some embodiments, the equation for the fine structure constant may be expressed in another way. Returning to the expression derived in Equation (44), one may express $$\alpha = 2\pi \frac{Q_e \cdot 2\delta}{E_\gamma \cdot \lambda} \qquad (46)$$

The denominater in Equation (46) ($E_\gamma \cdot \lambda$) appeared in Equation (20) and was shown to be a constant equal to $T_{\gamma c} E_{helix}$. Without limiting the method to a specific theory, it is believed that these values are constant and fundamental to the physics of the photon: the photon duration, the speed of light, and the energy in one wavelength of the photon. Therefore, this value $E_\gamma \cdot \lambda$ can be thought of as an invariant value which encompasses the critical physics of the photon at its most fundamental level. This concept may be referred to in the modeling described herein as the energy spread $S_\gamma$ of the photon.

Examining the numerator $Q_e \cdot 2\delta$ in Equation (46), it is of a similar form, i.e., an energy times a distance. Since the energy is the electromagnetic energy of the electron, it is logical that this is an analogous energy spread quantity which encompasses the physics of the electromagnetic force carrier, which may be referred to as $S_{ES}$. The distance in the force carrier energy spread ($2\delta$) is twice the radius of integration (i.e., the diameter) that arose when the electron electromagnetic energy was calculated in the above section labeled Electromagnetic-Energy Relationship to Electric Charge, indicating that the diameter of the electron may describe the fundamental wavelength of the electromagnetic force carrier.

Therefore, the physical meaning of the fine structure constant may be described herein as $2\pi$ times the ratio of the electromagnetic force carrier energy spread and the photon energy spread.

$$\alpha = 2\pi\left(\frac{S_{ES}}{S_\gamma}\right) \tag{47}$$

Equation (47) shows that the electrostatic coupling between an electron and a photon may be completely determined by the energy spreads of the constituents, where the energy spread values contain the critical physics of the two particles.

This is a compelling result for a coupling constant that has defied quantitative explanation for centuries. In some embodiments, this idea may be extended in models that may include the electrostatic force. In addition, it is noted that the known force coupling constants (of which the fine structure constant is one) are known to change with the energy level of the particles in the interaction. In some of the models described herein, that idea may be an inherent feature as the coupling constant may change when the energy levels, and thus the energy spreads, of the constituent particles change. This geometrical insight into the mechanisms behind coupling constants is a novel insight and one that may advance the understanding of fundamental mechanisms at work in physics.

The Electrostatic Force

In some embodiments, methods described herein may model forces which act between charged particles, including, for example, electrons, protons, other negatively or positively charged particles, and combinations thereof. As described previously, methods for modeling forces may be based on the representation of one or more forms of energy as additional dimensions, above and beyond the three spatial and one time dimensions, using the concept of the energy subspace. In some embodiments, using this dimensional description of energy, it may be shown how the energies from charged particles may spatially couple at a distance causing the phenomenon of the electrostatic force.

The relationship between the scalar potential energy U of an object and the resultant force F on that object is well-known to those of skill in the art and is shown in Equation 48.

$$F = -\nabla U \tag{48}$$

Therefore, for conservative forces, the force on an object occurs if there is a spatial direction in which the potential energy decreases. For example, the force may act in the direction of the steepest gradient descent of the potential energy field.

In some embodiments, to connect the concept of electrostatic potential energy to the geometrical concepts described herein, one may start with the equation for the electrostatic potential energy in SI units induced on a test electron by a neighboring electron a distance r (not to be confused with the Q-sphere radius or other distances in other equations herein, which may also be referred to as r) away.

$$U(r) = \frac{e^2}{4\pi\epsilon_0 r} \tag{49}$$

Quantification of the electrostatic energy in the field of an electron was previously shown in Equation (37), which may be rewritten herein for reference. Equation (37) may be expressed as $$Q_e = \frac{e^2}{8\pi\epsilon_0 \delta} \tag{50}$$

where $Q_e$ is the electromagnetic-energy in the field of a static electron and $\delta$ is the radius of the electron.

One may manipulate this equation to give $Q_e$ and $\delta$ in terms of the electron charge e and the permittivity of vacuum $\epsilon_o$.

$$Q_e \cdot 2\delta = \frac{e^2}{4\pi\epsilon_0} \tag{51}$$

Substituting this equation in Equation (49) one may derive an alternate equation for the potential energy.

$$U(r) = \frac{Q_e \cdot 2\delta}{r} \tag{52}$$

Referring back to Equation (46), the numerator in this equation is similar to the expression described previously in terms of the fine structure constant and called the energy spread. In some embodiments, the photon energy spread may be an invariant quantity which contains critical physics parameters associated with the photon. As described above, this photon energy spread $S_\gamma$ is equal to the energy of the photon multiplied by the wavelength of the photon expressed as $$S_\gamma = E_\gamma \cdot \lambda \tag{53}$$
$$= T_\gamma c \, E_{helix}$$

where $T_\gamma$ is the photon duration, c is the speed of light, and $E_{helix}$ is the electromagnetic-energy in a single cycle of the photon, all of which may be invariant constants themselves.

Figure 8:
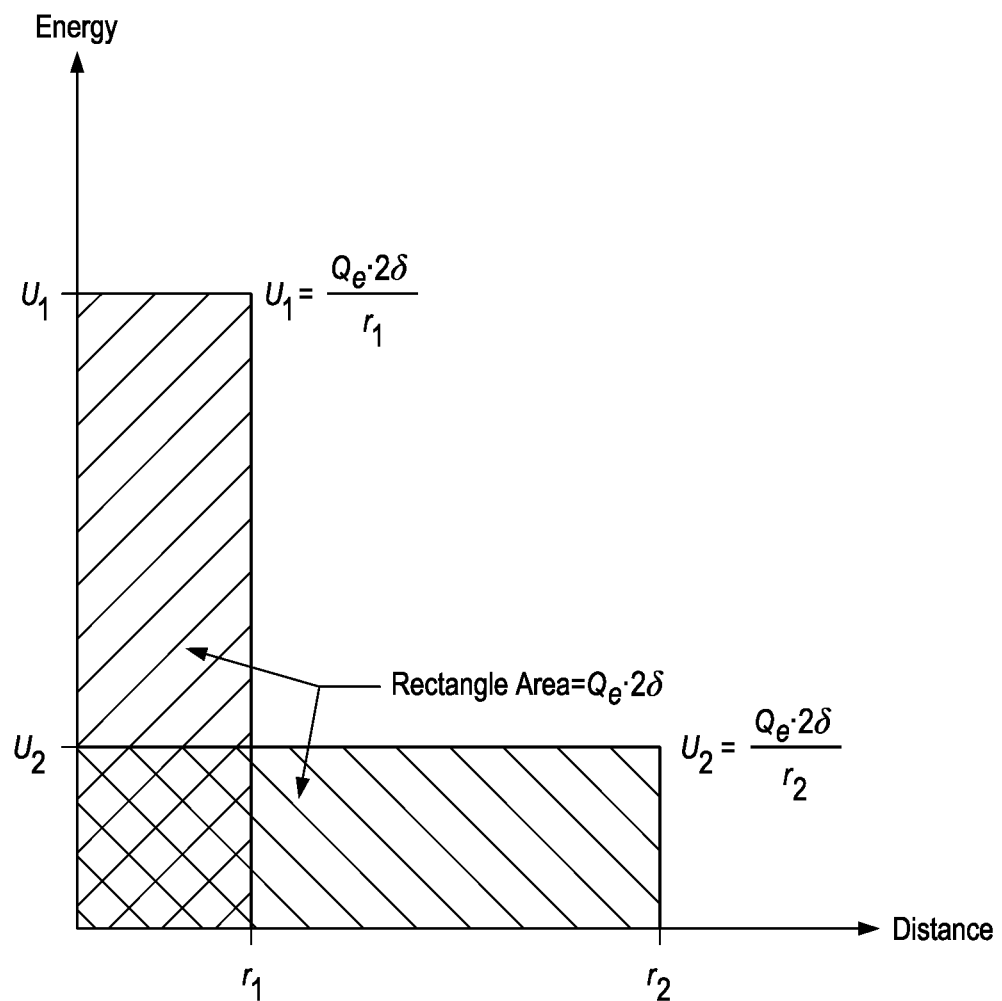
FIG. 8 is a graph of energy as a function of distance.

The numerator in Equation (52) was identified as an energy spread, not of the photon, but of the electromagnetic force carrier. It also has the form of an energy multiplied by a distance, but in this case the energy value is the electromagnetic energy of the static electron and the distance value is the diameter of the electron. Therefore, the value of the electrostatic potential energy in Equation (52) can be seen to be the energy value of the electromagnetic force carrier energy spread $S_ES$ when the distance value is r, the distance between the electrons as shown in FIG. 8. For example, since $$S_{ES}=U(r) \cdot r \quad (54)$$

then $$U(r) = \frac{S_{ES}}{r} = \frac{Q_e \cdot 2\delta}{r} \quad (55)$$

This energy induced by the neighboring charge will cause a surplus of electromagnetic energy at the site of the test electron. As described previously, the geometry of the electron shift into the energy subspace may be analytically calculated. Thus, the physics of the geometry may seek to equalize the surplus and bring the energy shift back to an ideal amount by forcing the test electron away from the neighboring electron (giving rise to the repulsive force between electrons), in the direction of the fastest decrease of the potential energy field, just as described in Equation (48).

Electrostatic Force and Electric Field

If one fixes the location of a neighboring electron, i.e., an electron causing the potential energy on the test electron, at the origin and place the test charge at a distance of r away, one can calculate the gradient of the potential energy field to find the force. Since U only depends on r, the gradient may take the form as shown in Equation 56.

$$F = -\nabla U \quad (56)$$
$$= -\left(\frac{\partial U}{\partial r}\hat{r} + \frac{1}{r}\frac{\partial U}{\partial \theta}\hat{\theta} + \frac{1}{r\sin\theta}\frac{\partial U}{\partial \varphi}\hat{\varphi}\right)$$
$$= -\frac{\partial}{\partial r}\left(\frac{Q_e \cdot 2\delta}{r}\right)\hat{r}$$
$$= \frac{Q_e \cdot 2\delta}{r^2}\hat{r}$$

As the force moves the electron to a position of lower potential energy, work (W) is said to be done on the electron, and that work is equal to the negative of the change in potential energy. Due to energy conservation, the magnitude of the reduction in potential energy is also equal to the increase in the kinetic energy of the electron.

$$W=-\Delta U=\Delta KE \quad (57)$$

Thus, in some embodiments, a geometric interpretation may be that the surplus energy in the electromagnetic-energy dimension may be equalized by shifting the surplus electromagnetic-energy of the electron into the momentum-energy dimension in an appropriate amount such that the total overall energy is conserved.

Considering embodiments in a non-relativistic regime, one may examine the manifestation of this work done, which is an increase in the kinetic energy of the electron. Increasing kinetic energy implies that the electron is being accelerated, so using Newton's second law of motion, one may calculate the acceleration of the electron $$a = \frac{Q_e \cdot 2\delta}{m_e r^2}\hat{r} \quad (58)$$

One may also write this in terms of mass-energy $M_e = m_e c^2$, $$a = \left(\frac{Q_e}{M_e}\right)\frac{2\delta c^2}{r^2}\hat{r} \quad (59)$$

Figure 9:
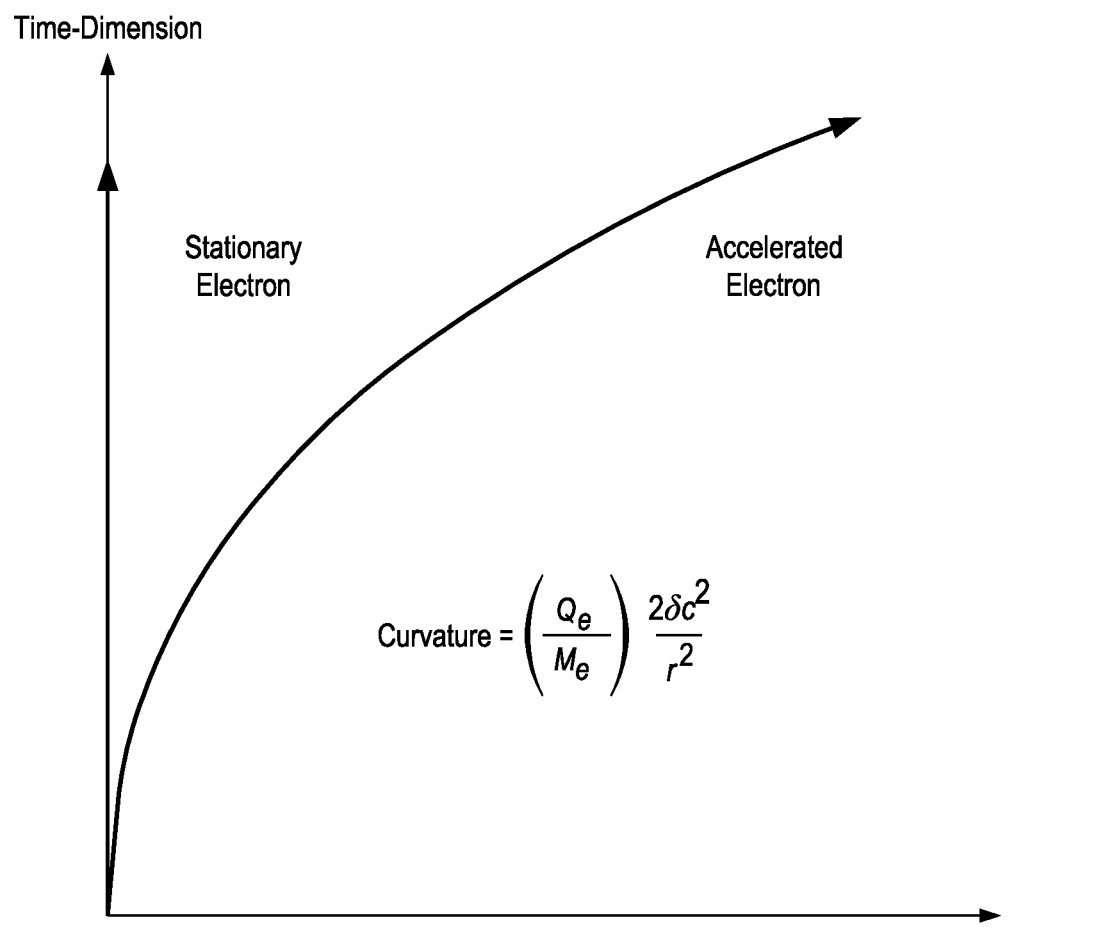
FIG. 9 is a graph illustrating a comparison of the worldlines of a stationary electron and an accelerated electron.

In the Omnisent geometry, where time has been transformed to a generalized length unit, acceleration is interpreted as the curvature of an electron's world line, or trajectory in spacetime (See FIG. 9). The units of curvature are inverse length, so one may note that the Omnisent units are consistent $$[a] = \left(\frac{r_{om}}{r_{om}}\right)\frac{r_{om}}{r_{om}^2} \quad (60)$$
$$= r_{om}^{-1}$$

The electric field is defined in SI units as the electrostatic force on the electron divided by the charge of the electron.

$$E = \frac{F}{e} \quad (61)$$

So using the above expression for force, one may get the following expression for the electric field $$E = \frac{Q_e \cdot 2\delta}{e r^2}\hat{r} \quad (62)$$

One may simplify this equation further and at the same time draw an interesting parallel to the photon. As described previously, one may normalize all values to a generalized length unit $r_{om}$. In order to normalize the Coulomb unit for charge to a length unit, one may normalize the permittivity of vacuum to $$\varepsilon_{om} = \frac{1}{4\pi c_{om}} \quad (63)$$

where the "om" subscript indicates Omnisent units. From this point forward, equations are shown in Omnisent units exclusively, so the subscript is omitted and it is noted if SI units are used for some reason.

Returning to Equation 50, one may write the electromagnetic force carrier energy spread as $$Q_e \cdot 2\delta = e^2 c \quad (64)$$

which has a form previously described herein. As described herein, the photon energy spread was found to be $$E_{helix} \cdot \lambda' = hc \quad (65)$$

Thus, one may observe a very profound result: the square of the electron charge $e^2$ and the Planck constant h play equivalent roles in quantifying the electromagnetic force carrier energy spread and the photon energy spread, respectively.

One may use the result in Equation 64 to simplify the equation for the electric field.

$$E = \frac{e^2 c}{e r^2}\hat{r} \quad (66)$$
$$= \frac{e c}{r^2}\hat{r}$$

which results in a concise and transparent representation of the electric field.

Electrostatic Force Coupling Constant

Referring back to the expression found for the electrostatic force coupling constant, or the fine structure constant, as described previously, $$\alpha = 2\pi \frac{Q_e \cdot 2\delta}{E_\gamma \cdot \lambda} \quad (67)$$

Taking this as the coupling constant for the electromagnetic force, one may calculate the most fundamental expression for force, which may be called $F_0$. Using the equation template $$F_{ES} = \alpha F_0 \quad (68)$$

Plugging in what has already been determined herein $$\begin{aligned} F_0 &= \frac{F_{ES}}{\alpha} \\ &= \left(\frac{Q_e \cdot 2\delta}{r^2}\right)\left(\frac{E_\gamma \cdot \lambda}{2\pi Q_e \cdot 2\delta}\right)\hat{r} \\ &= \frac{1}{2\pi}\frac{E_\gamma \cdot \lambda}{r^2}\hat{r} \end{aligned} \quad (69)$$

Thus, the fundamental expression for force is based on the photon energy spread. However, the presence of the $\frac{1}{2\pi}$ gives a particularly important clue towards the physical meaning of the fine structure constant. The photon energy spread is an energy spread in time, i.e., it is a constant due to the fact that a photon's energy is sampled during a small discrete time interval, the photon duration. The electromagnetic energy of an electron is independent of time and is not constant; it decays as a function of inverse distance of the electron. Therefore, one may conclude from this expression that a photon also has a time-independent energy spread that extends outward, perpendicular from the direction of propagation. This transverse energy spread similarly decays as a function of inverse distance and is proportional to the radius of the photon tetrahelix structure, which was shown to equal $\lambda/2\pi$. The geometry of the mechanism is shown in FIGS. 3A and 3B. Thus, the fundamental force is more appropriately written as $$F_0 = \frac{E_\gamma \cdot (\lambda/2\pi)}{r^2}\hat{r} \quad (70)$$

The corresponding fundamental potential energy value $U_0$ is then $$U_0(r) = \frac{E_\gamma \cdot (\lambda/2\pi)}{r} \quad (71)$$

which is in a form reminiscent of FIG. 8 where the resultant potential energy times the distance between particles r equals the energy spread.

Figure 10:
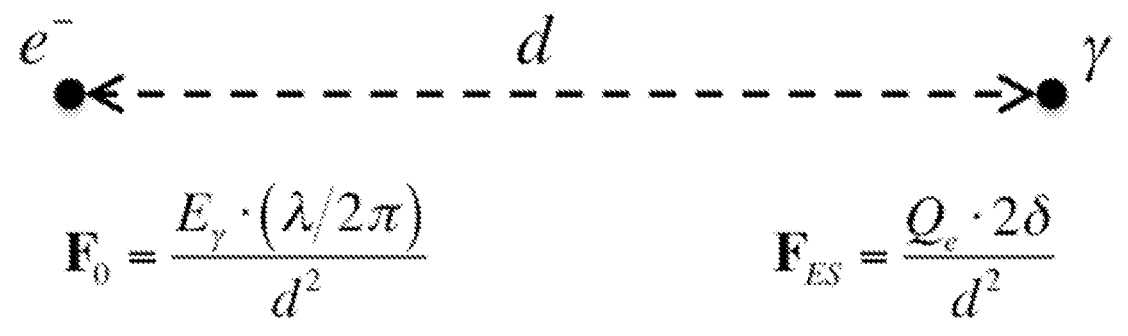

The fine structure constant is then the value of the force coupling dictated by the smaller of the forces interacting between the photon and the electron (as shown in FIG. 10).

Virtual Particles

In some embodiments, models herein describe the electromagnetic force between charged particles. Interactions between those particles and carriers of the electromagnetic force "photons" is further addressed herein. In traditional quantum field theory, interactions between particles may be described using the exchange of virtual particles, such as virtual photons. Virtual particles are understood as excitations of the underlying quantum fields, or energy states, but their existence is limited by the uncertainty principle; that is, they never reach an asymptotic, or stable, state. Virtual particle interactions are at the heart of the descriptions of many observable physical phenomena. The electromagnetic force, gravitational force, strong and weak forces, van der Waals force, Casimir effect, and many others have all been described in terms of virtual particle exchange. It is hypothesized that these virtual particles do not obey the speed of light limit or classical boundaries of time. Schematic representations of the interactions, called Feynman diagrams, are used to provide a generalized visualization of the complicated underlying processes; however, up to this point there has been no useful model that describes virtual particle structure.

In some embodiments, the geometrical models described herein may be expanded to include virtual particles. Thus, models described herein may address the aforementioned deficiencies in previous models. Embodiments described herein that model virtual particles may be used to describe a wide variety of forces and other effects, including, most generally, forces or effects commonly described using quantum field theory. In some embodiments, virtual particles may be used for modeling quantum entanglement, a physical phenomenon in which pairs of particles are generated or interact in spatial proximity in ways such that the quantum state of each particle of the pair is dependent on the state of the other. In some embodiments, this model may be applied to produce a measurement or predictive methodology by which extensive information about the state of the entangled particles can be measured or predicted, which is something that previously had not been possible.

Geometric models described herein model spacetime as being filled with Q-spheres and particles as locally stably packed groups of Q-spheres. Geometric models described herein may include structures satisfying this stable packing condition and which are furthermore extendable over a distance. For example, stably packed groups of Q-spheres extending over a distance may be used to describe forces or other phenomena that may act over a wide range of distances, such as ranging from atomic or sub-atomic dimensions to macroscopic dimensions. By way of example, a structure that satisfies both of these requirements is the same one used to model the photon previously, namely, a tetrahelix of Q-spheres. Notably, this is consistent with modern physics and quantum field theory wherein forces may be modeled over distance and wherein the force mediator of the electromagnetic force is hypothesized to be the virtual photon.

Accordingly, models described herein in which a virtual particle may be modeled as an extended stably packed group of Q-spheres (e.g., a Q-sphere tetrahelix as described previously for the photon) are not inconsistent with modern quantum field theory. In this description, where virtual particles are described as extended stably packed groups of Q-spheres arranged in the geometry of a tetrahelix, they may sometimes be described as a non-energetic Q-sphere tetrahelix. This terminology may be used to distinguish virtual particles from other photons, which may also be modeled by a Q-sphere tetrahelix. The current photon model includes a tetrahelix composed of Q-spheres that lies jointly in the spatial and temporal dimensions. In order to obey the given packing rules in the three-dimensional spatial subspace, the photon tetrahelix must shift out of that subspace and partially into the electromagnetic energy dimension, thus exhibiting energy, as described above.

However, the Q-sphere tetrahelix geometrical structure does not have to exist in that specific subspace. For example, it can exist in a three-dimensional spatial subspace (without a temporal component, or with only a very limited temporal component). In this case, it may exhibit no energy because the Q-sphere tetrahelix perfectly packs in three dimensions; thus, there is no necessity for the Q-spheres to shift into an energy subspace. Notably, if there is no component in the temporal subspace, the whole Q-sphere tetrahelix structure is present at a single moment of time with a temporal uncertainty governed by the photon duration quantitated in Eq. 40. This is consistent with the idea that a non-energetic Q-sphere tetrahelix "virtual particle" cannot transmit information itself instantaneously, which would be an impossibility due to the fact that energy cannot be transmitted faster than the speed of light.

Figure 12:
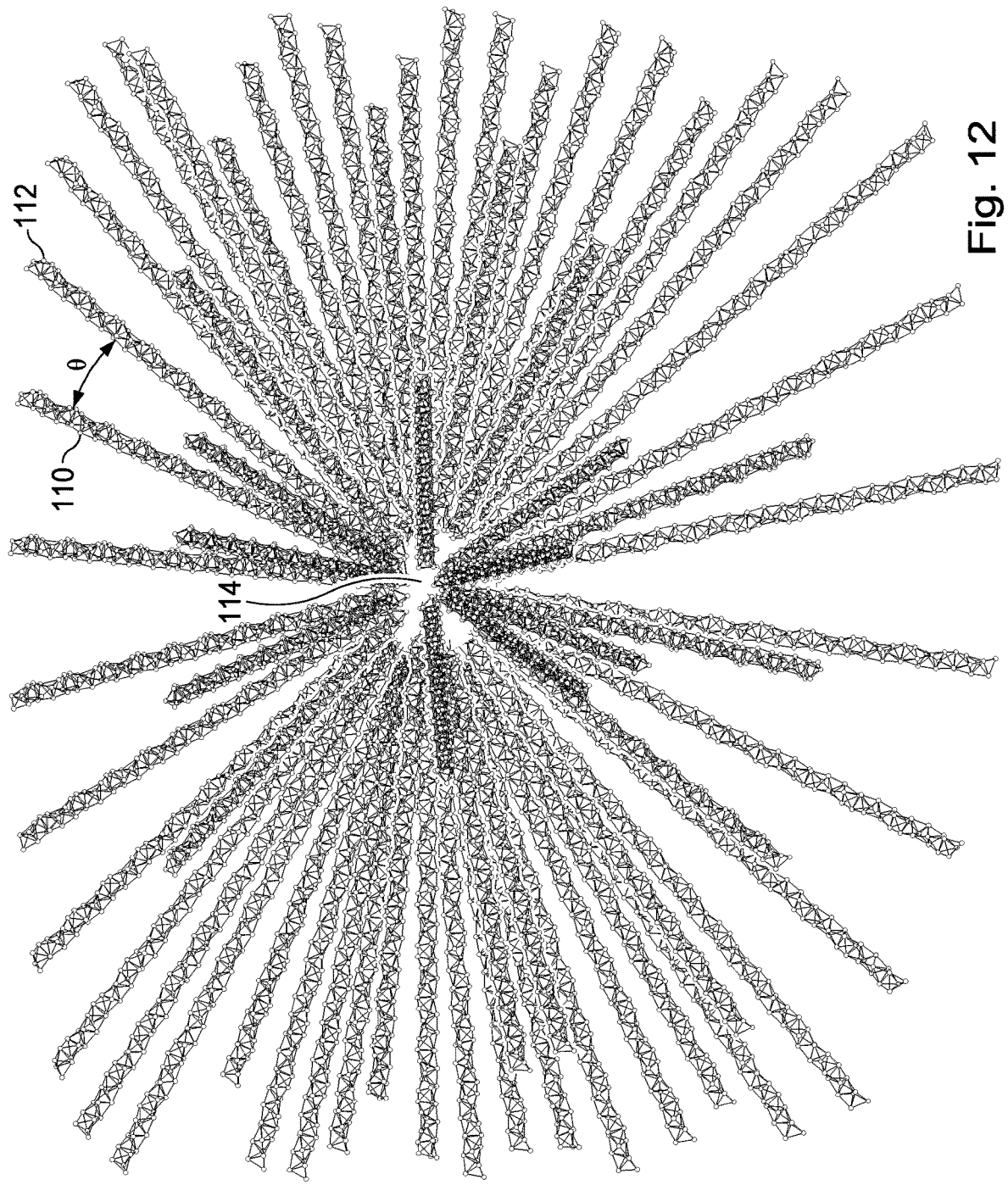
FIG. 12 is a schematic diagram illustrating a model of a virtual particle.

A nonenergetic Q-sphere tetrahelix is analogous to a virtual particle for at least two reasons. First, it may be used to model a temporary, transient particle without a temporal existence, or with only a limited, photon duration-defined temporal existence. Second, the characteristics of the "real" particle (energy, mass, etc.) may not necessarily be shared by the virtual version of the particle. In some embodiments, virtual particles may be modeled by non-energetic Q-sphere tetrahelices, such as may extend out from a "real" particle in any or all directions in the spatial subspace. This structure wherein virtual particles may extend out from one or more origins is similar to that of a dandelion (see FIG. 12). As shown in FIG. 12, non-energetic Q-sphere tetrahelices may extend out from a "real" particle or origin point in various directions. For example, a first non-energetic Q-sphere tetrahelix 110 may extend from an origin point 114. A second non-energetic Q-sphere tetrahelix 112 may also extend from the origin point 114. One or more angles may be used to describe the relative orientation of non-energetic Q-sphere tetrahelices. For example, an angle ($\theta$) may define the orientation between two non-energetic Q-sphere tetrahelices, such as shown for the exemplary first non-energetic Q-sphere tetrahelix 110 and second non-energetic Q-sphere tetrahelix 112 in FIG. 12.

In some embodiments, methods described herein may include modeling virtual particle structure. For example, modeling virtual particle structure may include providing a visual or physical depiction of a geometric model of virtual particle structure. In some embodiments, modeling virtual particle structure may include providing a numerical value based on a calculation of one or more properties of virtual particles or one or more properties of a perturbation or disruption of a quantum field related to virtual particles. Of course, some embodiments may also include providing both a visual or physical depiction of a geometric model of virtual particle structure and calculation of one or more properties of virtual particles or of a perturbation or disruption of a quantum field related to virtual particles and interactions thereof.

Figure 13:
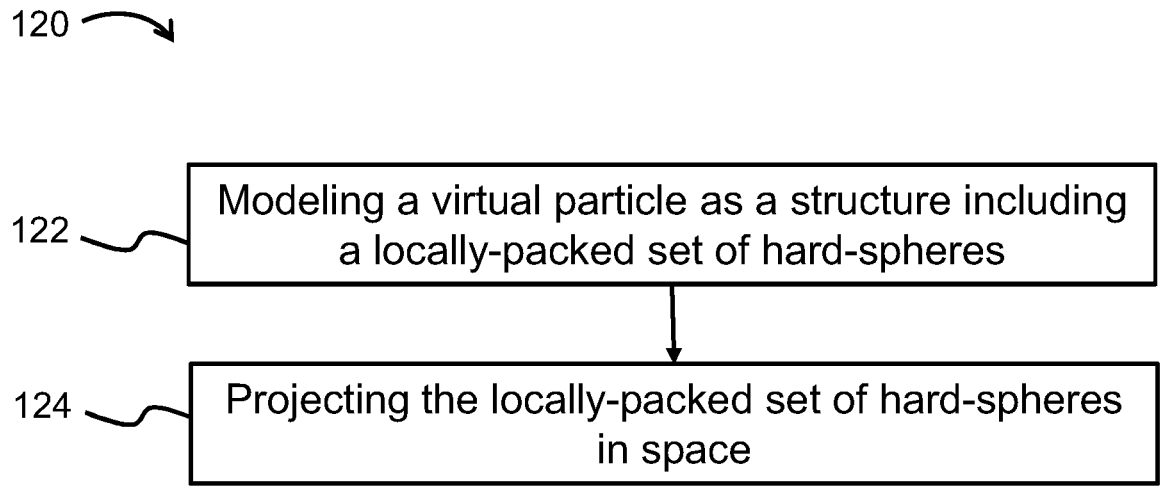
FIG. 13 is a flowchart of a method of modeling a virtual particle structure.

A method 120 for modeling a virtual particle structure is shown in FIG. 13. As shown in step 122, modeling of virtual particle structure may include determining a locally-packed set of hard-spheres, additional description of which is provided in earlier portions of this disclosure. Hard-spheres may, for example, be plotted or displayed, such as on a physical or computer-generated grid. When visualizing hard-spheres, a user may be given an option to increase the size and/or density representation of the spheres (e.g., a user may make the spheres more or less dense and/or opaque). For example, a user may be given an option to adjust the size and/or density representation of the spheres by rotating a computer mouse scrolling wheel, selecting a desired region of spheres by defining a rectangle or other shaped box on a display screen in order to zoom in on a desired region, choosing a selectable setting included in one or more drop-down menus selectable in a windows-based display, using another suitable method for adjusting the size and/or density representation of spheres, and combinations thereof.

As shown in step 124, a locally-packed set of hard-spheres may be projected into space. In some embodiments, the locally-packed set of hard-spheres may comprise a structure that may repeat. For example, as described previously, a photon may be modeled as a tetrahelix of spheres which may be stacked tetrahedra extending in a helical manner about a straight axis trajectory. Accordingly, projection of the photon in space may comprise adding one or more additional tetrahedra to another set of one or more tetrahedra. A virtual structure may further be extended without a geometry shifted out of the three spatial dimensions into one or more energy subspace dimensions, such as a shift in order for the particle structure to pack stably. Accordingly, the virtual particle may be modeled as a structure without an energy component.

In some embodiments, modeling a projection of a locally-packed set of hard-spheres in space may comprise selecting a region of space on a computer display. A programmed computer may be configured to add hard-spheres to generate a display of a virtual particle within the selected region. In an alternative way for modeling a projection of a virtual particle, a user may choose to add some number of units of locally-packed set of hard-spheres. For example, a user may select to add some number of tetrahedra, such as using a pull-down menu from a computer display, in order to extend the virtual particle structure.

Figure 14:
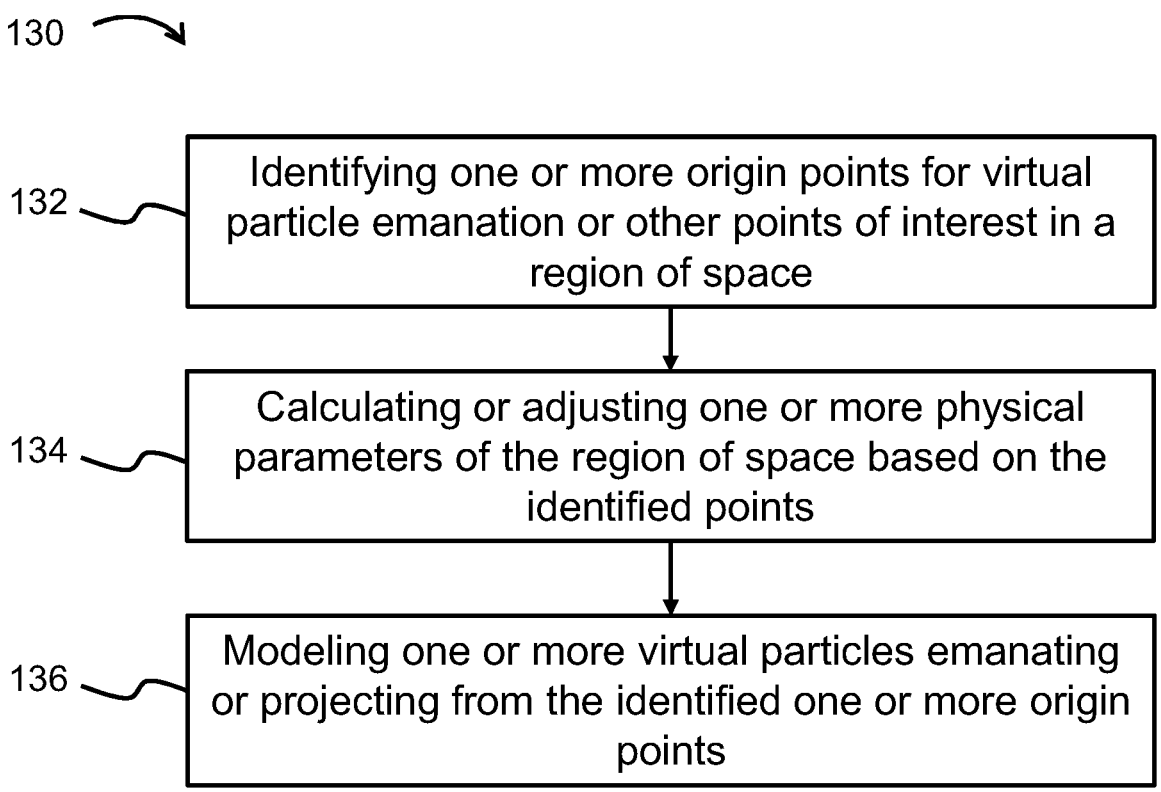
FIG. 14 is a flowchart of a method of modeling virtual particle emanation.

In some embodiments, methods described herein may include modeling one or more spatial fields and/or interactions with one or more virtual particles. For example, a method 130 for modeling virtual particle emanation and which may be used to model one or more field perturbations is shown in FIG. 14. As shown in step 132, one or more origin points for virtual particle generation or emanation may be identified within a region of modeled space. In some embodiments, other points of interest may also be identified. For example, a user may be given an option to select a region of space, such as a region defined in arbitrary or standard units of dimension, and to identify one or more origin points from which virtual particles may emanate. A region of space may comprise a vacuum continuum, or another medium of space, such as a medium of space characterized in some physical way, such as using a refractive index or an electromagnetic field strength, for example.

An origin point may, for example, identify a point or region of space from which virtual particles may emanate, such as may represent a point in space associated with a spontaneous emission event. An origin point may also identify a position of one or more particles, such as charged particles. For example, a user may identify a first origin point to define the position of a first charged particle. The user may also identify one or more additional origin points to define position(s) of one or more additional charged particles. As further described in step 134, virtual particles may then be used to model quantum field disturbances or interactions related to the one or more identified particles. In some embodiments, origin points may represent moving or vibrating particles. And, in some embodiments, a plurality of origin points may be defined such as may be used to model a structure with a charge distribution, such as a molecule or wire of current.

In some embodiments, other points may also be selected. For example, a user may be able to select one or more points in space from which virtual particles may not necessarily emanate. Those other points may, for example, define points or regions of space for calculation of one or more physical parameters, such as may be related to underlying electromagnetic fields or field perturbations as further described herein.

In some embodiments, a user may be given an option to select or adjust a region of space by moving or rotating a computer mouse or mouse scrolling wheel. A user may select a desired region of space by defining a rectangle or other shaped box on a display screen in order to zoom in on a desired region. A region of space may be scaled in arbitrary units or actual physical dimensions may be identified. In some embodiments, a user may select to view a region of space filled with a three-dimensional projection of a field of Q-spheres. For example, a three-dimensional field of Q-spheres may be plotted or displayed, such as on a physical or computer-generated grid configured to represent a localized region of space of interest for which insight into particle behavior is desired.

When visualizing a field of Q-spheres, a user may be given an option to increase the size and/or density representation of the spheres (e.g., a user may make the spheres more or less dense and/or opaque). For example, a user may be given an option to adjust the size and/or density representation of the spheres by rotating a computer mouse scrolling wheel, selecting a desired region of spheres by defining a rectangle or other shaped box on a display screen in order to zoom in on a desired region, choosing a selectable setting included in one or more drop-down menus selectable in a windows-based display, using another suitable method for adjusting the size and/or density representation of spheres, and combinations thereof. A user may toggle back and forth between a view displaying a field of Q-spheres and another view in which underlying Q-spheres may be omitted from display. For example, it may be useful to adjust a size and/or density representation of Q-spheres so that emanated virtual particles (as described in step 136) are displayed in a desired manner. However, a user may prefer a display that does not show Q-spheres when selecting origin points.

To select an origin point, a user may move a cursor over a point of space on a display screen and click a button to establish the origin point. Alternatively, a user may enter coordinates to select an origin point. A user may also select a first origin point and then select to position additional origin points in relation to the first origin point. For example, a user may choose to place a second origin point at some relative distance, angle, or both from a first origin point. A user may also select one or more pull-down menus when selecting or editing an origin point. A pull-down menu may, for example, allow a user to select a type of origin point. For example, a user may be able to select an origin point type identifying the origin point as a particle, such as an electron or other charged particle, or as defining a reference point for an emission event, such as may identify a point for creation of a positron or other particle(s) that may be produced via spontaneous emission. In some embodiments, a user may identify that an origin point may move or vibrate, such as at some velocity, speed, amplitude, or frequency. For example, an origin point may be a charged particle which may be stationary or moving.

In some embodiments, a computer program or processor may be configured to allow a user to select a predetermined pattern of origin points. For example, a computer program or processor may allow a user to access a unit of memory wherein predefined patterns of origin points are stored. For example, a predefined pattern of origin points may describe a position of charged particles as they may exist in one or more structures, such as a crystalline structure or other physical structures of interest. A user may further be provided with capability for storing and editing preconfigured or newly generated files which include one or more origin points.

In some embodiments, as shown in step 134, one or more physical parameters may be calculated based on the identified points. For example, in some embodiments, methods described herein may include calculating an electromagnetic field based on the identified origin points. A calculated field strength may, for example, be calculated based on existing models governing the generation of electromagnetic fields, such as Maxwell's equations. As noted previously, a region of space may, in some embodiments, be characterized by one or more fields. For example, a region of space may include a base electric field of some constant or varying electric field strength. Following addition of one or more new origin points (e.g., origin points defining structures with an electric charge), the base electric field may be adjusted. Alternatively, if the original region of space prior to origin point addition was free space or some other space without a base electric field (or other field), electric fields created from identified origin points may be calculated. In some embodiments, a user may be able to toggle a display screen between a first view showing one or more of an electric field and/or a magnetic field and a second view without the one or more of an electric field and/or magnetic field shown. Accordingly, virtual particles and related disturbances in quantum fields may, for example, be viewed with or without presentation of any electromagnetic fields which may be present in a modeled region of space. In other embodiments, methods or programs or systems described herein may not include this step or functionality.

As shown in step 136, one or more virtual particles emanating or projecting from the identified one or more origin points may be modeled. For example, as shown in FIG. 12, one or more virtual particles may be modeled as one or more non-energetic Q-sphere tetrahelices projected out from a "real" particle or origin point in any of various directions. In some embodiments, a three-dimensional representation of one or more non-energetic Q-sphere tetrahelices may be plotted or displayed, such as on a physical or computer-generated grid configured to represent a localized region of space of interest for which insight into particle behavior is desired, such as insight into forces or other phenomena acting at a distance, for example.

When visualizing one or more non-energetic Q-sphere tetrahelices, a user may be given an option to increase the size and/or density representation of the spheres (e.g., a user may make the spheres more or less dense and/or opaque). Accordingly, Q-sphere representation may be determined before the non-energetic Q-sphere tetrahelices are generated (as described in step 132 when viewing a grid of underlying Q-spheres), after generation or projection of non-energetic Q-sphere tetrahelices, or both. A user may also be given an option to increase or decrease a density of displayed non-energetic Q-sphere tetrahelices. For example, a user may be given an option to adjust the size and/or density representation of displayed non-energetic Q-sphere tetrahelices by selecting a displayed non-energetic Q-sphere tetrahelix and rotating a computer mouse scrolling wheel to adjust the display density. Alternatively, a density of displayed non-energetic Q-sphere tetrahelices may be selected by choosing a selectable setting included in one or more drop-down menus selectable in a windows-based display. Further by way of example, a user may be given an option to adjust a number of displayed non-energetic Q-sphere tetrahelices by varying an angle between displayed non-energetic Q-sphere tetrahelices.

Figure 15:
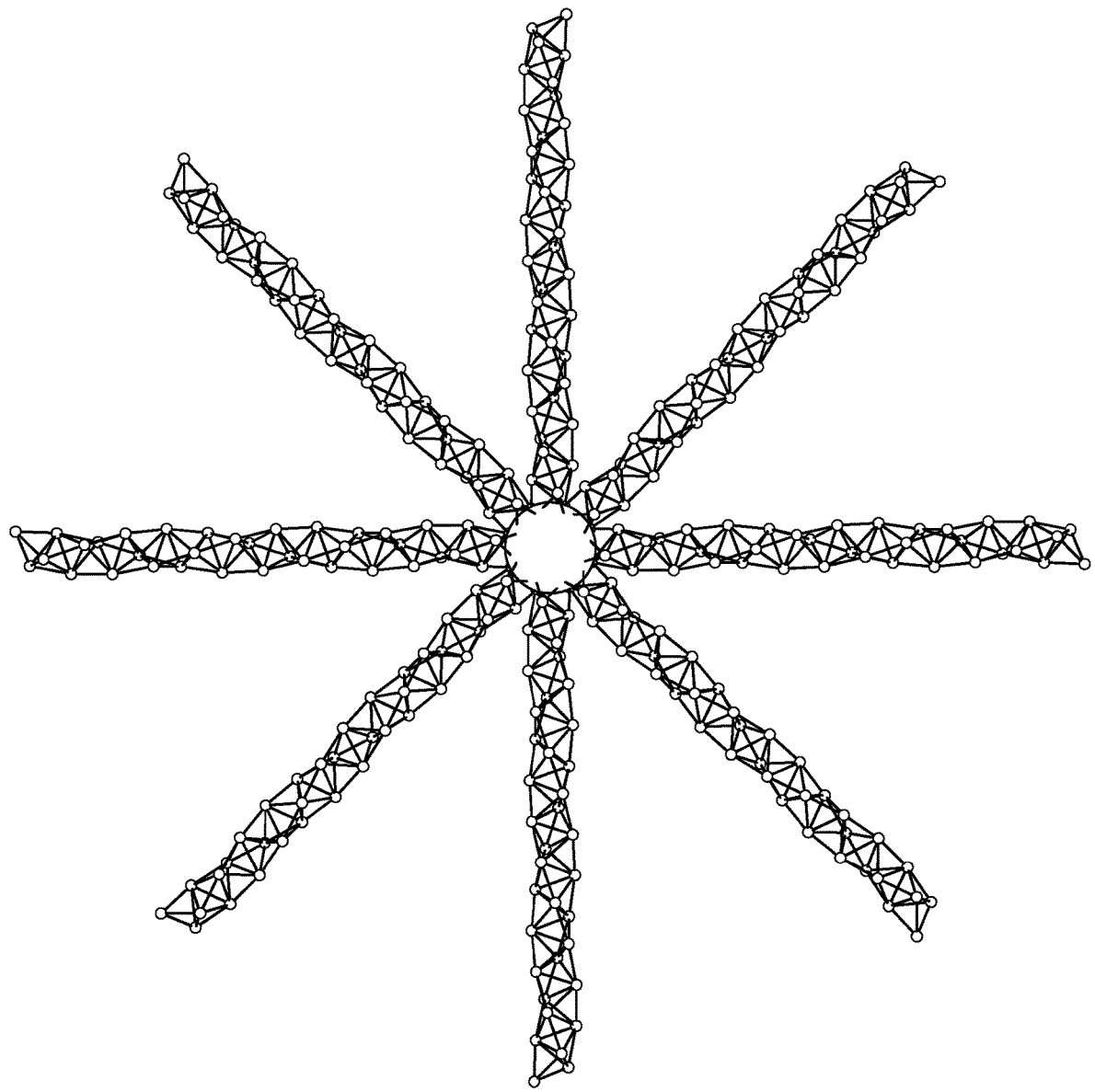
FIG. 15 is a schematic diagram illustrating a number of non-energetic Q-sphere tetrahelices.

For example, as shown in FIG. 15, a user may select a number of non-energetic Q-sphere tetrahelices to be displayed in a plane by selecting to display an extended Q-sphere tetrahelix structure every 45 degrees, or other suitable angle between 0 degrees and 360 degrees. Or, a density in three dimensions may be defined based on angles using spherical coordinates. Alternatively, a user may select a number of non-energetic Q-sphere tetrahelices which may extend from one or more origin points. For example, a user may be able to select a given origin point among one or more origin points and further select a number of non-energetic Q-sphere tetrahelices extending from the selected point. Thus, different origin points may be selected to display non-energetic Q-sphere tetrahelices at different density. In some embodiments, a density of projecting non-energetic Q-sphere tetrahelices may be automatically scaled based on one or more properties of the origin point. For example, a density of projecting non-energetic Q-sphere tetrahelices from a selected origin point may be related to the magnitude of charge of the selected origin point. A user may further be able to toggle between more or less dense projections of non-energetic Q-sphere tetrahelices.

In some embodiments, methods may automatically determine overlapping projections of non-energetic Q-sphere tetrahelices from different origin points. Or, non-energetic Q-sphere tetrahelices extending between origin points or intersecting other points of interest may be identified.

Figure 16:
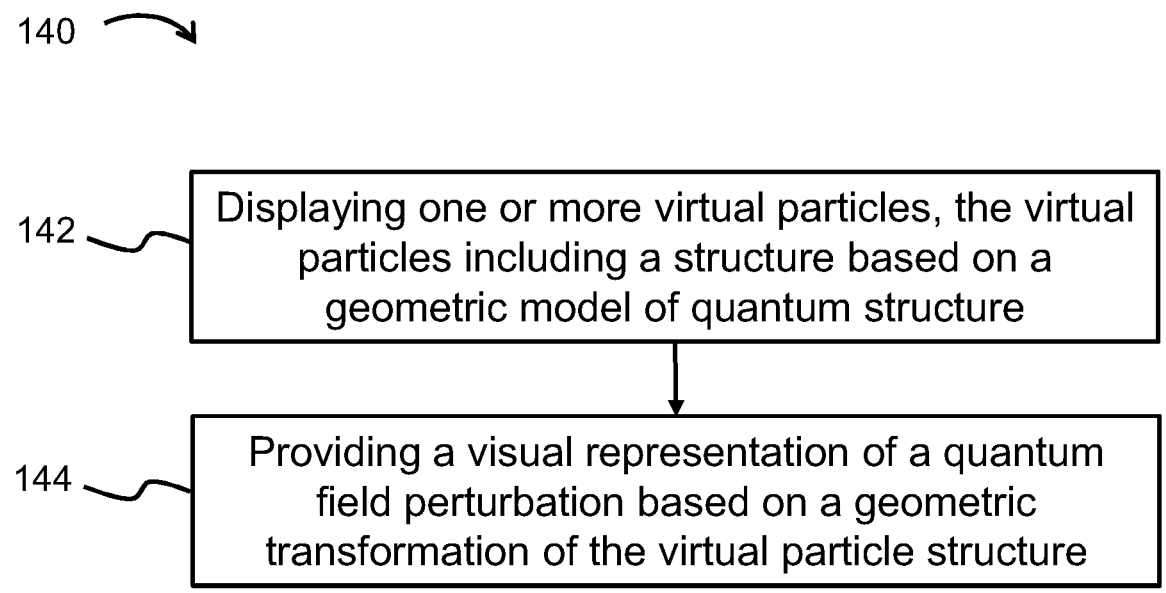
FIG. 16 is a flowchart of a method of modeling virtual particle emanations or related disruptions or perturbations in one or more quantum fields.

Another embodiment of a method 140 of modeling virtual particle emanations or related disruptions or perturbations in one or more quantum fields is shown in FIG. 16. As shown in step 142, one or more virtual particles, the virtual particles including a structure based on a geometric model of quantum structure, may be displayed. For example, the structure may comprise a plurality of geometric spheres meeting a geometric packing requirement (e.g. locally stable packing) in the three spatial dimensions.

In a step 144, a visual representation of a quantum field perturbation may be provided, the visual representation based on a geometric transformation of the virtual particle structure. In some embodiments, the geometric transformation may comprise shifting an amount of hard-sphere volume (or other change in geometry, such as area or length, for example) shifted out of the three spatial dimensions into one or more energy subspace dimensions. An amount of hard-sphere geometry may, for example, comprise a fractional amount of a hard-sphere volume or other change in geometry for the structure to pack stably. To display an amount of hard-sphere volume or other change in geometry, various techniques may be used. For example, in some embodiments, an amount of hard-sphere volume shifted into one or more energy subspace dimensions may be depicted by shading the shifted volume in a manner to differentiate the shifted volume from the total volume of all modeled hard-spheres for a given particle. In some embodiments, together with a visual representation of an amount of hard-sphere volume shifted into one or more energy subspace dimensions, a calculated hard-sphere volume may further be determined.

As noted above, virtual particles may be used for modeling quantum entanglement. Any observable attribute of a quantum particle can be involved in entanglement. The current model can be generalized to any observable attribute; however, for illustrative purposes, one example is chosen. Since previous sections have gone into significant detail with the calculation of tetrahelix spin, the quantum spin of a particle will be used as an example of an entangled observable attribute. It has been shown that tetrahelices carry spin angular momentum and are chiral, i.e., each exhibits two classes of spin angular momentum that are not superimposable: spin-up and spin-down. Thus, in the dandelion model of virtual particles shown in FIG. 12, the virtual particle tetrahelices shown are a mixture of both classes of spin. The resulting question is: can this particle model surrounded by mixed classes of virtual particle tetrahelices be shown to give observable results consistent with experiment? This question is answered in the next section.

Spin Correlation Function

In the current model described herein, spin-up and spin-down Q-sphere tetrahelices may be mixed throughout the dandelion structure of the particle interaction model. Therefore, as a particle's spin is measured along a certain direction, the measured spin will be the spin that is carried by the virtual particle tetrahelix that lies in that direction. In order to satisfy the measured characteristics of particle spin embodied in Bell's Theorem (which has been experimentally validated), we propose a nearest-neighbor correlation function herein that defines the location-based probability of spin type based on the spin of the neighboring tetrahelices. As is commonly known by practitioners in the field, the following statements are known features of quantum particle spin: (1) The spin on the two poles of an axis of the sphere are 100% anti-correlated, (2) the spin along perpendicular axes are uncorrelated, and (3) the correlation of entangled pairs follows a sinusoidal pattern when the angle of detection is varied (Bell's Inequality). Observations (1) and (2) define the correlation function between two spin directions X and Y as:

$$1) \operatorname{corr}\left(\angle \vec{X}\vec{Y}=\pi\right)=-1 \quad (71.1)$$
$$2) \operatorname{corr}\left(\angle \vec{X}\vec{Y}=\frac{\pi}{2}\right)=0$$

To satisfy observation (3), the simplest sinusoidal function that matches the conditions in Eq. (71.1) is proposed and it is:

$$\operatorname{corr}(\angle \vec{X}\vec{Y}=\theta)=\cos(\theta) \quad (71.2)$$

Thus, if one were to examine two of the virtual particle tetrahelices separated by a certain angle θ in a repeated fashion, one would find the correlation of the tetrahelices' spin direction to agree with Eq. 71.2. Thus, we have shown that the dandelion model illustrated in FIG. 12 is consistent with experimental results (Bell's theorem) if the dandelion is constructed so that the correlation of virtual particle tetrahelix spins equals the correlation function given in Eq. 71.2.

Quantum Entanglement

As noted above, quantum entanglement is a physical phenomenon that occurs when groups of two or more particles interact in ways such that the quantum state of one particle depends on the state of the other particles. This dependence persists even when a large distance separates the particles. Thus, a quantum state must be described for the system as a whole. Quantum systems can become entangled through various types of interactions. For example, a spin-zero system may emit or decay into a pair of spin-½ particles. The total spin before and after this decay/emission event must be zero, due to conservation of angular momentum.

Thus, in order for the spin-zero system to decay into two spin-½ particles, the two resulting particles must be of completely opposite spin profiles. Therefore, wherever particle 1 has a spin-up tetrahelix, particle 2 must have a spin-down tetrahelix, and vice versa. This entire equalization process happens during an emission/decay event, and the result is two particles with completely opposite spin profiles.

By inspecting the system of the two particles, the entanglement process is visualized. Defining the z-direction to be the direction between the two particles, the virtual tetrahelices from both particles in that direction can be examined. Without losing generality, it is assumed that the virtual tetrahelix from particle 1 to particle 2 is along the +z-direction and is spin-up. Due to entanglement, particle 2 must have a spin-down tetrahelix extending along the +z-direction. However, due to observation (1) above, the virtual tetrahelix extending from particle 2 in the −z-direction (toward particle 1) must be spin-up. This last statement is due to the known fact that the spin in the −z-direction must be completely anti-correlated with the +z-direction tetrahelix. As a result, the virtual tetrahelix extending between the two particles is a single spin-up tetrahelix (see FIG. 17).

This tetrahelix connection persists as the particles move apart and keeps the particles in their anti-correlated spatial arrangement. Using Eqs. 71.1 and 71.2, a correlation function between tetrahelices can be defined extending in different directions from each particle. Eq. 71.2 is the correlation function between the tetrahelices in particle 1, for example. Because it is also known that particle 2 is completely anti-correlated with particle 1, the correlation function will be the negative of the single particle correlation function, i.e., $$\mathrm{corr}(\angle \vec{X}_1 \vec{Y}_1 = \theta) = -\cos(\theta) \qquad (71.3)$$

For clarity, the spin directions are subscripted with the number of the particle in this equation. Here, it is noted that this correlation function exactly satisfies Bell's inequality, which is a critical result regarding quantum entanglement that suggests entanglement is a quantum phenomenon and not purely a result of local hidden variables. Thus, the current method of using non-energetic Q-sphere tetrahelices to model virtual photons accurately describes quantum entanglement, agreeing with known observable behavior from experiment.

Application for Quantum Communication

A key feature to quantum communication using entangled particles (photons, electrons, etc.) is that once an attribute of one of the particles is measured, the value of the attribute of the other particle may be known. For example, in the case of a spin-zero system that emits/decays into two entangled particles, it is known that the attribute of the second particle is opposite the measured attribute of the first particle.

Figure 17:
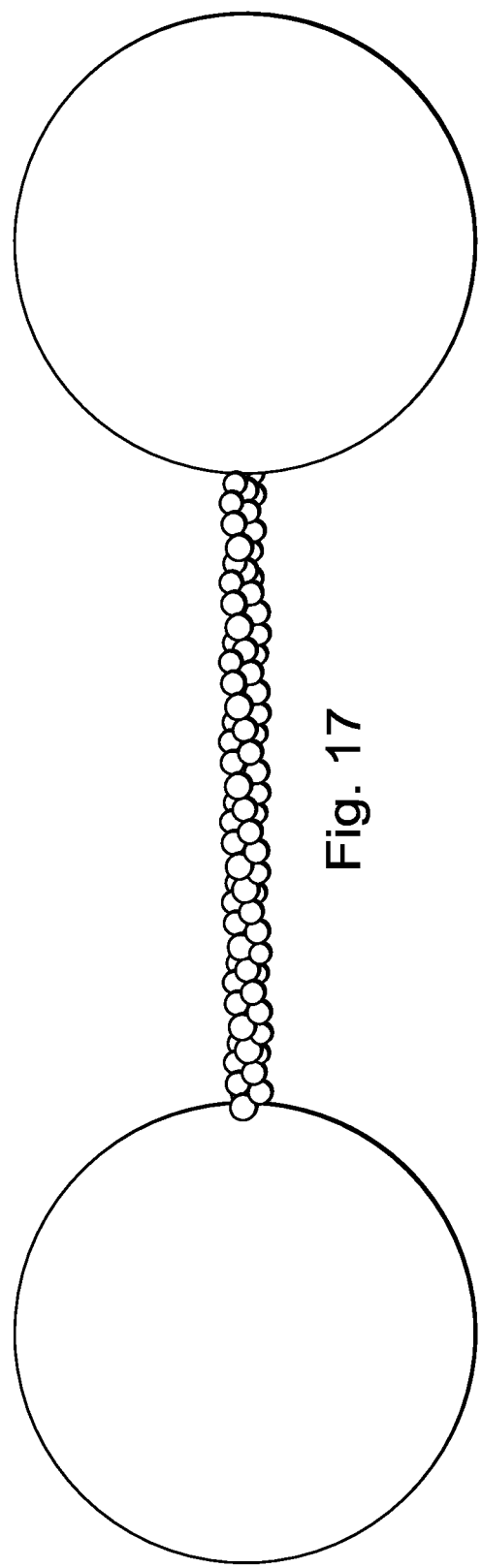
FIG. 17 is a schematic diagram of a virtual tetrahelix extending between two particles.

Traditional quantum mechanics theory posits that when a spin measurement is taken, the spin states along any other direction are reinitialized, and thus any results from subsequent measurements of other spin states are completely randomized and uncorrelated, even if entanglement initially existed. This traditional conclusion is based on experimental results that appear to imply a probabilistic distribution of resulting spin measurement outcomes upon subsequent measurements, concluding therefore that prediction of the spin outcomes is impossible and any correlations between entangled particles is destroyed upon a single spin measurement. However, the dandelion model described herein supplies a reasonable model which is deterministic (and therefore predictable) while providing an explanation of the apparently random experimental results if the spin of each virtual particle tetrahelix follows the correlation pattern given in Eq. 71.2. In other words, previously existing models fail to predict any deterministic relationship between spin state and a plurality of measurement angles in an entangled pair of particles. The methods described herein address this deficiency. Specifically, in the dandelion Q-sphere tetrahelix structural model, the tetrahelices may be arranged in a manner given in Eq. 71.2 that produces the apparent randomness observed in a traditional model. Additionally, in the dandelion Q-sphere tetrahelix structural model, even if the particle orientation is altered by the measurement of spin state in a given direction, the dandelion structure itself may persist after a measurement is taken, and correlations will persist between the spin states of the particles as well. Up to the point that the entanglement is broken via a measurement of one of the particles, the virtual particle that links the two entangled particles (as illustrated in FIG. 17) maintains the orientation of each particle in relation to the other. However, after the entanglement is broken the two particles will retain their orientation via the fact that angular momentum must be conserved, much like a gyroscope which maintains its orientation even though its surroundings may be rolling or rotating. The process of measurement may cause alteration of the particle's angular momentum and thus cause a rotation of the particle. However, due to the fact that both particles are identical at the point of entanglement breaking, if they are subjected to identical measurement processes, and since the angular momentum change is a deterministic process, the dynamics should be the same (or very close) and thus the trajectories of the two particles through the measurement process should be very similar. We note here that this communication process is robust. If due to noise or small differences in the transmitter and receiver measurement apparatuses the angles measured are slightly different for the two particles, there will still be a very good agreement in resulting bit strings due to the strong correlation of spin of neighboring virtual particle tetrahelices (given in Eq. 71.2). For example, even if the difference in measurement angle were 10 degrees, the probability of extracting the same bit value would be 97%. Therefore, a message could be sent with only a moderate error correction overhead on the analog bit string. Thus, the current model suggests that if one sequentially measures the same attribute of particle 1 along several different angles of orientation, one will get a predictable result when one measures the attribute of particle 2 along the same angles of orientation. For example, one may get the exact opposite result if the dandelion structure remains intact following measurement. Therefore, the information density of the bit string may be scaled up significantly from just a single bit of information if the spin were measured along only one angle of orientation. For example, as opposed to an electron characterized as one of two possible spin states, the electron may define a plurality of spin states, individual spin states describing the spin of the electron with respect to one or more orientation axes of a spin state measurement device (or orientation axis of a unit of a spin state measurement device).

Figure 18:
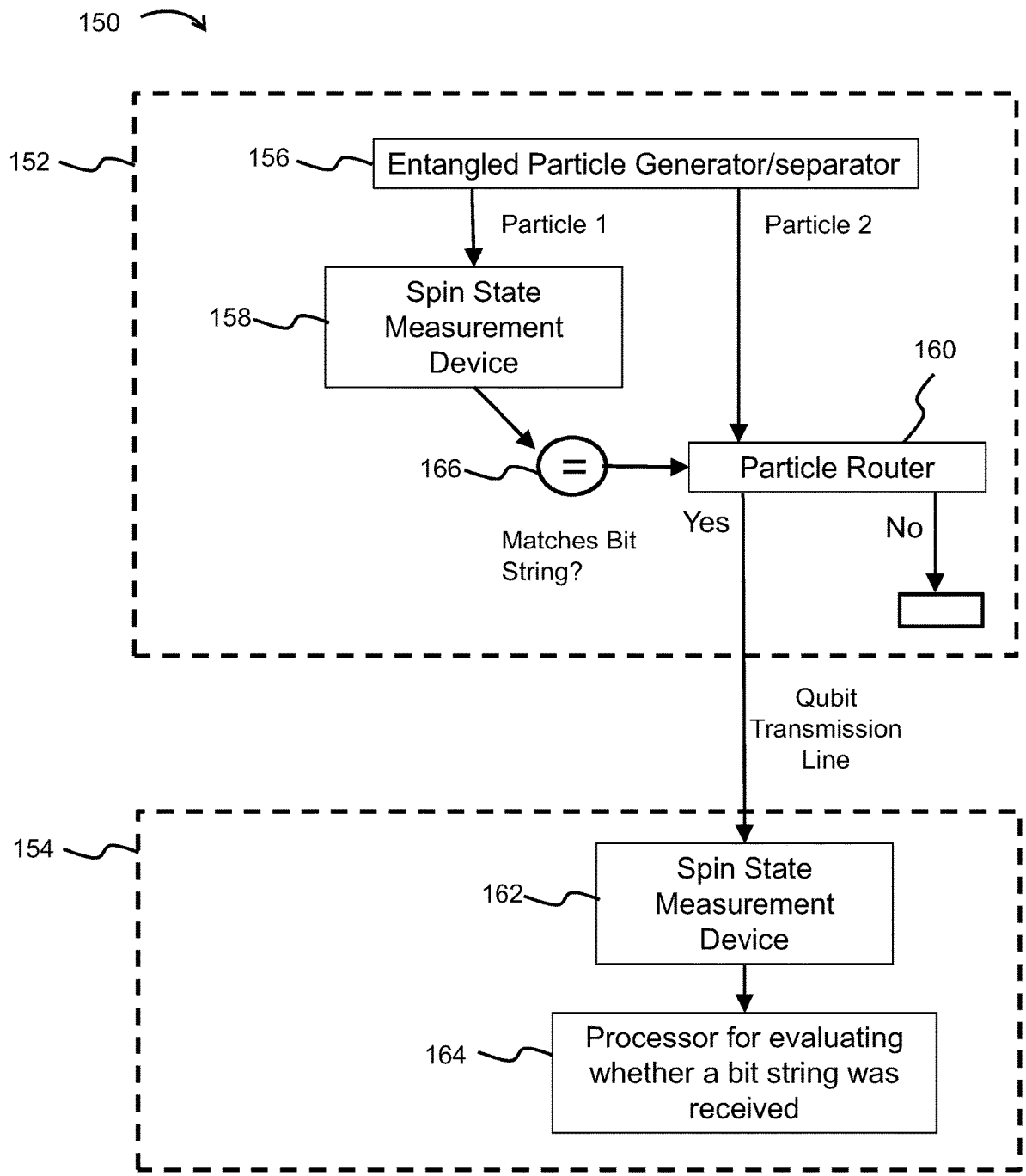
FIG. 18 is a schematic diagram of a quantum communication system.

A block diagram of a novel communication system 150 is shown in FIG. 18. The communication system 150 may be configured for sequential measurement of one or more particles of a pair of entangled particles and significantly increased information density of bit strings. As shown in FIG. 18, the system 150 may include a transmitter system 152 (identified by components within a first dashed line rectangle in FIG. 18) and a receiver system 154 (identified by components within a second dashed line rectangle in FIG. 18). The transmitter system 152 may, for example, include an entangled particle generator and separator 156, a spin state measurement device 158, a processor 159, and a particle router 160. The receiver system 154 may, for example, include a spin state measurement device 162 and a processor 164 for analysis of the bit string received.

There are a number of known ways to generate entangled photon pairs or electron pairs from a spin-zero system and separate a pair of entangled particles. Some examples of ways to produce entangled electrons include the splitting of Cooper pairs, using magnetic impurities with special beamsplitter geometries, and the use of carbon nanotubes.

Further information concerning the creation of entangled electrons and constructing a Cooper-pair beamsplitter is also described in "Carbon Nanotubes as Cooper-Pair Beam Splitters," L. G. Herrmann et al., Physical Review Letters, Jan. 11, 2010. As described therein, a mechanism for converting Cooper pairs into quasiparticles is the Andreev reflection, a process wherein a quantum coherent electron pair in the singlet spin state is produced at an interface between a superconductor and a normal conductor. Anomalous scattering in graphene may further promote Cooper-pair splitting. In some embodiments, entangled particle generator and separator 156 may comprise a Cooper-pair beam splitter as generally described in Herrmann et al., wherein a central superconductor electrode may be connected to two quantum dots engineered in a single wall carbon nanotube, the nanotube disposed between two electrodes. Once prepared, any of a number of structures may be used to route entangled electrons between different paths. For example, as understood by those skilled in the art, entangled electrons may be transported and separated using quantum dots, such as may be integrated into solid-state circuits using known semiconductor manufacturing techniques. In other embodiments, a pair of generated entangled electrons may be separated using a Stern-Gerlach Apparatus.

Entangled photons may, for example, be generated by splitting a single photon by directing it into a crystal of beta-barium borate or having a spin-zero source that regularly produces two-photon decay events. In some embodiments, entangled particle generator and separator 156 may comprise a photon source which is directed through a non-linear optical crystal. By selectively passing photons using a spatial or other filter, a pair of entangled photons may be created. The two photons may be separated using a beamsplitter, such as may comprise a dichroic mirror (e.g., such as may be used with entangled photons wherein the entangled observable is polarization and different wavelengths). Alternatively, a beamsplitter may be a polarizing beam splitter.

In some embodiments, spin state measurement device 158 may be configured for detection of electrons or other particles exhibiting spin and may include a Stern-Gerlach Apparatus. A Stern-Gerlach Apparatus may comprise a group of magnets for producing an inhomogeneous magnetic field. The inhomogeneous magnetic field therein may cause particles to deflect based on the particle's spin. For example, a Stern-Gerlach Apparatus may be characterized by an inhomogeneous magnetic field with a magnetic field gradient in a predefined direction, such as a direction based on the shape, strength, and orientation of magnets included therein. In some embodiments, spin state measurement device 158 may comprise a Stern-Gerlach Apparatus with two or more units or sections placed in series. Each unit or section of a series Stern-Gerlach Apparatus may be configured for generating an inhomogeneous magnetic field with a magnetic field gradient in a predefined direction.

For example, in some embodiments for using a series Stern-Gerlach Apparatus, an electron may be passed through a first group of magnets. The first group of magnets may establish a first inhomogeneous magnetic field that deflects an electron in an amount dependent upon a first spin state of the electron. An appropriately deflected electron (e.g., an electron that meets a first condition of a bit string) may pass to a second group of magnets. The second group of magnets may establish a second inhomogeneous magnetic field that deflects an electron in an amount dependent upon a second spin state of the electron. The first and second spin states described herein may, for example, refer to a spin orientation of the electron with respect to a magnetic field gradient defined for different sections of the series Stern-Gerlach Apparatus. Electrons passing through one or more sections of a series Stern-Gerlach Apparatus may be detected using one or more electron detectors. And, one or more detection signals may be passed to a processor 159 to log detection of an electron as having a plurality of spin states (e.g., first and second spin states using the two-section exemplary apparatus described above). In some embodiments, spin state measurement device 158 may comprise a Stern-Gerlach Apparatus with two or more sections, such as may be used to characterize a first entangled particle in a plurality of states, such as between two to five states, for example. The processor 159 may receive the one or more detection signals from the electron detector and use that information to compare the identified spin state for particle 1 (e.g., a first member of a pair of entangled electrons) to an established bit string as shown at 166, and an appropriate control signal identifying the detected electron as matching or not matching the established bit string may be sent to particle router 160.

In some embodiments, an entangled pair of particles may comprise a pair of photons. For example, "particle 1" may comprise a first photon of a pair of entangled photons, and "particle 2" may comprise a second photon of a pair of entangled photons. Photon spin can also be measured straightforwardly using linear optics components and polarizers, for example. To access the different spin directions of a photon, the path of the photon can be altered with appropriate refraction techniques. And, in some embodiments, spin state measurement device 158 may comprise one or more polarizers in series and an appropriate photon detector (e.g., a photomultiplier tube or charge-coupled device) for detection of photons suitably polarized, such as to match an expected bit string based on one or more polarization states.

The transmitter system 152 may further include a particle router 160. As shown in FIG. 18 at 166, spin state measurement device 158 may be used to verify whether a first entangled particle "particle 1" matches an expected bit string. For example, the first particle may be verified as matching an expected bit string based on a plurality of individual spin states as verified when an electron passes a plurality of sections of a series Stern-Gerlach Apparatus. A computer processor (not shown) may communicate this information to particle router 160. Particle router 160 may, for example, comprise a solid-state device including a pair of gate-controlled quantum dots, isolation of which is controlled by gate voltages applied therein. In some embodiments, an applied gate voltage may be controlled by a clock or oscillator (not shown) synchronized with entangled particle generator and separator 156 and further receiving one or more signals from spin state measurement device 158. Accordingly, an applied voltage may be applied to variably pass or block an electron. For example, if the measured electron states match an expected bit string, a gate voltage may be applied by particle router 160 to route an electron (e.g., "particle 2" in FIG. 18) for transmission, such as over a distance using a qubit transmission line, for example.

There are numerous ways scientists can transport entangled particles long distances without destroying the entanglement. For example, because the photon generally does not react with any other particles during its transport, entangled photons have been transported long distances through the atmosphere. Entangled electron transport may include transmitting electrons through an electrical conductor.

The receiver system 154 may include a spin state measurement device 162 and a processor 164 for evaluating whether a bit string was received. Spin state measurement device 162 may, for example, comprise a series Stern-Gerlach Apparatus as may be similarly constructed for spin state measurement device 158. Or, spin state measurement device 162 may comprise one or more polarizers in series and an appropriate photon detector (e.g., a photomultiplier tube or charge-coupled device) for detection of photons suitably polarized. Depending on whether measured states (e.g., spin states or polarization states) match states associated with an expected bit string, one or more detection signals may be sent to the processor 164.

An embodiment of a method of quantum communication 170 is shown in FIG. 19. In some embodiments, the method 170 may be executed using the system 150, or another suitable system may be used. In a step 172, an entangled pair of particles may be generated, such as may be accomplished using entangled particle generator and separator 156. In some embodiments, the pair of particles may be electrons and may include a first entangled electron and a second entangled electron. In other embodiments, the pair of particles may be photons and may include a first entangled photon and a second entangled photon. Of course, the entangled particles may be other types of particles in some embodiments.

As shown in step 174, an observable property of a first particle among the pair of entangled particles may be measured along two or more angles of orientation. The two or more angles of orientation may, for example, be agreed upon angles for measurement of particles, such as may be agreed upon by each of a transmitter and a receiver of information. In some embodiments, a first orientation angle among the at least two agreed upon angles of orientation may be a spin orientation of an electron with respect to a magnetic field gradient in a first section of a series Stern-Gerlach Apparatus. Likewise, a second orientation angle may be to a spin orientation of an electron with respect to a magnetic field gradient in a second section of a series Stern-Gerlach Apparatus. In some embodiments, wherein the entangled particles comprise photons, the measurement orientations may comprise each of a first polarization state and a second polarization state for the first entangled photon.

As shown in step 176, the second entangled particle may be selectively routed between a transmitter and receiver based on the measured observables for the first entangled particle. For example, an equality check may be made to ensure the measurement results for the observed property agree with the bit string that needs to be communicated. If the measurement results agree with the desired bit string, particle 2 may be transmitted to the receiver. If the measured observable properties of the first particle do not agree with the desired bit string, the particle may be disposed of. As shown in step 178, once the second entangled particle arrives at the receiver, observable properties of the second entangled particle may be measured using the pre-determined angles of orientation, and the bit string may be recovered.

For example, one may assume the message that needs to be sent is the bit string "1001" using particle 2. Without losing generality, it is assumed that a spin-up measurement equals a "1," and a spin-down measurement equals a "0." In the case of entangled particles emitted/decayed from a spin-zero system, to meet the criteria of "1001" for particle 2, particle 1 should be measured as "0110," which is "spin-down, spin-up, spin-up, spin-down." The process starts with the generation of a pair of entangled particles. The spin of particle 1 is measured along four pre-determined angles. If the four measurements agree with the desired bit string, particle 2 is sent on its way toward the receiver. If the measurements do not agree with the desired bit string, the particle pair is discarded, a new pair is generated, and the measurement is repeated. On average, it would take 16 entangled particle generation events to get a correct pattern of 4 bits, but assuming the generation and measurement process is rapid, it will be a very short time until a correct pair of particles is found. A possible architecture change would be to have 16 holding areas to store each type of qubit until it is needed for transmission. This could reduce a number of entangled particle pairs that would need to be produced and would give a gain in bit rate.

This communication system may be applied in a number of ways. There are many ways to generate entangled photon pairs or electron pairs from a spin-zero system. Some examples of methods to produce entangled electrons include the splitting of Cooper pairs, using magnetic impurities with special beam-splitter geometries, and the use of carbon nanotubes. Entangled photons can be generated by splitting a single photon by shooting it into a crystal of beta-barium borate or having a spin-zero source that regularly produces two-photon decay events. Additionally, there are numerous ways scientists can transport entangled particles long distances without destroying the entanglement. Because the photon generally does not react with any other particles during its transport, entangled photons have been transported long distances through the atmosphere. Entangled electron transport is an active area of research, and candidate methods include transportation through an electrical conductor. Also, particle spin can be measured in several different ways. A straightforward method of measuring electron spin is to place the particle in an inhomogeneous magnetic field that causes different particle deflections that depend on the spin of the particle. This apparatus is commonly called a Stern-Gerlach Apparatus, and several of these units can be placed in series to measure several different spin directions of a particle. Photon spin can also be measured straightforwardly using linear optics components and polarizers, for example. To access the different spin directions, the path of the photon can be altered with appropriate refraction techniques.

In some embodiments, within the geometric framework described herein, one may normalize units to a standard generalized length unit that is natural for such geometry, rather than transform to and from traditional units (like SI units, for example). The full rationale and some important values that arise from this normalization are presented in Appendix B, which is incorporated herein by reference.

As persons of ordinary skill in the art will appreciate, a novel geometrical model of quantum structure and behavior is presented herein which may account for many of the observed features of the electron and photon along with their interaction coupling strength, the fine structure constant. In some embodiments, models described herein may begin with a minimal number of assumptions based on fundamental geometry and may build out in complexity using only those few assumptions as constraints. It is shown that some of the models described herein may account for the mass and charge of the electron as well as the energy characteristics and spin angular momentum of the photon. It also gives unique insight into the mechanism behind the electron-photon interaction strength quantified by the fine structure constant. In some embodiments, the scope of the models described herein may account for larger particles, such as quarks, protons, and neutrons, to model beta decay in neutrons, as well as to model other types of observed phenomena such as gravity, magnetism, and the weak and strong interactions. As such, the models described herein will give great insight and provide enormous utility for designing and optimizing technologies based on fundamental particle interactions and behaviors.

Persons of ordinary skill in the art will understand that the systems and methods described herein may be implemented in one or more computer programs on one or more computer readable media, and one or more computers may be programmed with instructions to execute the methods described herein. The one or more computers may be in communication with one or more I/O devices to facilitate input and output of information to and from the one or more computers. The one or more computers and I/O devices may be in communication with each other via one or more networks. The one or more computers may be configured with one or more GUIs to facilitate input and output of information, including visual displays of models of quantum structure and behavior as described herein.

The embodiments described above are some examples of the current invention. Various modifications and changes of the current invention will be apparent to persons of ordinary skill in the art. Among other things, any feature described for one embodiment may be used in any other embodiment, and methods described and shown in the figures may be combined. In addition, the order of steps shown in the figures and described above may be changed in different embodiments. The scope of the invention is defined by the appended claims and other claims that may be drawn to this invention, considering the doctrine of equivalents, and is not limited to the specific examples described herein.

Appendix A

Electron Model Details

In this appendix the mathematics necessary in some embodiments to arrange the electron Q-spheres so that the structure packs perfectly are described. To achieve this perfect packing, in some embodiments it is necessary to invoke additional dimensions. The electron model described in Appendix A is a doubly-stacked Wheel polytope where the gaps in the packing are rectified by shifts into the energy subspace. To illustrate that the structure needs additional dimensions for perfect packing, the structure may be initially viewed as vertex points (eventually located at the center of the Q-spheres), and coordinates for the points may be calculated which locate all neighboring points at a distance of exactly one unit from each other.

To construct the perfectly packed electron, one may begin with the middle perimeter of five points. Demanding that there are no gaps in the structure, these five points will form a pentagon. For notational simplicity, one may locate this pentagon in the x-y plane with z=0. One may also work in the full seven-dimensional space defined by the Q-spheres given in Equation (1); however, since an instantaneous electron structure with no momentum is sought, one may enforce that the time and momentum-energy coordinates stay at zero. Also, one may initially give the points no other energy by setting the mass-energy and electromagnetic-energy dimension coordinates to zero. The coordinates of the middle perimeter Q-spheres are $$V^{(n)}_{P-middle} = \left[R\cos\left(\frac{2n\pi}{5}\right), R\sin\left(\frac{2n\pi}{5}\right), 0, 0, 0, 0, 0\right] \quad (72)$$

where n=0, 1, 2, 3, 4 and $$R = \sqrt{\frac{5+\sqrt{5}}{10}} \quad (73)$$

The upper and lower perimeters will also be pentagons, but the angles defining the vertices need to be offset by $\pi/5$ in order to permit packing. Solving for a perfectly-packed stack of three pentagonal perimeters yields the following equations, $$V^{(n)}_{P-upper} = \left[R\cos\left(\frac{(2n+1)\pi}{5}\right), R\sin\left(\frac{(2n+1)\pi}{5}\right), R, 0, 0, 0, 0\right] \quad (74)$$

$$V^{(n)}_{P-lower} = \left[R\cos\left(\frac{(2n+1)\pi}{5}\right), R\sin\left(\frac{(2n+1)\pi}{5}\right), -R, 0, 0, 0, 0\right]$$

where again n=0, 1, 2, 3, 4.

This structure of three pentagonal perimeters is perfectly packed as all neighbors are a distance of 1 unit apart. The packing issue arises when the two axis vertices are added. Still working only in the three spatial dimensions for now, the axis vertices must be located directly between the pentagonal perimeters and on the z-axis due to symmetry concerns. The locations must be $$V_{A-upper} = [0, 0, R/2, 0, 0, 0, 0] \quad (75)$$

$$V_{A-lower} = [0, 0, -R/2, 0, 0, 0, 0]$$

However, at this location the axis vertices are less than 1 unit from their neighboring perimeter vertices. For example, the Euclidean distance from the top axis vertex to the n=0 middle perimeter vertex is $$\|V_{A-upper} - V^{(0)}_{P-middle}\| = \sqrt{R^2 + \left(\frac{R}{2}\right)^2} \quad (76)$$
$$= 0.9510565$$

and the distance between the two axes vertices is equal to R, which is also less than one.

These distance issues can be remedied by shifting the axis vertices into a fourth dimension. Since the momentum-energy is set equal to zero and the perimeter Q-spheres are to carry the electromagnetic energy, one may shift the axis vertices into the mass-energy dimension. However, if both axis vertices are shifted equally in the mass-energy dimension, the distance between them will not change. Therefore, one may shift the upper axis vertex in the +w direction and the lower vertex in the −w direction just enough so that the distance between them is one. One may notate the unknown value $w_A$ and write the coordinates as $$V_{A-upper} = [0, 0, R/2, 0, 0, w_A, 0] \quad (77)$$

$$V_{A-lower} = [0, 0, -R/2, 0, 0, -w_A, 0]$$

Calculating the 4-dimensional Euclidean distance between the points, one may solve for the value of $w_A$ that gives a distance of one between them $$\|V_{A-upper} - V_{A-lower}\| = 1 = \sqrt{R^2 + (2w_A)^2} \quad (78)$$

$$= w_A = \frac{\sqrt{1 - R^2}}{2}$$

This enforces the distance between the axis vertices to be one, but the neighboring perimeter vertices are still less than one unit of distance away $$\|V_{A-upper} - V_{P-middle}^{(0)}\| = \sqrt{R^2 + \left(\frac{R}{2}\right)^2 + w_A^2} \quad (79)$$

$$= 0.9867152$$

Since the set of three pentagonal perimeters already pack perfectly, they can be shifted together and still retain packing. However, translating the vertices in either the three spatial dimensions or in the w-dimension will not suffice as the axis-perimeter symmetry is broken and one cannot get all perimeter vertices a distance of one unit from both axis vertices simultaneously. For this reason, a fifth dimension may be imposed in order to get the entire electron structure perfectly packed. One may rewrite the perimeter vertices all shifted by a distance $q_P$ in the same direction $$V_{P-upper}^{(n)} = \left[R\cos\left(\frac{(2n+1)\pi}{5}\right), R\sin\left(\frac{(2n+1)\pi}{5}\right), R, 0, 0, 0, q_P\right] \quad (80)$$

$$V_{P-middle}^{(n)} = \left[R\cos\left(\frac{2n\pi}{5}\right), R\sin\left(\frac{2n\pi}{5}\right), 0, 0, 0, 0, q_P\right]$$

$$V_{P-lower}^{(n)} = \left[R\cos\left(\frac{(2n+1)\pi}{5}\right), R\sin\left(\frac{(2n+1)\pi}{5}\right), -R, 0, 0, 0, q_P\right]$$

where as before n=0, 1, 2, 3, 4.

To calculate the necessary value of q, one may calculate the five-dimensional Euclidean distance between the n=0 middle perimeter vertex and the upper axis vertex and impose a distance of one.

$$\|V_{A-upper} - V_{P-middle}^{(0)}\| = 1 = \sqrt{R^2 + (R/2)^2 + w_A^2 + q_P^2} \quad (81)$$

$$q_P = \pm\sqrt{1 - R^2 - (R/2)^2 - w_A^2}$$

$$q_P = \pm\sqrt{\frac{3}{4} - R^2}$$

One may verify that this shift successfully makes all perimeter vertices a distance of one from the neighboring axis vertices. Choosing the positive value of $q_P$, the complete set of vertices in a doubly-stacked tire where all neighbors are exactly one unit of distance apart is $$V_{P-upper}^{(n)} = \left[R\cos\left(\frac{(2n+1)\pi}{5}\right), R\sin\left(\frac{(2n+1)\pi}{5}\right), R, 0, 0, 0, \sqrt{\frac{3}{4} - R^2}\right] \quad (82)$$

$$V_{A-upper} = \left[0, 0, R/2, 0, 0, \frac{\sqrt{1-R^2}}{2}, 0\right]$$

$$V_{P-middle}^{(n)} = \left[R\cos\left(\frac{2n\pi}{5}\right), R\sin\left(\frac{2n\pi}{5}\right), 0, 0, 0, 0, \sqrt{\frac{3}{4} - R^2}\right]$$

$$V_{A-lower} = \left[0, 0, -R/2, 0, 0, \frac{\sqrt{1-R^2}}{2}, 0\right]$$

$$V_{P-lower}^{(n)} = \left[R\cos\left(\frac{(2n+1)\pi}{5}\right), R\sin\left(\frac{(2n+1)\pi}{5}\right), -R, 0, 0, 0, \sqrt{\frac{3}{4} - R^2}\right]$$

where the value of R is as given in Equation (73).

Placing Q-spheres with centers located at these vertex points illuminates the advantage of modeling the Q-spheres as N-dimensional spheres. Seven-dimensional spheres with unit diameters will perfectly pack when located at the vertices given in Equation (82). As a result, the necessity of both mass- and electromagnetic-energies for the electron may be explained solely through geometry. The electron mass is due to the two axis Q-spheres which are shifted into the mass-energy dimension by a value of $$V_w = \frac{\sqrt{1 - R^2}}{2} \quad (83)$$

$$= 0.262865556 \ldots$$

And the electron electromagnetic energy is due to the 15 perimeter Q-spheres shifted into the electromagnetic-energy dimension by a value of $$V_q = \sqrt{\frac{3}{4} - R^2} \quad (84)$$

$$= 0.162459848 \ldots$$

Appendix B

Normalization of Units

In this appendix, the mathematics used in some embodiments to adjust or develop a model set of units are described. To build a model set based upon geometric principles, it is useful, in some embodiments, that all units be represented in terms of a fundamental generalized length unit. In this approach, it may be useful to normalize the speed of light, c, so that it is unitless and has a magnitude of one. This normalization may give distances in the time dimension the units of length. In Special Relativity, for example, it is common to label the four-dimensional axes as x1, x2, x3, and x4=ct. Thus, the x4 axis has units of length, and when c is normalized to one, time is given in units of length. This logic may be followed to give momentum-energy, mass-energy, and electromagnetic-energy units of length as well. To illustrate why units of generalized length are a reasonable unit for energy, one may examine the units of energy in SI units, which is the Joule (J).

$$[J] = \left[\frac{kg \cdot m^2}{s^2}\right] \tag{85}$$

If each of the fundamental units (kg, m, and s) are generalized lengths in this geometry, then energy has units of length cubed over length squared, i.e., $$[J] = \left[\frac{L \cdot L^2}{L^2}\right] = [L] \tag{86}$$

Thus, the generalized length units of energy are length. Therefore, the seven-dimensional space (three spatial, one time, and three energy dimensions) may all have units of generalized length, and the quantum structure and behavior models may be analyzed on a direct, length-based geometrical footing.

To achieve this set of units, one may normalize some additional fundamental constants (in addition to the speed of light). In addition to the speed of light, which may be used to normalize time units to length units, one may also use constants to normalize mass (the kilogram, kg) and charge (the Coulomb, C) to length units. The Planck constant (h) contains the kg unit and may be used to normalize mass to length. The permittivity of vacuum (co) contains the charge unit (C) and may similarly be used to normalize charge to length. One may find the correct values and units of the constants in this geometry to use in the normalization process, and then one may calculate their values in the Omnisent geometry.

One may begin with the speed of light which has SI units of $$[c] = \left[\frac{m}{s}\right] \tag{87}$$

Using the same argument based on generalized lengths that was used for the units of energy above, one may note that since time is normalized to a length in this geometry, the speed of light will be unitless $$[c] = \left[\frac{L}{L}\right] = [unitless] \tag{88}$$

Planck's constant, which denotes the quantum of action, has SI units of $$[h] = \left[\frac{kg \cdot m^2}{s}\right] \tag{89}$$

Taking each unit as a length, one may arrive at h with units of [length]², i.e., $$[h] = \left[\frac{L \cdot L^2}{L}\right] = [L^2] \tag{90}$$

Similarly, looking at the units of co, $$[\epsilon_0] = \left[\frac{C^2 \cdot s^2}{kg \cdot m^3}\right] = \left[\frac{L^2 \cdot L^2}{L \cdot L^3}\right] = [unitless] \tag{91}$$

To normalize SI values into the generalized length units, one may determine what the fundamental length unit is and derive its value in SI units. To make the new generalized length units as applicable as possible to the geometry described herein, one may aim to normalize critical values described herein to unit value, therefore giving a fundamentally defined geometrical meaning to the magnitudes of the values. For the value of the Omnisent length scale, one may use the photon duration derived in the above section labeled Geometrical Values. Herein, it is shown that the photon duration is an invariant value, and this attribute makes it a good candidate by which to base the measurement of all other lengths. To do this, one may use the photon duration to define a length. Fortunately, the photon duration may be transformed to a length by multiplying it by the speed of light. One may call this fundamental length $r_{om}$ and the value of 1 $r_{om}$ in SI units is $$1 r_{om} m = T_\gamma c = 1.003032602(51) \times 10^{-14} m \tag{92}$$

It's value in the Omnisent geometry will be $T_\gamma c_{om} = 1$ $r_{om}$, where $r_{om}$ is now the generalized length unit in the Omnisent geometry.

The speed of light has already been found in Omnisent geometry and was calculated in Equation (30).

$$c_{om} \approx 0.3599818 \tag{93}$$

To set the value of $h_{om}$, one may describe the magnitudes of energies in such geometry. As shown herein, an invariant and fundamental quantity based on energy was discovered in the above section labeled The Energy Spread, namely, the photon energy spread. One may set this fundamental constant to unity. Recall that it was earlier described that the photon energy spread $E_\gamma \cdot \lambda = hc$ (originally derived from Equation (16) in the description of photon energy). One may set the photon energy spread to one squared $r_{om}$. Then, Planck's constant in the Omnisent geometry becomes $$h_{om} = \frac{1}{c_{om}} r_{om}^2 \tag{94}$$

Since the value of $c_{om}$ was just set, one may readily calculate the value of $h_{om}$ $$h_{om} = \frac{1}{c_{om}} r_{om}^2 \tag{95}$$
$$= 2.77791818 \ldots r_{om}^2$$

Our strategy for normalizing the vacuum permittivity co is to make the electric and magnetic fields is similar to the Gaussian unit strategy where the goal is to make the components of the electromagnetic tensor, the Lorentz covariant object describing the electromagnetic field, have the same unit without constant factors. This normalization will become important when we examine the electromagnetic-energy dimension more and decipher how the electric and magnetic fields are linked and how Maxwell's equations fit into our geometric model. There is also the constraint that the product of the vacuum permittivity ($\epsilon_0$) and the vacuum permeability ($\mu_0$) is equal to the inverse of the speed of light squared. Thus, our normalized values for the vacuum permittivity and permeability, respectively, are $$\epsilon_{om} = \frac{1}{4\pi c_{om}} \quad (96)$$

$$\mu_{om} = \frac{4\pi}{c_{om}}$$

Thus the value for Com in our model geometry is $$\epsilon_{om} = \frac{1}{4\pi c_{om}} \quad (97)$$
$$= 0.2210597047 \ldots$$

In Table 1 below, the normalized values are listed for the novel fundamental values described herein as well as several common physical constants. The symbols are subscripted with "om" to clarify that the values are in the Omnisent normalization. Those values that are known exactly are followed by dots ( . . . ) to emphasize that the value's full accuracy is known. Those that are not yet known exactly are presented with uncertainty values calculated from the uncertainty stated in the experimental measurement of said value.

TABLE 1

Normalized Values

| Name | Symbol | Value with Units |
|---|---|---|
| Omnisent Length | $r_{om}$ | 1 $r_{om}$ |
| Speed of Light | $c_{om}$ | 0.3599818 . . . |
| Planck Constant | $h_{om}$ | 2.77791818 . . . $r_{om}^2$ |
| Vacuum Permittivity | $\epsilon_{om}$ | 0.2210597047 . . . |
| Q-Sphere Energy Scaling Factor | $\ell_{sph\text{-}om}$ | 0.003309312138 . . . $r_{om}$ |
| Photon Cycle Energy | $E_{helix\text{-}om}$ | 1 $r_{om}$ |
| Photon Energy Spread | $S_{\gamma\text{-}om}$ | 1 $r_{om}^2$ |
| Photon Duration | $T_\gamma$ | 2.77791818 . . . $r_{om}$ |
| Electron Charge | $e_{om}$ | 0.05680053878 . . . $r_{om}$ |
| Electron Mass | $m_{e\text{-}om}$ | 0.03190123899 . . . $r_{om}$ |
| Electron Mass-Energy | $M_{e\text{-}om}$ | 0.004133982671 . . . $r_{om}$ |
| Electron Electromagnetic-energy | $Q_{e\text{-}om}$ | 0.009043208920 . . . $r_{om}$ |
| Electron Radius | $\delta_{om}$ | 0.06421446981 . . . $r_{om}$ |
| ES Force Energy Spread | $S_{ES\text{-}om}$ | 0.001161409732 . . . $r_{om}^2$ |
| Quantum Magnetic Flux | $\Phi_{0\text{-}om}$ | 24.45327226 . . . $r_{om}$ |
| Electron Volt | $eV_{om}$ | 8.090003592 . . . $\times 10^{-9}$ $r_{om}$ |
| Gravitational Constant | $G_{om}$ | 2.73944(32) $\times 10^{-43}$ |
| Proton Mass | $m_{p\text{-}om}$ | 58.5755501(25) $r_{om}$ |
| Neutron Mass | $m_{n\text{-}om}$ | 58.6562917(26) $r_{om}$ |
| Hubble Constant | $H_{0\text{-}om}$ | 2.642(30) $\times 10^{-44}$ $r_{om}^{-1}$ |

What is claimed is:

1. A method of modeling quantum structure and behavior, the method comprising:
modeling a region of space as a compilation of imperfectly packed hard-spheres including at least one energy subspace dimension;
modeling a particle within said region of space as a locally stably packed set of hard-spheres; and
providing at least one of:
a) a visual display of an amount of hard-sphere geometry shifted into the at least one energy subspace dimension; and
b) a determined amount of said hard-sphere geometry shifted into the at least one energy subspace dimension for the set of hard-spheres to pack stably.

2. The method of claim 1 wherein said determined amount is associated with an energy.

3. The method of claim 1 wherein said visual display comprises shading the hard-sphere geometry shifted into the at least one energy subspace dimension.

4. The method of claim 1 wherein said locally stably packed set of hard-spheres represents either of an electron or a photon.

5. The method of claim 4 further comprising:
projecting the set of hard-spheres in one or more directions from one or more origin points in order to create a projected set of hard-spheres; and
providing to a user a second determined amount of hard-sphere geometry associated with shifting the projected set of hard-spheres into the at least one energy subspace dimension.

6. The method of claim 5 wherein said projected set of hard-spheres is associated with a structure including a charge distribution.

7. The method of claim 6 wherein said structure comprises either of a wire of current or a molecule.

8. A method of modeling quantum structure and behavior, the method comprising:
modeling a region of space as a compilation of imperfectly packed hard-spheres including at least one energy subspace dimension;
modeling a particle as a set of hard-spheres, said set of hard-spheres being locally stably packed;
projecting the set of hard-spheres in one or more directions from one or more origin points in order to provide a projected set of hard-spheres; and
providing at least one of:
a) a visual display of said projected set of hard-spheres; and
b) a determined amount of hard-sphere geometry for a shift of the projected set of hard-spheres into the at least one energy subspace dimension.

9. The method of claim 8 wherein said projected set of hard-spheres is associated with a structure including a charge distribution.

10. The method of claim 9 wherein said structure comprises a wire of current.

11. The method of claim 9 wherein said structure comprises a molecule.

12. The method of claim 8 wherein said determined amount is associated with an energy.

13. The method of claim 8 wherein said determined amount is used to model a quantum field disturbance at a distance from the one or more origin points.

14. A tangible, non-transitory computer readable medium comprising instructions executable by a computer configured for:
modeling a region of space as a compilation of imperfectly packed hard-spheres including at least one energy subspace dimension;
modeling a particle as a set of hard-spheres, said set of hard-spheres being locally stably packed; and projecting the set of hard-spheres in one or more directions from one or more origin points in order to provide a projected set of hard-spheres; and providing at least one of:
a) a visual display of the projected set of hard-spheres; and
b) a determined amount of hard-sphere geometry for a shift of the projected set of hard-spheres into the at least one energy subspace dimension.

15. The computer readable medium of claim 14 wherein said projected set of hard-spheres is associated with a structure including a charge distribution.

16. The computer readable medium of claim 15 wherein said structure comprises a wire of current.

17. The computer readable medium of claim 15 wherein said structure comprises a molecule.

18. The computer readable medium of claim 14 wherein said determined amount is associated with an energy.

19. The computer readable medium of claim 14 wherein said determined amount is associated with an energy of vibration.

20. The computer readable medium of claim 19 wherein said determined amount is used to model a quantum field disturbance at a distance from the one or more origin points.

* * * * *

UNITED STATES PATENT AND TRADEMARK OFFICE
CERTIFICATE OF CORRECTION

PATENT NO. : 11,901,957 B2
APPLICATION NO. : 17/221632
DATED : February 13, 2024
INVENTOR(S) : Henningsen et al.

Page 1 of 1

It is certified that error appears in the above-identified patent and that said Letters Patent is hereby corrected as shown below:

In the Specification

Column 16 Line 58 replace "27" with -- $2\pi$ --
Column 22 Line 9 replace "#c" with -- $\phi_c$ --
Column 24 Line 38 replace "ye" with -- $\phi_c$ --
Column 25 Line 1 replace "#c" with -- $\phi_c$ --
Column 29 Line 1 replace "$Q_e \cdot 26$" with -- $Q_e \cdot 2\delta$ --
Column 49 Line 64 replace "q" with -- $q_P$ --
Column 51 Line 38 replace "(co)" with -- $(\epsilon_o)$ --
Column 52 Line 8 replace "co" with -- $\epsilon_o$ --
Column 52 Line 65 replace "co" with -- $\epsilon_o$ --
Column 53 Line 20 replace "corn in" with -- $\epsilon_{om}$ --

Signed and Sealed this
Twenty-first Day of May, 2024

Katherine Kelly Vidal
*Director of the United States Patent and Trademark Office*